United States Patent
Satchi-Fainaro et al.

(10) Patent No.: US 12,486,494 B2
(45) Date of Patent: Dec. 2, 2025

(54) THREE-DIMENSIONAL TUMOR MODELS, METHODS OF MANUFACTURING SAME AND USES THEREOF

(71) Applicant: Ramot at Tel-Aviv University Ltd., Tel-Aviv (IL)

(72) Inventors: Ronit Satchi-Fainaro, Tel-Aviv (IL); Lena Neufeld, Tel-Aviv (IL); Galia Tiram, Tel-Aviv (IL); Dikla Ben-Shushan, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 1140 days.

(21) Appl. No.: 16/476,323

(22) PCT Filed: Jan. 8, 2018

(86) PCT No.: PCT/IB2018/050109
§ 371 (c)(1),
(2) Date: Jul. 8, 2019

(87) PCT Pub. No.: WO2018/127850
PCT Pub. Date: Jul. 12, 2018

(65) Prior Publication Data
US 2019/0367884 A1 Dec. 5, 2019

Related U.S. Application Data

(60) Provisional application No. 62/563,734, filed on Sep. 27, 2017.

(30) Foreign Application Priority Data

Jan. 8, 2017 (IL) .......................................... 249977

(51) Int. Cl.
| | | |
|---|---|---|
| *C12N 5/071* | (2010.01) | |
| *B33Y 10/00* | (2015.01) | |
| *B33Y 50/00* | (2015.01) | |
| *B33Y 80/00* | (2015.01) | |
| *C12N 5/09* | (2010.01) | |
| *G01N 33/50* | (2006.01) | |

(52) U.S. Cl.
CPC ............ *C12N 5/0697* (2013.01); *B33Y 10/00* (2014.12); *B33Y 50/00* (2014.12); *B33Y 80/00* (2014.12); *C12N 5/0693* (2013.01); *G01N 33/5011* (2013.01); *G01N 33/5088* (2013.01); *G01N 2500/10* (2013.01)

(58) Field of Classification Search
CPC ........ C12N 5/0697; B33Y 10/00; B33Y 50/00
See application file for complete search history.

(56) References Cited

U.S. PATENT DOCUMENTS

| | | | |
|---|---|---|---|
| 11,607,316 B2 * | 3/2023 | Vogtmeier | ............... A61B 6/52 |
| 2013/0190210 A1 | 7/2013 | Murphy et al. | |
| 2015/0246072 A1 | 9/2015 | Bhatia et al. | |
| 2015/0282885 A1 | 10/2015 | King et al. | |
| 2016/0040132 A1 * | 2/2016 | Sears | ................. G01N 33/5011 506/10 |
| 2016/0287756 A1 | 10/2016 | Lewis et al. | |
| 2016/0298087 A1 | 10/2016 | Qu et al. | |
| 2019/0194625 A1 | 6/2019 | Wicks | |

FOREIGN PATENT DOCUMENTS

| | | |
|---|---|---|
| EP | 2691511 | 2/2014 |
| KR | 10-2198455 | 1/2021 |
| WO | WO 2012/131000 | 10/2012 |
| WO | WO 2016/154571 | 9/2016 |
| WO | WO2016154571 A1 * | 9/2016 |
| WO | WO 2018/127850 | 7/2018 |
| WO | WO 2020/154374 | 7/2020 |
| WO | WO 2020/210296 | 10/2020 |

OTHER PUBLICATIONS

Miller et al. "Rapid casting of patterned vascular networks for perfusable engineered three-dimensional tissues". Nature Materials. Jul. 1, 2012. 11, 768-774 (Year: 2012).*
Timmins et al. "Generation of Multicellular Tumor Spheroids by the Hanging-Drop Method". In: Hauser, H., Fussenegger, M. (eds) Tissue Engineering. Methods in Molecular Medicine™, vol. 140. Humana Press. 141-151 (Year: 2007).*
International Search Report and the Written Opinion Dated Aug. 28, 2022 From the International Searching Authority Re. Application No. PCT/IL2022/050824. (16 Pages).
Cribaro et al. "Three-Dimensional Vascular Microenvironment Landscape in Human Glioblastoma", Acta Neuropathologica Communications, 9: 1-20, Feb. 12, 2021.
Lee et al. "Generation of 3-D Glioblastoma-Vascular Niche using 3-D Bioprinting ", 2015 41st Annual Northeast Biomedical Engineering Conference (NEBEC), 2 P., Apr. 17-19, 2015.
Neufeld et al. "Microengineered Perfusable 3D-Bioprinted Blioblastoma Model for in Vivo Mimicry of Tumor Microenvironment", Science Advances, 7(34): 1-20, Aug. 18, 2021.

(Continued)

*Primary Examiner* — Allison M Fox
*Assistant Examiner* — Hanan Isam Abuzeineh

(57) ABSTRACT

A three dimensional (3D) model of a tumor made of a synthetic material and a plurality of cell types, including malignant cells and non-malignant cells of the tumor, having a full HLA match, such that the synthetic material and the plurality of cell types are arranged in high matchability to a 3D image of the tumor, is provided. Methods of forming the 3D tumor model by bioprinting are also provided, as well as systems in which the 3D tumor model can be perfused and fluidly connected to a medium containing immune cells and/or other cells and factors present in the tumor's microenvironment. Methods utilizing the 3D tumor model or the system in, for example, personalized therapy, are also provided.

16 Claims, 25 Drawing Sheets

(25 of 25 Drawing Sheet(s) Filed in Color)

(56) References Cited

OTHER PUBLICATIONS

Truong et al. "A Three-Dimensional (3D) Organotypic Microfluidic Model for Glioma Stem Cells—Vascular Interactions", Biomaterials, 198: 63-77, Apr. 2019.
Wan et al. "Perfused Three-Dimensional Organotypic Culture of Human Cancer Cells for Therapeutic Evaluation", Scientific Reports, 7: 1-13, Aug. 25, 2017.
Wang et al. "Bioengineered 3D Brain Tumor Model to Elucidate the Effects of Matrix Stiffness on Glioblastoma Cell Behavior Using PEG-Based Hydrogels", Molecular Pharmaceutics, 11(7): 2115-2125, Apr. 8, 2014.
Supplementary European Search Report and the European Search Opinion Dated Jul. 13, 2020 From the European Patent Office Re. Application No. 18736000.3. (12 Pages).
Charbe et al. "Three-Dimensional Bio-Printing: A New Frontier in Oncology Research", World Journal of Clinical Oncology, XP055414919, 8(1): 21-36, Published Online Feb. 10, 2017.
Dababneh et al. "Bioprinting Technology: A Current State-of-the Art Review", Journal of Manufacturing Science and Engineering, XP055467316, 136(6): 061016-1-061016-11, Published Online Oct. 24, 2014.
Kelm et al. "Microscale Tissue Engineering Using Gravity-Enforced Cell Assembly", Trends in Biotechnology, XP004497323, 22(4): 195-202, Apr. 2004.
Ozbolat et al. "Application Areas of 3D Bioprinting", Drug Discovery Today, XP029680968, 21(8): 1257-1271, Published Online Apr. 13, 2016.
Vijayavenkataraman et al. "3D Bioprinting of Skin: A State-of-the-Art Review on Modelling, Materials, and Processes", Biofabrication, XP055543505, 8(3): 032001-1-032201-32, Sep. 7, 2016.
International Search Report and the Written Opinion Dated May 10, 2018 From the International Searching Authority Re. Application No. PCT/IB2018/050109. (11 Pages).
Office Action and Search Report Dated Jul. 20, 2017 From the Israel Patent Office Re. Application No. 249977. (6 Pages).
Baranski et al. "Geometric Control of Vascular Networks to Enhance Engineered Tissue Integration and Function", Proc. Natl. Acad. Sci. USA, PNAS, 110(19): 7586-7591, May 7, 2013.
Bhatia et al. "Microfluidic Organs-on-Chips", Nature Biotechnology, 32(8): 760-772, Published Online Aug. 5, 2014.
Campbell et al. "Multimaterial and Multiscale Three-Dimensional Bioprinter", Journal of Nanotechnology in Engineering and Medicine, 6(2): 021005-1-021005-9, Published Online Sep. 29, 2015.
Cao et al. "Transplantation of Chondrocytes Utilizing a Polymer-Cell Construct to Produce Tissue-Engineered Cartilage in the Shape of A Human Ear", Plastic and Reconstructive Surgery, 100(2): 297-302, Aug. 1997. Presented in Part at the 39th Annual Meeting of the Plastic Surgery Research Council, Ann Arbor, MI, USA, Jun. 1-7, 1994.
Chang et al. "Effects of Dispensing Pressure and Nozzle Diameter on Cell Survival From Solid Freeform Fabrication-Based Direct Cell Writing", Tissue Engineering Part A, 14(1): 41-48, Jan. 2008.
Du et al. "Gradient Nanofibrous Chitosan/Poly Epsilon-Caprolactone Scaffolds as Extracellular Microenvironments for Vascular Tissue Engineering", Biomaterials, 33(3): 762-770, Available Online Nov. 4, 2011.
Fedorovich et al. "Evaluation of Photocrosslinked Lutrol Hydrogel for Tissue Printing Applications", Biomacromolecules, 10(7): 1689-1696, Published on Web May 15, 2009.
Golden et al. "Fabrication of Microfluidic Hydrogels Using Molded Gelatin as a Sacrificial Element", Lab on A Chip, 7: 720-725, Published Online Mar. 21, 2007.
Gonen-Wadmany et al. "Protein-Polymer Conjugates for Forming Photopolymerizable Biomimetic Hydrogels for Tissue Engineering", Biomaterials, 28(26): 3876-3886, Available Online May 18, 2007.
Hinton et al. "Three-Dimensional Printing of Complex Biological Structures by Freeform Reversible Embedding of Suspended Hydrogels", Science Advances, 1(9): e1500758-1-e1500758-10, Published Online Oct. 23, 2015.
Homan et al. "Bioprinting of 3D Convoluted Renal Proximal Tubules on Perfusable Chips", Scientific Reports, 6: 34845-1-34845-13, Oct. 11, 2016.
Hopp et al. "Survival and Proliferative Ability of Various Living Cell Types After Laser-Induced Forward Transfer", Tissue Engineering, 11(11-12): 1817-1823, Nov.-Dec. 2005.
Huling et al. "Fabrication of Biomimetic Vascular Scaffolds for 3D Tissue Constructs Using Vascular Corrosion Casts", Acta Biomaterialia, 32: 190-197, Available Online Jan. 6, 2016.
Jakab et al. "Three-Dimensional Tissue Constructs Built by Bioprinting", Biorheology, 43(3-4): 509-513, Jan. 2006.
Josef et al. "Composite Alginate Hydrogels: An Innovative Approach for the Controlled Release of Hydrophobic Drugs", Acta Biomaterialia, 6(12): 4642-4649, Available Online Jun. 30, 2010.
Ju et al. "Bilayered Scaffold for Engineering Cellularized Blood Vessels", Biomaterials, 31(15): 4313-4321, Available Online Feb. 25, 2010.
Kaufman-Francis et al. "Engineered Vascular Beds Provide Key Signals to Pancreatic Hormone-Producing Cells", PLoS ONE, 7(7): e40741-1-e40741-10, Jul. 12, 2012.
Khetan et al. "Patterning Network Structure to Spatially Control Cellular Remodeling and Stem Cell Fate Within 3-Dimensional Hydrogels", Biomaterials, 31(32): 8228-8234, Available Online Jul. 31, 2010.
Kim et al. "A Quantitative Microfluidic Angiogenesis Screen for Studying Anti-Angiogenic Therapeutic Drugs", Lab on a Chip, 15(1): 301-310, Jan. 7, 2015.
Koch et al. "Laser Printing of Skin Cells and Human Stem Cells", Tissue Engineering, Part C: Methods, 16(5): 847-854, Oct. 2010.
Kolesky et al. "3D Bioprinting of Vascularized, Heterogeneous Cell-Laden Tissue Constructs", Advanced Materials, 26(19): 3124-3130, May 21, 2014.
Kolesky et al. "Three-Dimensional Bioprinting of Thick Vascularized Tissues", Proc. Natl. Acad. Sci. USA, PNAS, 113(12): 3179-3184, Mar. 22, 2016.
Lee et al. "Design and Fabrication of Human Skin by Three-Dimensional Bioprinting", Tissue Engineering, Part C: Methods, 20(6): 473-484, Dec. 2013.
Lee et al. "Development of a Composite Vascular Scaffolding System That Withstands Physiological Vascular Conditions", Biomaterials, 29(19): 2891-2898, Available Online Apr. 8, 2008.
Lesman et al. "Engineering Vessel-Like Networks Within Multicellular Fibrin-Based Constructs", Biomaterials, 32(31): 7856-7869, Available Online Aug. 4, 2011.
Miller et al. "Rapid Casting of Patterned Vascular Networks for Perfusable Engineered Three-Dimensional Tissues", Nature Materials, 11(9): 768-774, Published Online Jul. 1, 2012.
Murphy et al. "3D Bioprinting of Tissues and Organs", Nature Biotechnology, 32(8): 773-785, Published Online Aug. 5, 2014.
Nakamura et al. "Biocompatible Inkjet Printing Technique for Designed Seeding of Individual Living Cells", Tissue Engineering, 11(11-12): 1658-1666, Nov.-Dec. 2005.
Ozbolat "Design for Bioprinting", 3D Bioprinting: Fundamentals, Principles and Applications, Chap.2: 17-23 & Figs., 2016.
Tao et al. "Fmoc-Modified Amino Acids and Short Peptides: Simple Bio-Inspired Building Blocks for the Fabrication of Functional Materials", Chemical Society Reviews, 45(14): 3935-3953, Jul. 11, 2016.
Visser et al. "Biofabrication of Multi-Material Anatomically Shaped Tissue Constructs", Biofabrication, 5(3): 035007-1-035007-11, Jul. 2, 2013.
Wu et al. "Omnidirectional Printing of 3D Microvascular Networks", Advanced Materials, 23(24): H178-H183, Published Online Mar. 23, 2011.
Supplementary European Search Report and the European Search Opinion Dated Oct. 28, 2024 From the European Patent Office Re. Application No. 22848834.2. (11 Pages).
Han et al. "3D Bioprinted Vascularized Tumour for Drug Testing", International Journal of Molecular Sciences, 21(8): 2993(1-14), Apr. 23, 2020.
Tang et al. "Biomaterials and 3D Bioprinting Strategies to Model Glioblastoma and Blood-Brain Barrier", Advanced Materials, 33(5): e2004776, Feb. 4, 2021.

(56) References Cited

OTHER PUBLICATIONS

Tang et al. "Rapid 3D Bioprinting of Glioblastoma Model Mimicking Native Biophysical Heterogencity", Small, Wiley Online Library, 17(15): 2006050 (1-13), Jan. 27, 2021.
Yi et al. "A Biprinted Human-glioblastoma-on-a-chip for the Identification of Patient-specific Responses to Chemoradiotherapy", Nature Biomedical Engineering 3: 509-519, Mar. 18, 2019.

\* cited by examiner

THREE-DIMENSIONAL TUMOR MODELS, METHODS OF MANUFACTURING SAME AND USES THEREOF

RELATED APPLICATIONS

This application is a National Phase of PCT Patent Application No. PCT/IB2018/050109 having International filing date of Jan. 8, 2018, which claims the benefit of priority under 35 USC § 119(e) of U.S. Provisional Patent Application No. 62/563,734 filed on Sep. 27, 2017 and Israel Patent Application No. 249977 filed on Jan. 8, 2017. The contents of the above applications are all incorporated by reference as if fully set forth herein in their entirety.

FIELD AND BACKGROUND OF THE INVENTION

The present invention, in some embodiments thereof, relates to tumor modeling and, more particularly, but not exclusively, to three-dimensional tumor models featuring structural and functional properties in high match of a respective tumor in a subject, to methods of manufacturing same and to uses thereof in, for example, research, surgery simulation and personalized therapy.

Two-dimensional (2D) cell cultures have a tremendous value in biomedical research in general and in drug screening in particular, however, they do not support tissue-specific and differentiated functions of multiple cell types in disease progression nor do they predict the in-vivo effect of drug activities (1, 2). Moreover, there is an increasing demand to reduce animal testing due to its cost, the long duration required to obtain results, the limitations of in-vivo models in predicting human responses and ethical considerations. In order to overcome the drawbacks of 2D cell culture assays and potentially reduce the need for animal testing, new analytical screening assays in three dimensions (3D) employing human cells are needed (1).

Three-dimensional (3D) cell cultures, mainly made of hydrogels, are composed of either natural extracellular matrix (ECM) molecules, natural polymers or synthetic polymers, which enable cells to polarize and interact with neighboring cells. These 3D culture models are favorable over 2D cell cultures since they represent the tissue better than the 2D monolayer, and thus can be used for studying the molecular basis of tissue function, as well as signaling pathways and drug responsiveness in some disease states. Nonetheless, there are several drawbacks to currently-existing 3D culture models since many of these systems lack multiscale architecture and tissue-tissue interfaces, for example the interface between the vasculature and its surrounding connective tissue and parenchymal cells, which are crucial to the function of nearly all organs (1).

Additive manufacturing (AM) is generally a process in which a three-dimensional (3D) object is manufactured utilizing a computer model of the objects. The basic operation of any AM system consists of slicing a three-dimensional computer model into thin cross sections, translating the result into two-dimensional position data and feeding the data to control equipment which manufacture a three-dimensional structure in a layerwise manner.

Various AM technologies exist, amongst which are stereolithography, digital light processing (DLP), and three-dimensional (3D) printing such as 3D inkjet printing, extrusion printing, electrospinning, etc. Such techniques are generally performed by layer by layer deposition and solidification of one or more building materials, typically photopolymerizable (photocurable) materials.

Stereolithography, for example, is an additive manufacturing process which employs a liquid ultraviolet (UV)-curable building material and a UV laser. In such a process, for each dispensed layer of the building material, the laser beam traces a cross-section of the part pattern on the surface of the dispensed liquid building material. Exposure to the UV laser light cures and solidifies the pattern traced on the building material and joins it to the layer below. After being built, the formed parts are immersed in a chemical bath in order to be cleaned of excess building material and are subsequently cured in an UV oven.

In three-dimensional printing processes, for example, a building material is dispensed from a dispensing head having a set of nozzles to deposit layers on a supporting structure. Depending on the building material, the layers may then be cured or solidified using a suitable device.

The building materials may include modeling materials and support materials, which form the object and the temporary support constructions supporting the object as it is being built, respectively.

The modeling material (which may include one or more materials) is deposited to produce the desired object/s and the support material (which may include one or more materials) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently hardened, typically upon exposure to curing energy (e.g., UV curing), to form the required layer shape. After printing completion, support structures are removed to reveal the final shape of the fabricated 3D object.

Additive manufacturing has been first used in biological applications for forming three-dimensional sacrificial resin molds in which 3D scaffolds from biological materials were created (1).

3D bioprinting is an additive manufacturing methodology which uses biological materials, chemicals and cells that are printed layer-by-layer with a precise positioning and a tight control of functional components placement to create a 3D structure (3). 3D bioprinting technology is favorable over currently-existing 3D culture models since it creates objects that sense and respond to their environment.

Organ printing, a novel approach in tissue engineering, applies layered computer-driven deposition of cells and gels to create complex 3D cell-laden structures. It shows great promise in regenerative medicine, because it may help to solve the problem of limited donor grafts for tissue and organ repair.

3D bioprinting goal is to create tissues that mimic their natural structure, and are composed of multiple cell types with different extracellular matrices and functional microvasculature. This goal can be approached by two ways (4):

1. Using a scaffold (synthetic or natural) or a decellularized organ which is seeded with cells and then matured in a bioreactor. This approach is useful mainly for generation of avascular tissues.

2. Assembling "building blocks" that mimic the native tissue functional units into larger tissue constructs. This approach allows the inclusion of microvasculature and direct fabrication of a functional tissue-architecture.

A 3D organ model has already been successfully used to form bones as well as cartilaginous structures, such as ears and tracheas (5).

Additional related art includes U.S. Patent Application Publication Nos. 20130190210, 20150282885 and 20150246072; Hinton et al. 2015 Sci. Adv. I:e1500758; Homan et al. 2016 6:34845 I DOI: 10.1038/srep34845; Miller et al., Nat. Let. 2012 DOI: 10.1038/NMAT3357; Wu et al. Adv. Mat. 2011:23: H178-H183; Ozbolat et al. 3D BioprintingL Fundamentals, Principles and Applications. Academic Press, 2016.

SUMMARY OF THE INVENTION

According to an aspect of some embodiments of the present invention there is provided a three dimensional (3D) model of a tumor comprising a synthetic material and a plurality of cell types having a full HLA match, the plurality of cell types comprising malignant cells and non-malignant cells of the tumor, the synthetic material and the plurality of cell types being arranged in high matchability to a 3D image of the tumor.

According to an aspect of some embodiments of the present invention there is provided a three dimensional (3D) model of a tumor comprising a thickening agent and a plurality of cell types of the tumor, the plurality of cell types comprising malignant cells and non-malignant cells, the 3D model being shaped as a spheroid.

According to some of any of the embodiments of the present invention, the plurality of cell types has a full HLA match.

According to some of any of the embodiments of the present invention, the 3D model is embedded in an extracellular matrix.

According to some of any of the embodiments of the present invention, the extracellular matrix comprises a synthetic material.

According to some of any of the embodiments of the present invention, the extracellular matrix comprises Matrigel™.

According to some of any of the embodiments of the present invention, the extracellular matrix is naturally occurring.

According to some of any of the embodiments of the present invention, the plurality of cell types exhibits viability for at least 30 days.

According to some of any of the embodiments of the present invention, the plurality of cell types exhibit a gene expression pattern which is more similar to that of the tumor in-vivo as compared to that of a 2D culture According to some of any of the embodiments of the present invention, the plurality of cell types comprises adherent cells and non-adherent cells.

According to some of any of the embodiments of the present invention, the 3D model comprises extracellular matrix.

According to some of any of the embodiments of the present invention, the plurality of cell types are selected from the group consisting of cancer cells and stromal cells.

According to some of any of the embodiments of the present invention, the 3D model comprises a perfusable vasculature.

According to some of any of the embodiments of the present invention, the 3D model further comprises components of an extracellular matrix (ECM) of the tumor.

According to some of any of the embodiments of the present invention, the tumor is selected from the group consisting of a carcinoma, a sarcoma, glioma and an adenoma.

According to some of any of the embodiments of the present invention, the synthetic material comprises a hardened form of a curable material.

According to some of any of the embodiments of the present invention, the synthetic material comprises a polymeric material.

According to some of any of the embodiments of the present invention, the synthetic material comprises a synthetic polymer.

According to some of any of the embodiments of the present invention, the synthetic material comprises fibrin and an anionic polymer cross-linked to one another.

According to some of any of the embodiments of the present invention, the fibrin is formed upon enzymatically-catalyzed polymerization of fibrinogen.

According to some of any of the embodiments of the present invention, the fibrin and the anionic polymer are cross-linked to one another upon an enzymatic reaction.

According to some of any of the embodiments of the present invention, the thickening agent comprises cellulose or a derivative thereof.

According to some of any of the embodiments of the present invention, the non-malignant cells comprise at least 2 cell types.

According to some of any of the embodiments of the present invention, the non-malignant cells comprise at least 3 cell types.

According to some of any of the embodiments of the present invention, the tumor is a glioblastoma and the non-malignant cells comprise endothelial cells and glial cells.

According to an aspect of some embodiments of the present invention there is provided a method of manufacturing a 3D model of a tumor according as described herein, the method comprising:
  (a) providing a composition comprising a plurality of cell types, the plurality of cell types comprising malignant cells and non-malignant cells of the tumor and a thickening agent;
  (b) subjecting the composition to a hanging drop method so as to produce a spheroid;
  (c) embedding the spheroid in an extracellular matrix material;

According to some of any of the embodiments of the present invention, the method further comprises imaging the tumor.

According to an aspect of some embodiments of the present invention there is provided a method of manufacturing a 3D model of a tumor of a subject, the method comprising:
  (a) imaging the tumor to acquire a 3D imaging data of the tumor and optionally a surrounding environment of the tumor;
  (b) ex-vivo dissociating at least a portion of the tumor and optionally a surrounding environment of the tumor so as to obtain a cell suspension comprising a plurality of cell types; and
  (c) subjecting the cell suspension to bioprinting according to the 3D imaging data so as to obtain a 3D model of the tumor.

According to some of any of the embodiments of the present invention, the cell suspension comprises a plurality of cell suspensions fractionating a plurality of cell types.

According to some of any of the embodiments of the present invention, the plurality of cell types comprises adherent cells and non-adherent cells.

According to some of any of the embodiments of the present invention, the cell suspension comprises an extracellular matrix.

According to some of any of the embodiments of the present invention, the plurality of cell types are selected from the group consisting of tumor cells and stromal cells.

According to some of any of the embodiments of the present invention, the bioprinting comprises transferring the 3D imaging data to a 3D printing data readable by a bioprinting system usable in the bioprinting.

According to some of any of the embodiments of the present invention, the bioprinting comprises sequentially forming a plurality of layers on a receiving medium in a configured pattern corresponding to the 3D printing data, at least one of the layers comprising cells of the cell suspension.

According to some of any of the embodiments of the present invention, at least one of the layers comprises a curable material.

According to some of any of the embodiments of the present invention, the curable material is a synthetic and/or acellular curable material.

According to some of any of the embodiments of the present invention, the bioprinting comprises exposing at least one layer which comprises the curable material to a curing condition to thereby form a hardened acellular material.

According to some of any of the embodiments of the present invention, the curable material forms a hardened material which is, or comprises, a synthetic polymeric material.

According to some of any of the embodiments of the present invention, the polymeric material is or comprises a synthetic polymer.

According to some of any of the embodiments of the present invention, the hardened synthetic material provides a chemical, physical and/or mechanical property to the 3D tumor model.

According to some of any of the embodiments of the present invention, the hardened synthetic material and the 3D printing data are selected so as to provide the chemical, physical and/or mechanical property at a pre-determined target location in the 3D tumor model.

According to some of any of the embodiments of the present invention, the curable material comprises fibrinogen and thrombin.

According to some of any of the embodiments of the present invention, the curable material further comprises an anionic polymer and an enzyme that catalyzes cross-linking between the anionic polymer and a fibrin formed from the fibrinogen.

According to some of any of the embodiments of the present invention, the imaging is effected in vivo.

According to some of any of the embodiments of the present invention, the imaging is effected ex-vivo.

According to some of any of the embodiments of the present invention, the method further comprises, prior to dissociating the tumor, removing at least a portion of the tumor from the subject.

According to some of any of the embodiments of the present invention, dissociating the tumor comprises enzymatic dissociation and/or mechanical dissociation.

According to some of any of the embodiments of the present invention, the method further comprises perfusing the 3D-bioprinted model of the tumor, to thereby obtain a perfused model.

According to some of any of the embodiments of the present invention, the method further comprises exposing the perfused model to a culturing medium comprising immune cells.

According to some of any of the embodiments of the present invention, the method further comprises: (d) isolating cells of the tumor model; (e) in vitro or in vivo culturing the cells.

According to an aspect of some embodiments of the present invention there is provided a 3D tumor model obtainable by the method as described herein in any of the respective embodiments and any combination thereof.

According to some of any of the embodiments of the present invention, the 3D tumor model as described herein in any of the respective embodiments and any combination thereof is a perfused model.

According to an aspect of some embodiments of the present invention there is provided a system comprising the 3D model as described herein in any of the respective embodiments and any combination thereof and a container in fluid communication with the 3D model, the container comprising immune cells and/or a therapeutically active agent.

According to some of any of the embodiments of the present invention, the system further comprises a peristaltic pump for effecting the fluid communication.

According to an aspect of some embodiments of the present invention there is provided a method of screening for an anti-cancer treatment regimen, the method comprising:

subjecting a 3D model of a tumor as described herein in any of the respective embodiments and any combination thereof to the anti-cancer treatment regimen; and determining a presence of an anti-cancer effect of the anti-cancer treatment regimen at a personalized manner.

According to some of any of the embodiments of the present invention, the anti-cancer treatment regimen is selected from the group consisting of a chemotherapy, a radiotherapy and a hormonal therapy.

According to some of any of the embodiments of the present invention, the anti-cancer treatment regimen comprises a combination therapy.

According to an aspect of some embodiments of the present invention there is provided a method of screening for an anti-cancer treatment regimen, the method comprising:

subjecting a system as described herein in any of the respective embodiments to the anti-cancer treatment regimen; and determining a presence of an anti-cancer effect of the anti-cancer treatment regimen at a personalized manner.

According to some of any of the embodiments of the present invention, the anti-cancer treatment regimen is selected from the group consisting of a chemotherapy, a radiotherapy and a hormonal therapy.

According to some of any of the embodiments of the present invention, the anti-cancer regimen comprises an immune check point modulator.

According to some of any of the embodiments of the present invention, the anti-cancer regimen comprises a TSP-1 inhibitor.

According to an aspect of some embodiments of the present invention there is provided a method of characterizing a tumor, the method comprising:

providing the 3D model of the tumor as described herein in any of the respective embodiments and any combination thereof;

isolating cells of the model;

in vitro or in vivo culturing the cells.

According to some of any of the embodiments of the present invention, the method further comprises subjecting the cells to an anti-cancer treatment during the culturing.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 3A:
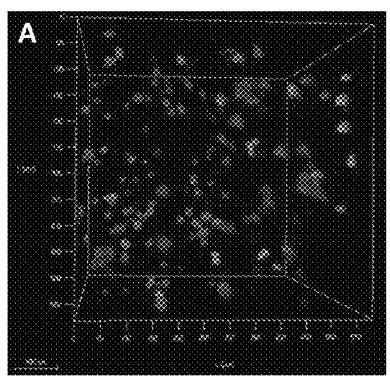
Figure 3B:
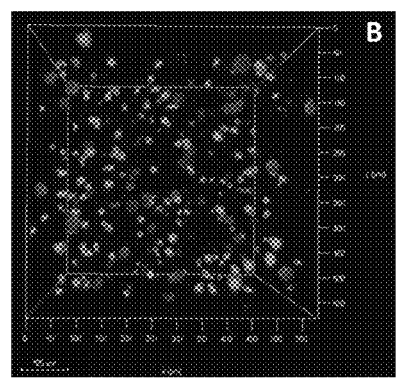

FIGS. 3A-B present images showing 131/4-5B1 mCherry-labeled melanoma cells and Human Umbilical Vein Endothelial Cells (HUVECs) GFP-labeled grown in an exemplary printable polymer according to some embodiments of the present invention, gelatin methacrylate (GelMA) hydrogel, for 1 day (FIG. 3A) and 6 days (FIG. 3B). Significant differences are shown between cell confluency, 3D spatial organization, distribution and intensity of 131/4-5B1-mCherry melanoma cells and HUVECs GFP-labeled grown in GelMA for 1 day compared with 6 days. GelMA synthesis and cross-linking were made as previously described (6).

Figure 4:
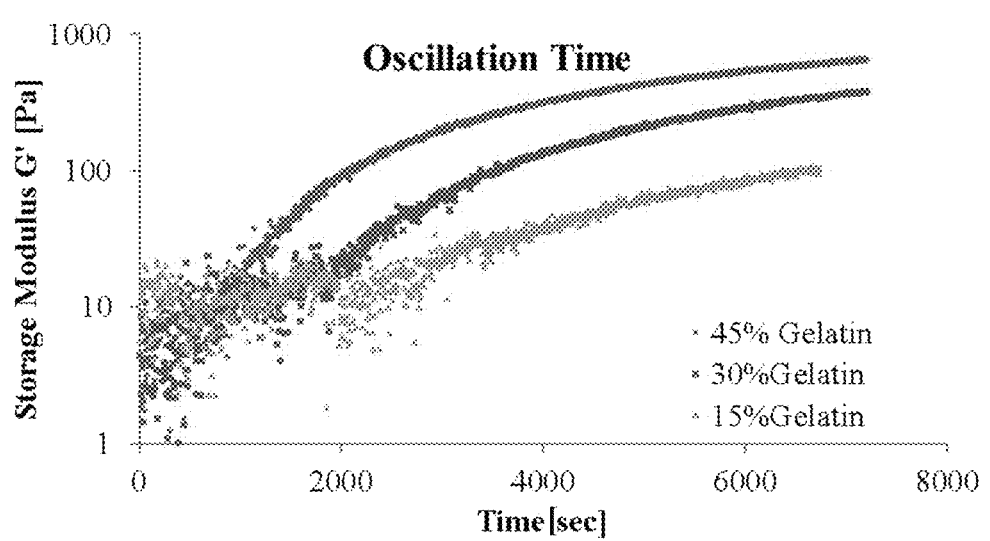

FIG. 4. Presents comparative plots showing the Storage modulus of hydrogels consisting of fibrinogen, transglutaminase (TG) and gelatin at different concentrations (15%, 30%, or 45% w/v).

Figure 5A:
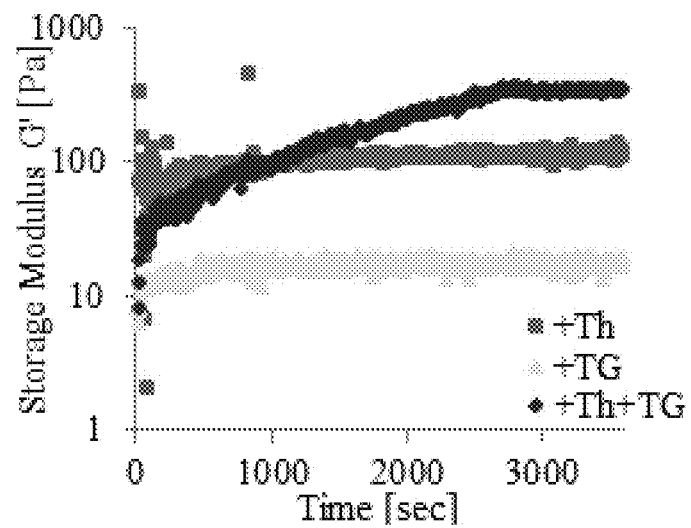
Figure 5B:
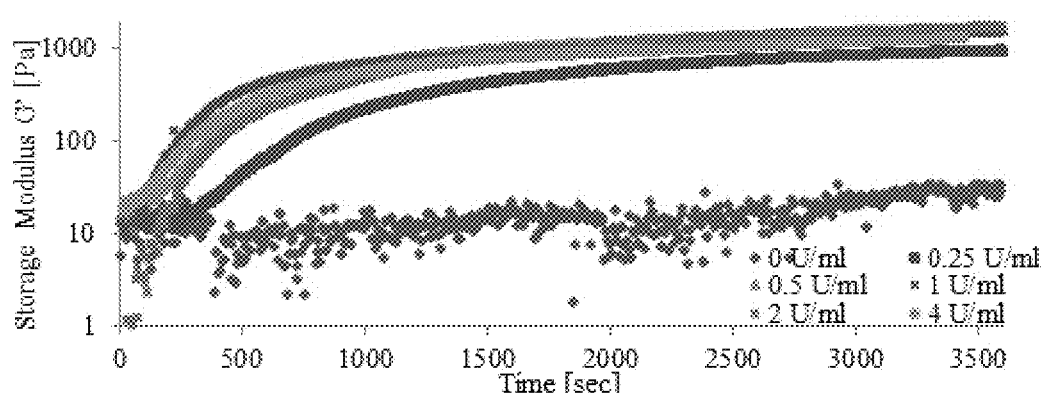
Figure 5C:
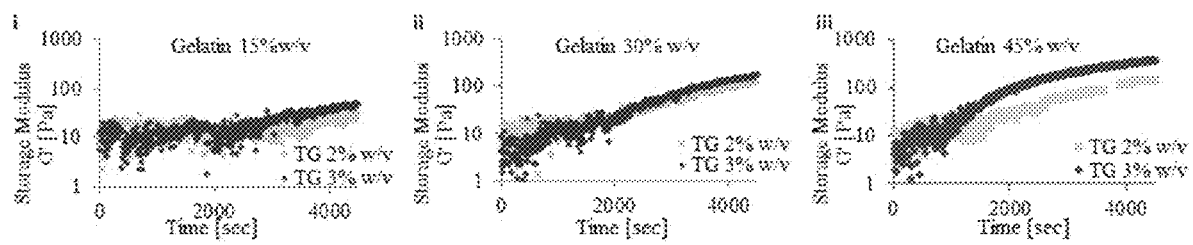
Figure 5D:
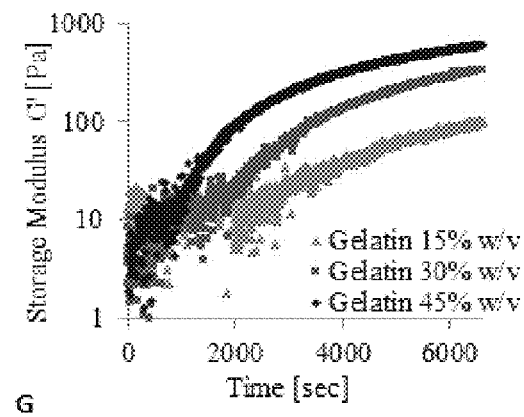
Figure 5E:
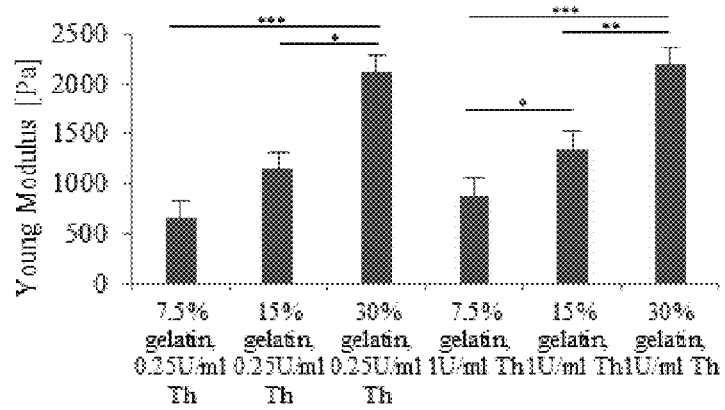
Figure 5F:
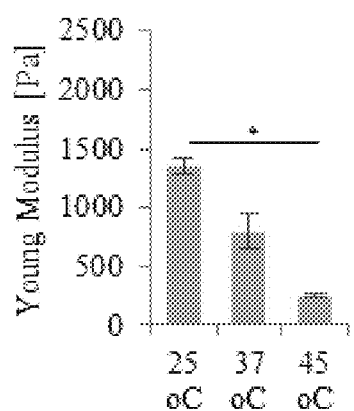
Figure 5G:
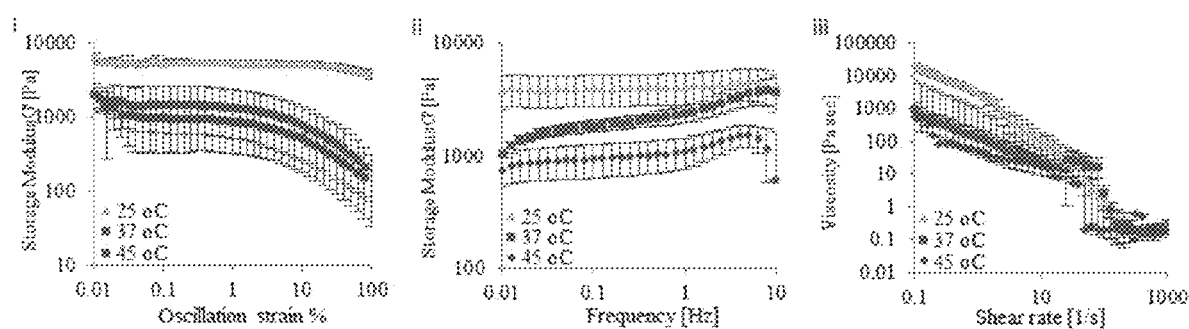

FIGS. 5A-G present data obtained in rheological characterization of exemplary bio-ink formulations according to some embodiments of the present invention. FIG. 5A presents plots showing oscillation time of a formulation containing 1% w/v fibrinogen and 15% w/v gelatin hydrogels with 1 U/ml Th and/or 20 mg/ml TG. FIG. 5B presents plots showing oscillation time of a formulation containing 1% w/v fibrinogen and 15% w/v gelatin hydrogels, 20 mg/ml TG, and different Th concentrations. FIG. 5C presents plots showing oscillation time of a formulation containing 1% w/v fibrinogen with different TG concentrations at different initial gelatin concentrations i. 15% w/v, ii. 30% w/v and iii. 45% w/v. FIG. 5D presents plots showing oscillation time of a formulation containing 1% w/v fibrinogen with TG 30 mg/ml with different gelatin concentrations. FIG. 5E is a bar graph showing Young modulus of fibrin hydrogels formed of fibrinogen-containing formulations at different Th and gelatin concentrations. FIG. 5F is a bar graph showing the Young modulus of hydrogel upon curing a 15% w/v GelMA hydrogel formulation at different temperatures. FIG. 5G present i. strain sweep ii. frequency sweep and iii. flow sweep, of hydrogel made upon curing a 15% w/v GelMA hydrogel formulation at different temperatures.

Figure 6A:
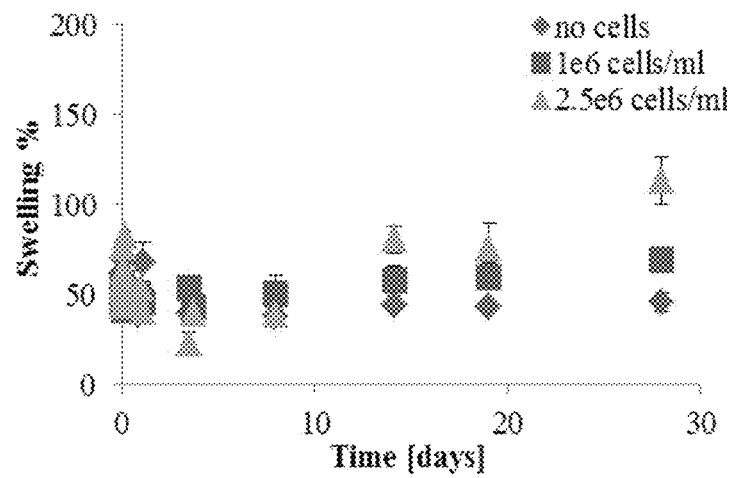
Figure 6B:
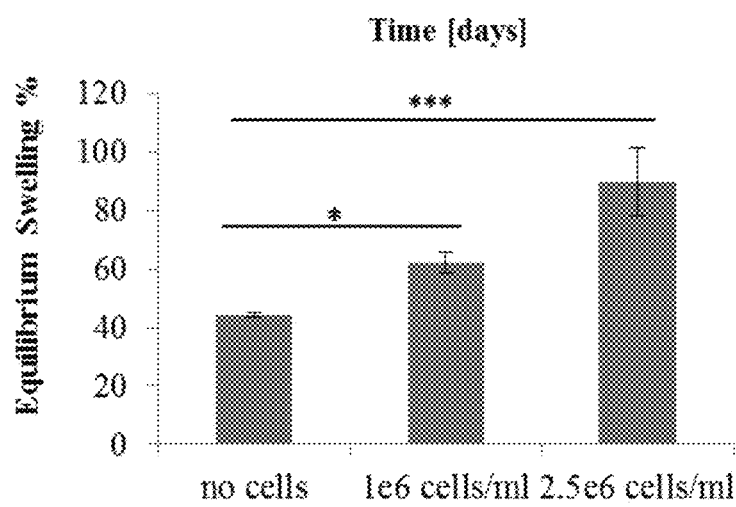

FIGS. 6A-B present kinetic swelling plots (FIG. 6A) and a bar graph showing the equilibrium swelling (FIG. 6B) of a hydrogel comprising fibrin 1% w/v (15% w/v gelatin), and the same hydrogel containing GL261 mCherry glioblastoma cells at initial concentration of $10^6$ cells/ml or of $2.5 \times 10^6$ cells/ml.

Figure 7A:
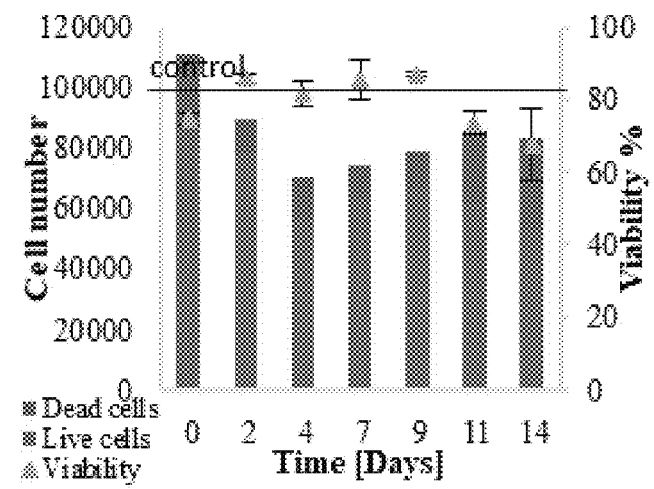
Figure 7B:
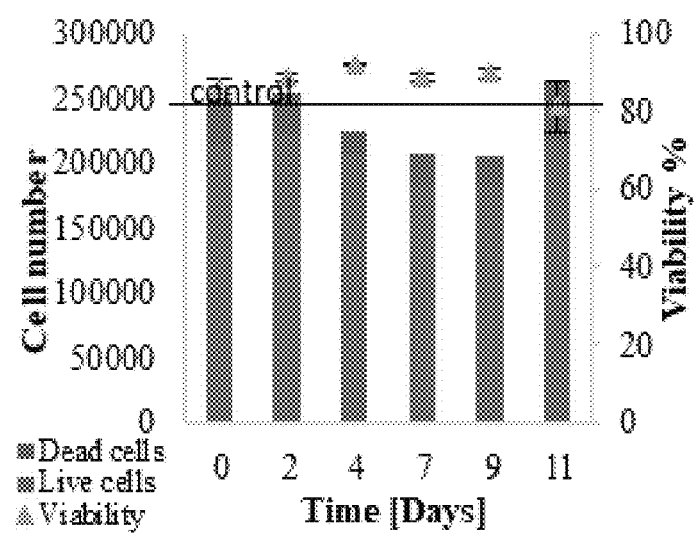
Figure 7C:
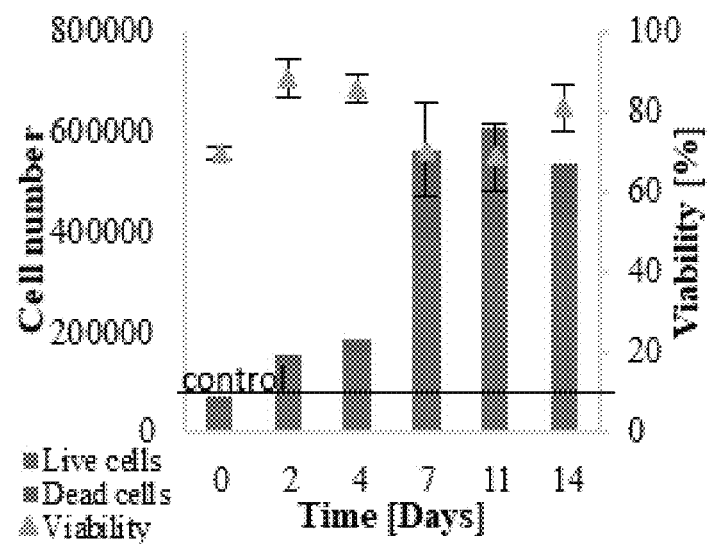
Figure 7D:
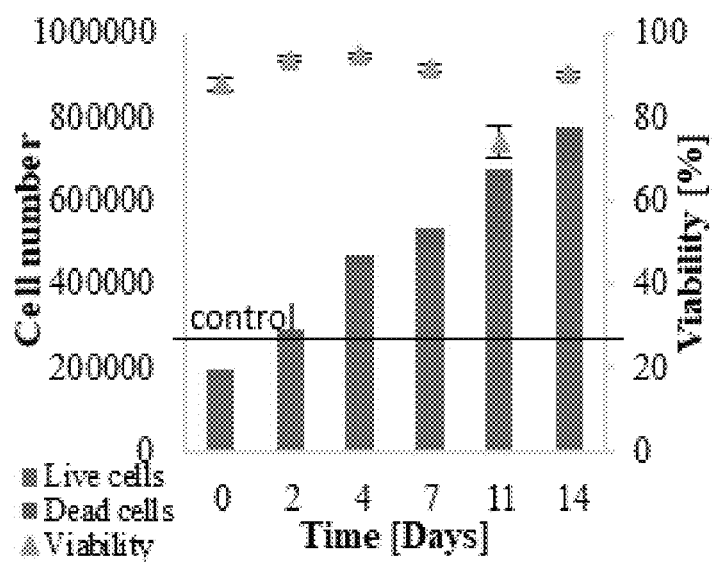
Figure 7E:
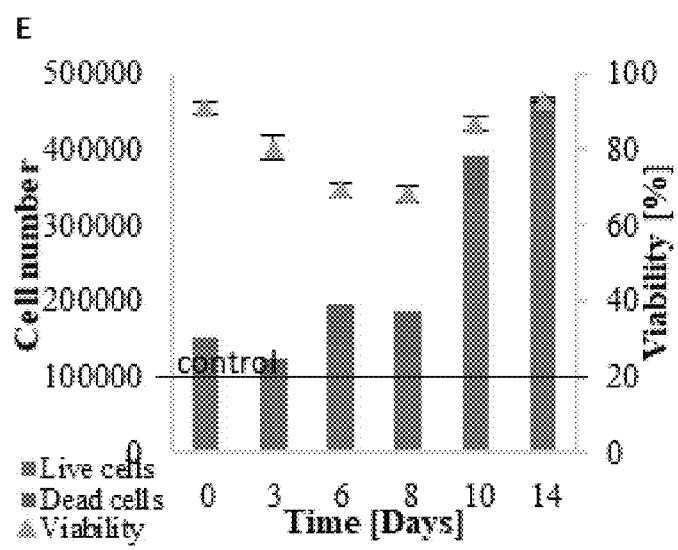
Figure 7F:
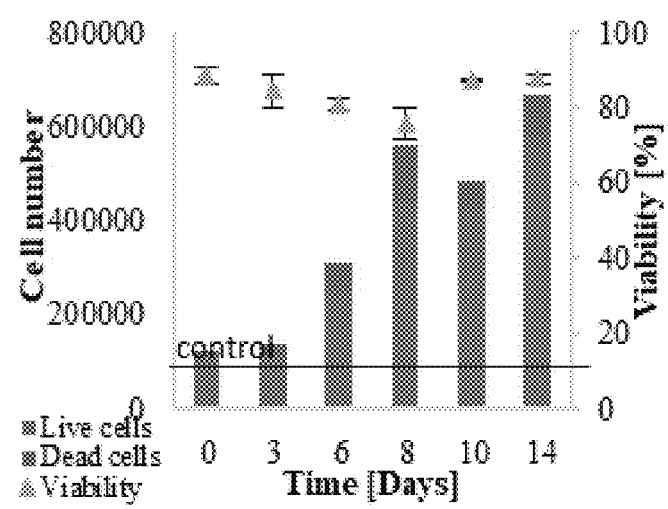
Figure 7G:
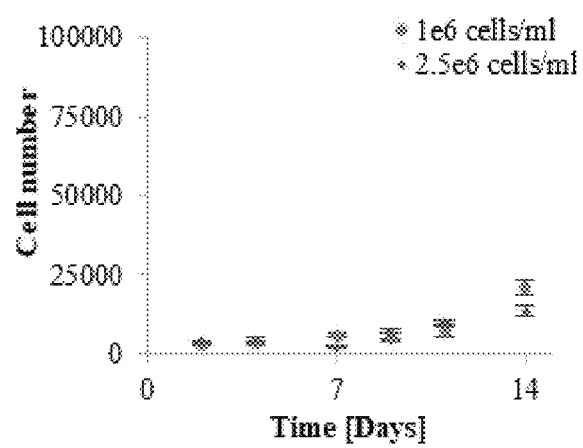
Figure 7H:
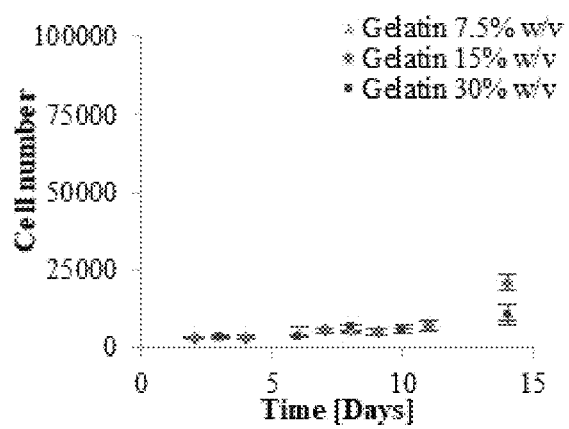

FIGS. 7A-H present data obtained in proliferation and viability evaluation of GL261 mCherry glioblastoma cells, determined as described in Example 2 hereinbelow, inside hydrogels made of exemplary bio-ink formulations according to some of the present embodiments. FIG. 7A is a bar graph showing proliferation and viability in a GelMA 15% w/v hydrogel with $10^6$ cells/ml. FIG. 7B is a bar graph showing proliferation and viability in a GelMA 15% w/v hydrogel with $2.5 \times 10^6$ cells/ml. FIG. 7C is a bar graph showing proliferation and viability in a fibrin/gelatin hydrogel formed of 1% fibrinogen, 15% gelatin and 1 U/ml Th, with $10^6$ cells/ml. FIG. 7D is a bar graph showing proliferation and viability in a fibrin/gelatin hydrogel formed of 1% fibrinogen, 15% gelatin, and 1 U/ml Th, with $2.5 \times 10^6$ cells/ml. FIG. 7E is a bar graph showing proliferation and viability in a fibrin/gelatin hydrogel formed of 1% fibrinogen, 1 U/ml Th and 7.5% gelatin with $10^6$ cells/ml. FIG. 7F is a bar graph showing proliferation and viability in a fibrin/gelatin hydrogel formed of 1% fibrinogen, 1 U/ml Th and 30% gelatin with $10^6$ cells/ml. FIG. 7G presents plots showing the number of cells that escaped a fibrin (1 U/ml Th) hydrogel with 15% w/v gelatin and different cell concentrations. FIG. 7H presents plots showing the number of cells that escaped a fibrin (1 U/ml Th) hydrogel with $10^6$ cells/ml at different gelatin initial concentrations.

Figure 8A:
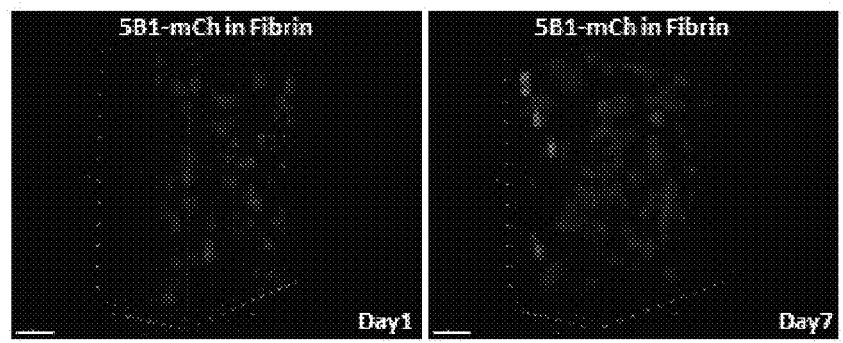
Figure 8B:
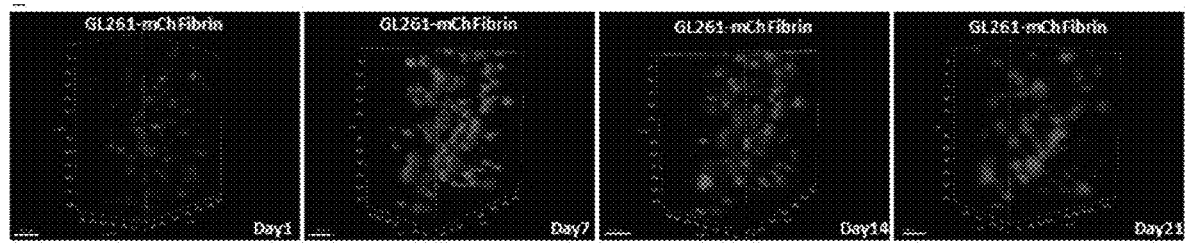
Figure 8C:
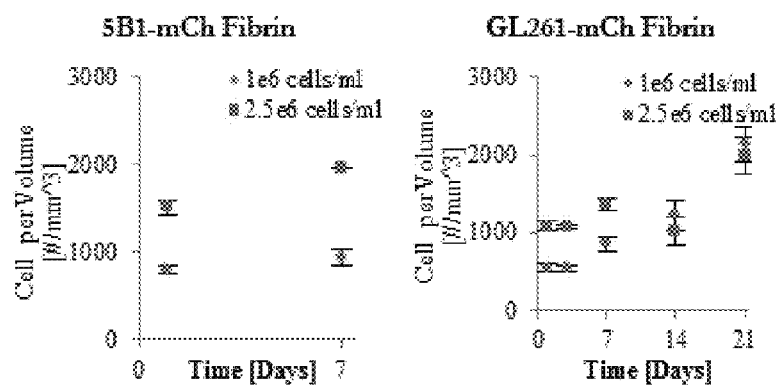

FIGS. 8A-C present data obtained in proliferation and viability evaluation of GL261 mCherry glioblastoma cells inside hydrogels made of exemplary bio-ink formulations according to some of the present embodiments on different days after seeding determined by confocal Z-stacks. FIG. 8A presents images of 131/4-5B1 mCherry melanoma cells at $2.5 \times 10^6$ cells/ml seeded in hydrogel comprising Fibrin, 15% w/v gelatin and 1 U/ml Th. FIG. 8B presents images of GL261 mCherry glioblastoma cells at $2.5 \times 10^6$ cells/ml seeded in hydrogel formed of Fibrin, 15% w/v gelatin and 1 U/ml Th. FIG. 8C presents proliferation curves of 131/4-5B1 mCherry melanoma cells and GL261 mCherry in the tested fibrin hydrogel. Bar=100 µm.

Figure 9A:
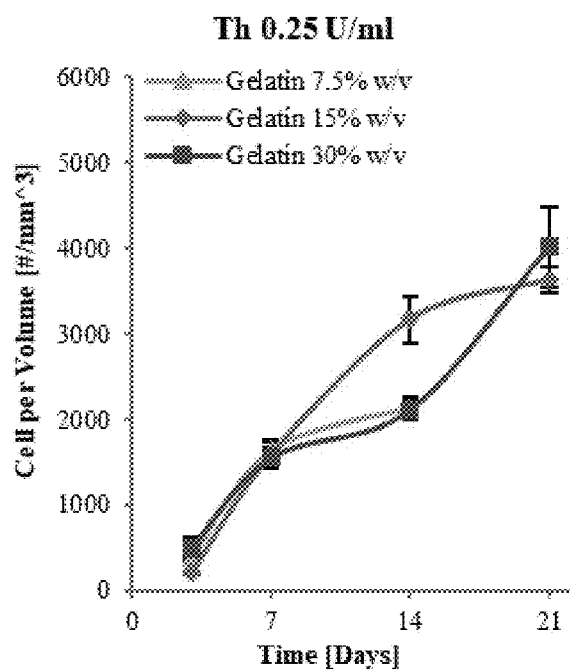
Figure 9B:
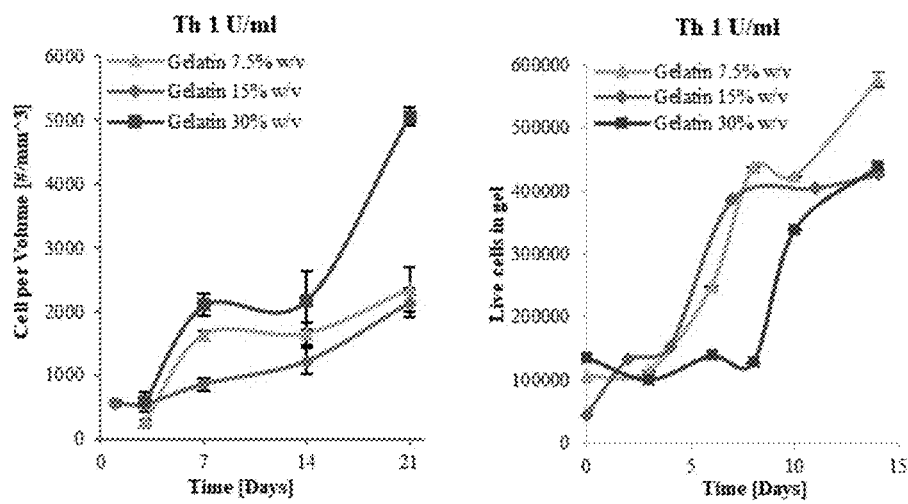

FIGS. 9A-B present proliferation plots of GL261 mCherry glioblastoma cells at $10^6$ cells/ml in fibrin hydrogels formed of formulations containing different gelatin initial concentrations with Th 0.25 U/ml (FIG. 9A), with Th 1 U/ml measured according to confocal Z-stacks (FIG. 9B, left) and with Th 1 U/ml measured directly after hydrogel digestion with Collagenase II (FIG. 9B, right).

Figure 10A:
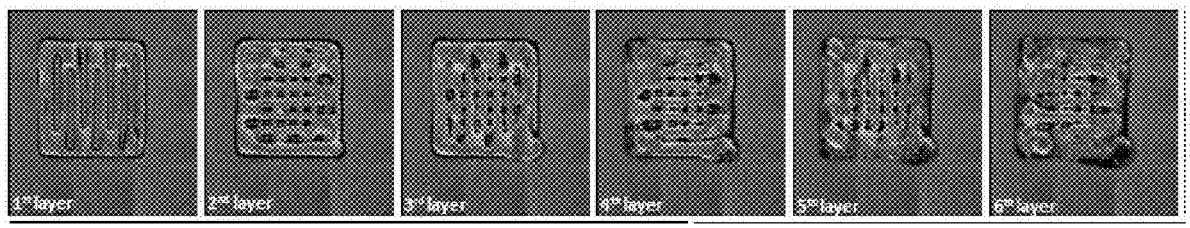
Figure 10B:
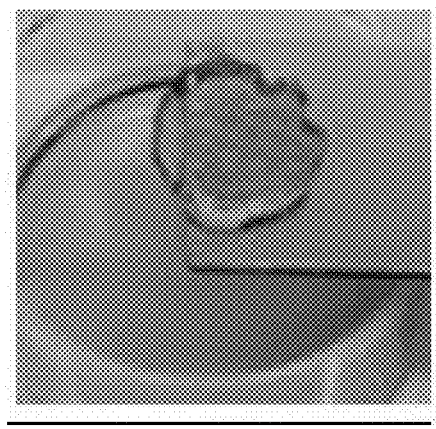
Figure 10C:
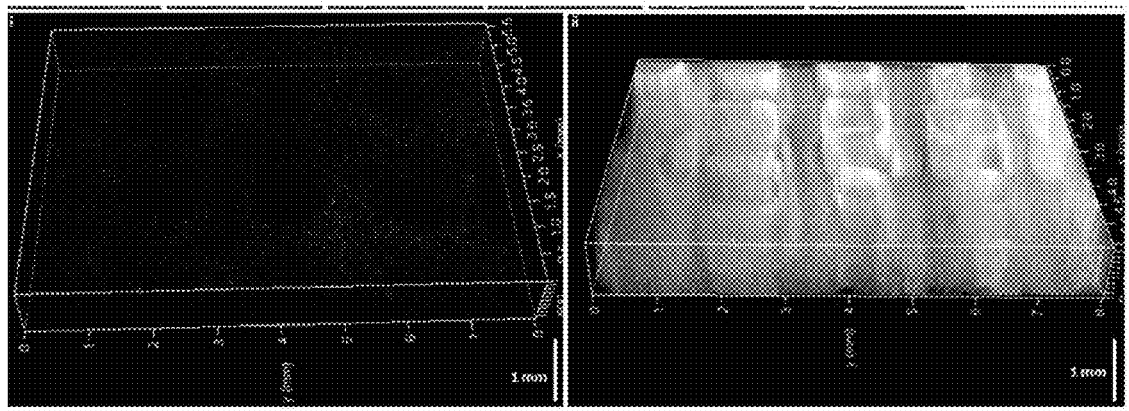
Figure 10D:
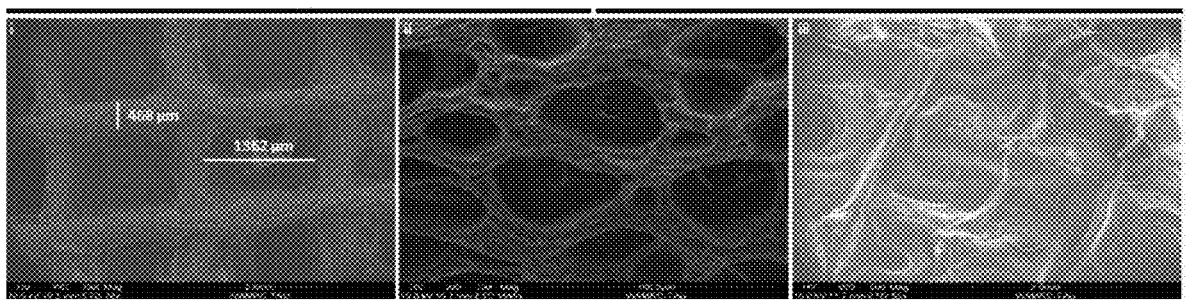

FIGS. 10A-D present images of a bioprinting of a bio-ink formulation containing GelMA 15% w/v with GL261 mCherry glioblastoma cells at $2.5 \times 10^6$ cells/ml. FIG. 10A presents images showing the printing steps. FIG. 10B is an image of the printed hydrogel in cell media. FIG. 10C presents fluorescence microscopy tailing photo of 24 Z-stacks i. red cells and ii. red cells with bright field. FIG. 10D presents SEM images of the obtained hydrogel i. lyophilized×56 ii. lyophilized×1645 and iii. dried with ethanol×52.

Figure 11A:
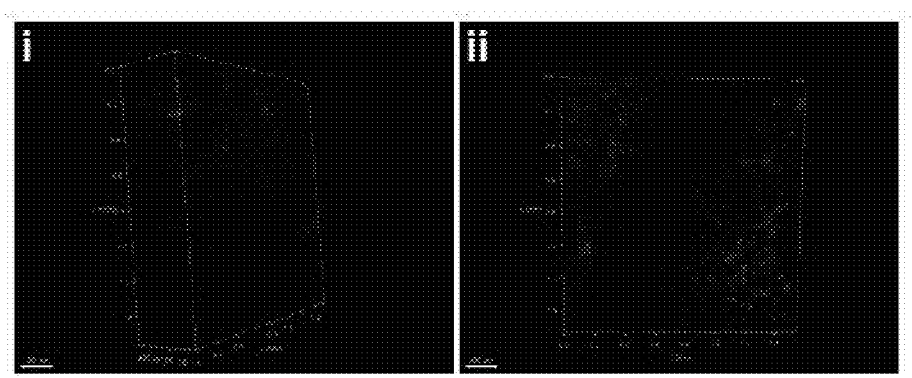
Figure 11B:
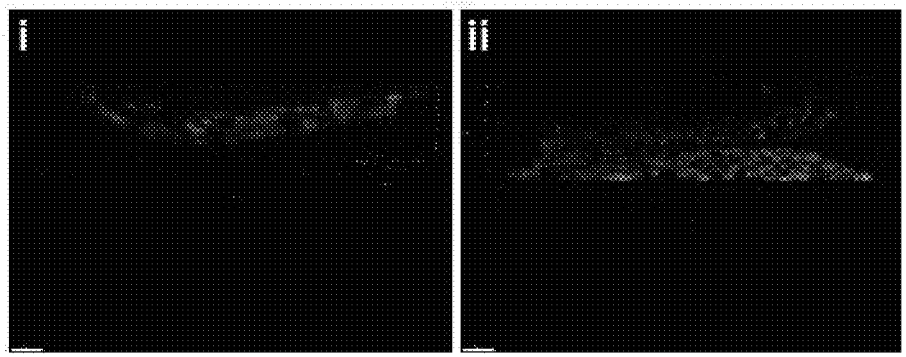

FIGS. 11A-B present images of Pluronic channels containing HUVEC mCherry at $3 \times 10^6$ cells/ml created inside hydrogels made of GelMA 15% w/v formulation (FIG. 11A) and fibrinogen/gelatin 15% w/v/1 U/ml Th formulation (FIG. 11B) i) with no other cells ii) with U87-GFP at $10^6$ cells/ml. Images were taken 7 days after seeding. Channels diameter about 1.1 mm. Bar=200 µm.

Figure 12A:
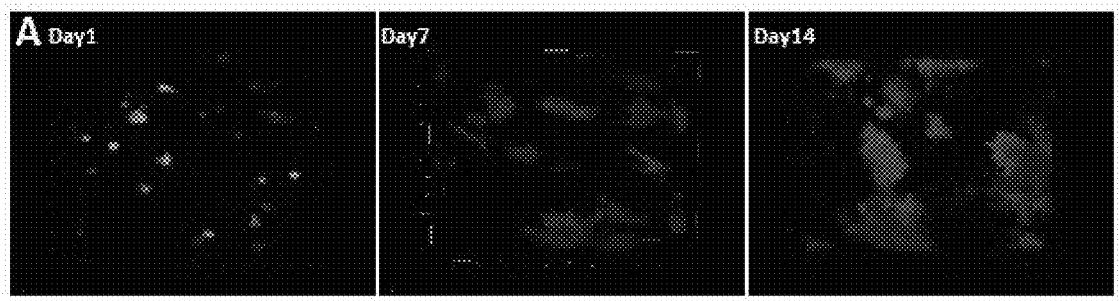
Figure 12B:
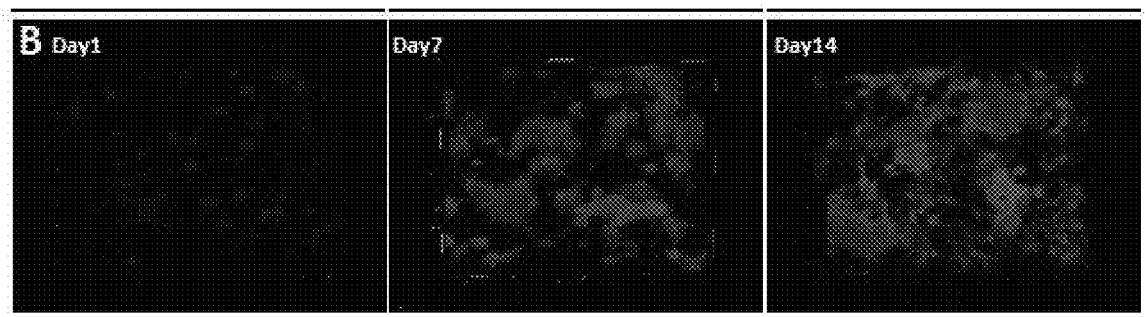
Figure 12C:
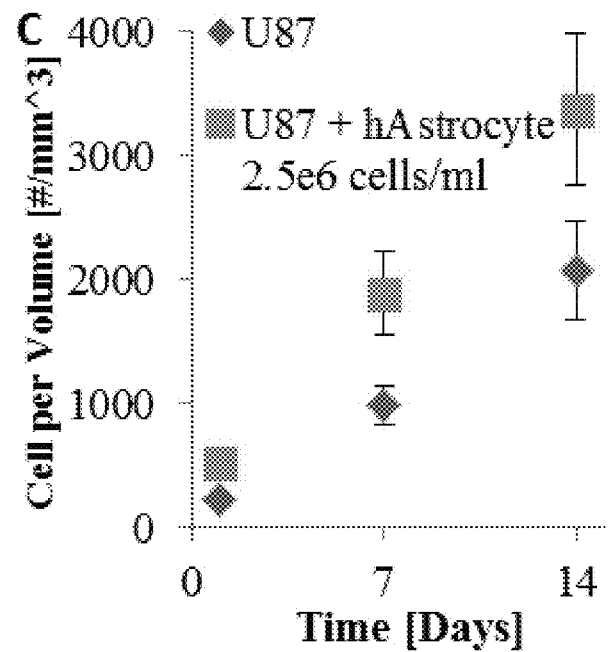

FIGS. 12A-C present images of hydrogel formed of fibrinogen/gelatin 15% w/v/1 U/ml Th formulation containing U87-GFP at $10^6$ cells/ml (FIG. 12A), and upon being co-cultured with hAstro at $2.5 \times 10^6$ cells/ml on different days after seeding (FIG. 12B). FIG. 12C presents the respective proliferation curves measured according to confocal Z-stacks. Bar=100 µm.

Figure 13A:
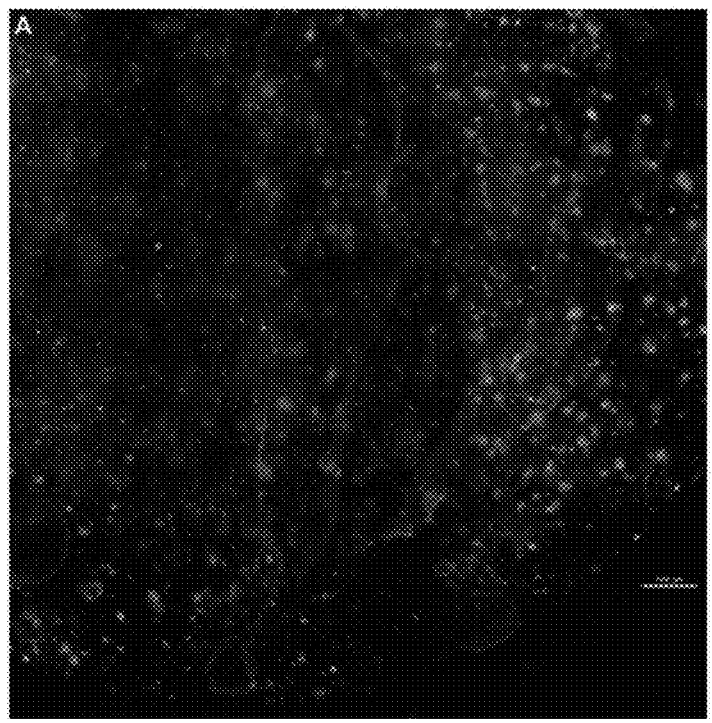
Figure 13B:
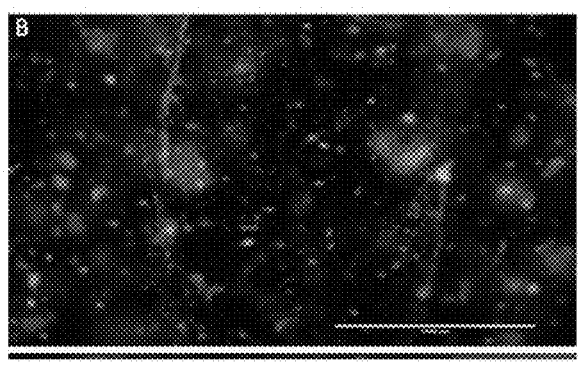
Figure 13C:
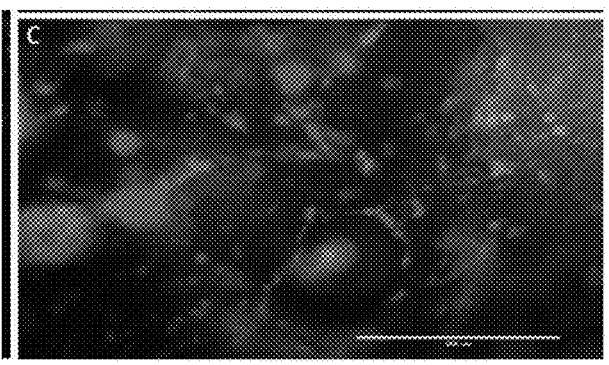

FIGS. 13A-C present images of Pluronic channels containing HUVEC mCherry at $3 \times 10^6$ cells/ml inside a fibrin/gelatin 15% w/v/Th 1 U/ml hydrogel 14 days after seeding U87-GFP at $10^6$ cells/ml and hAstro $2.5 \times 10^6$ cells/ml, taken by Nikon TiE X40 (FIG. 13A), taken by Evos X40 (FIG. 13B), and taken by Evos X200 (FIG. 13C).

Figure 14:
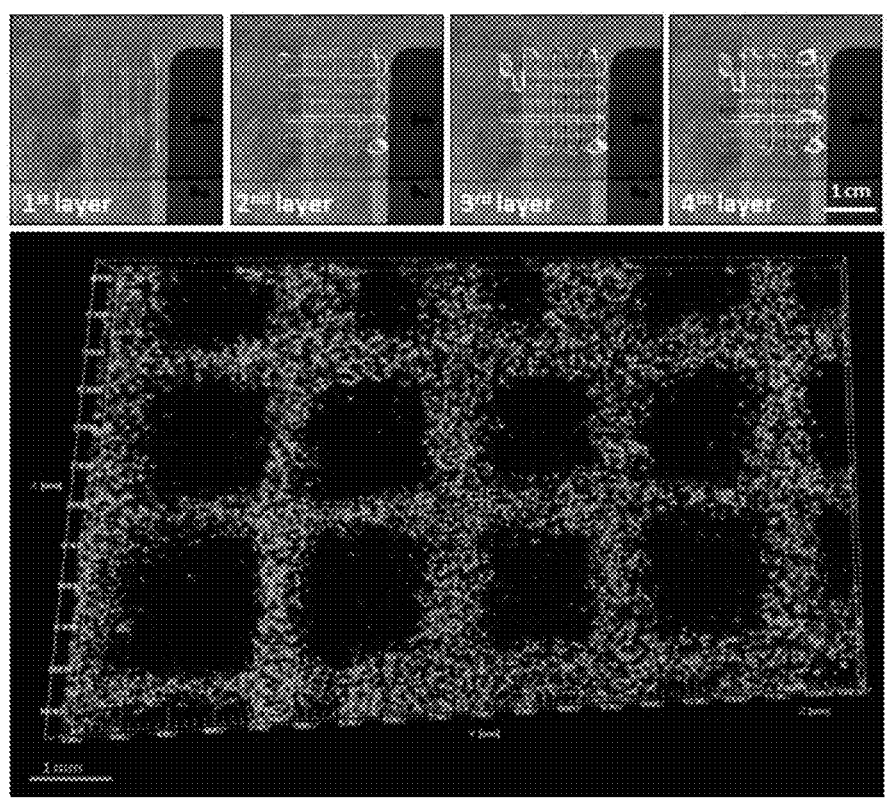
Figure 15:
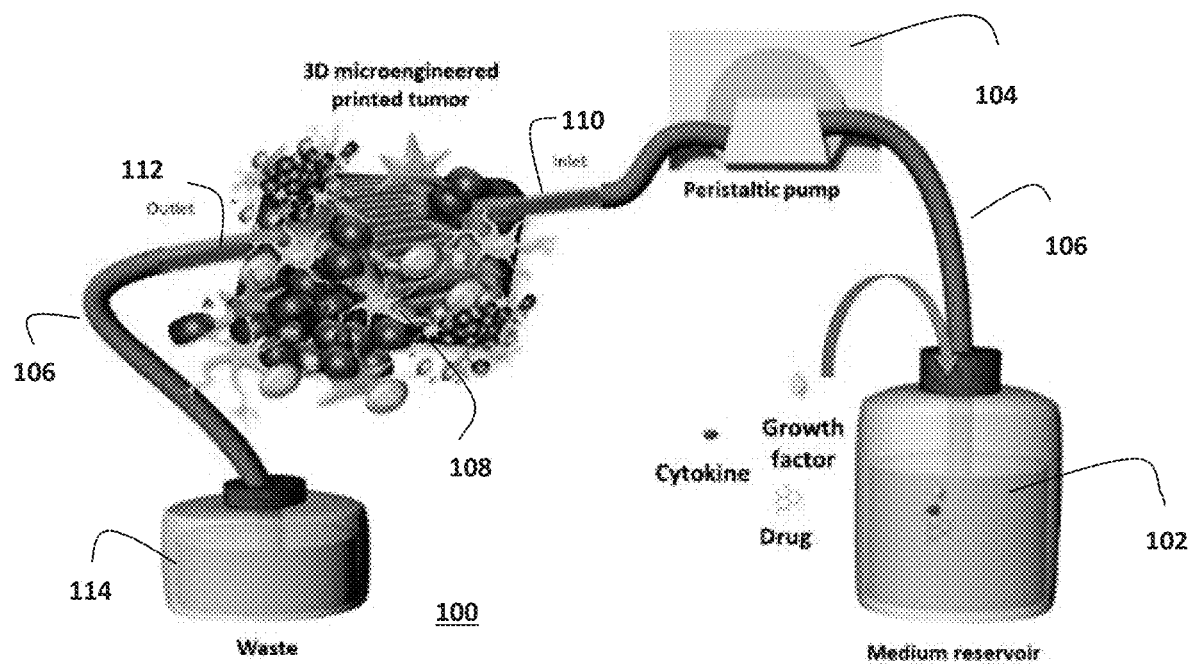

FIG. 14 presents images of bioprinting steps of a fibrinogen-containing bioink formulation according to some embodiments of the present invention, with human glioblastoma U87 cells (upper panel) and of the obtained 3D-printed model, where cell are shown in green. FIG. 15 presents a schematic illustration of an exemplary microfluidic system 100 that perfuses cellular media and/or drugs through a 3D-printed tumor model according to some embodiments of the present invention.

Figure 16:
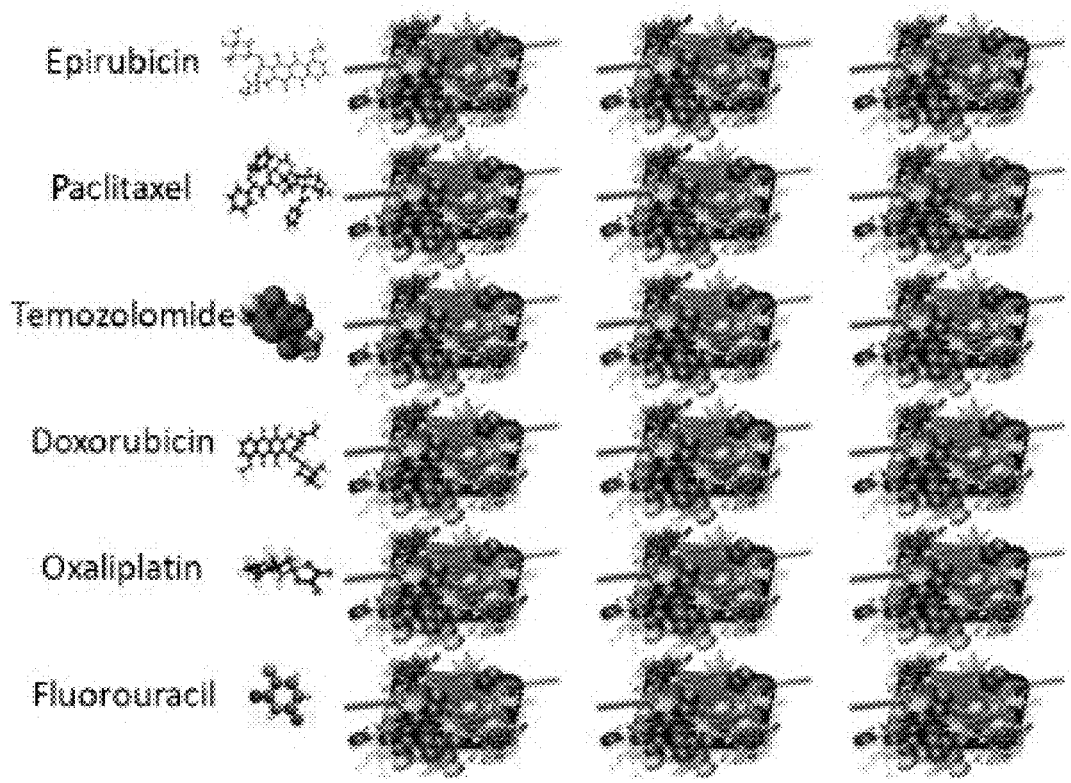
Figure 17A:
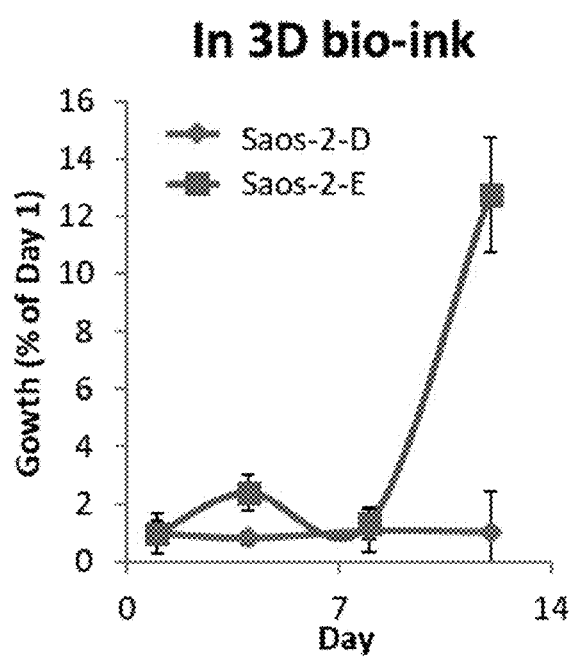
Figure 17B:
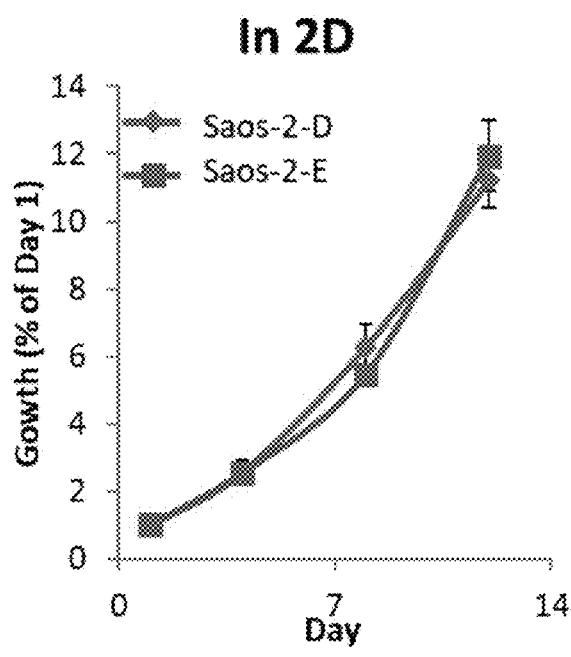

FIG. 16 presents a schematic illustration of a drug screening array with a 3D-printed tumor model according to some embodiments of the present invention. FIGS. 17A-B present comparative plots of primary osteogenic sarcoma cells: Saos-2-Dormant (D) and Saos-2-E (fast-growing) proliferation in a 3D tumor model (FIG. 17A) and in 2D model (FIG. 17B). Dormant and aggressive osteosarcoma cells at $10^6$ cells/ml were seeded in fibrin hydrogels (gelatin 15% w/v, Th 1 U/ml) for 14 days and measured with PrestoBlue (Thermo Fisher Scientific).

Figure 18:
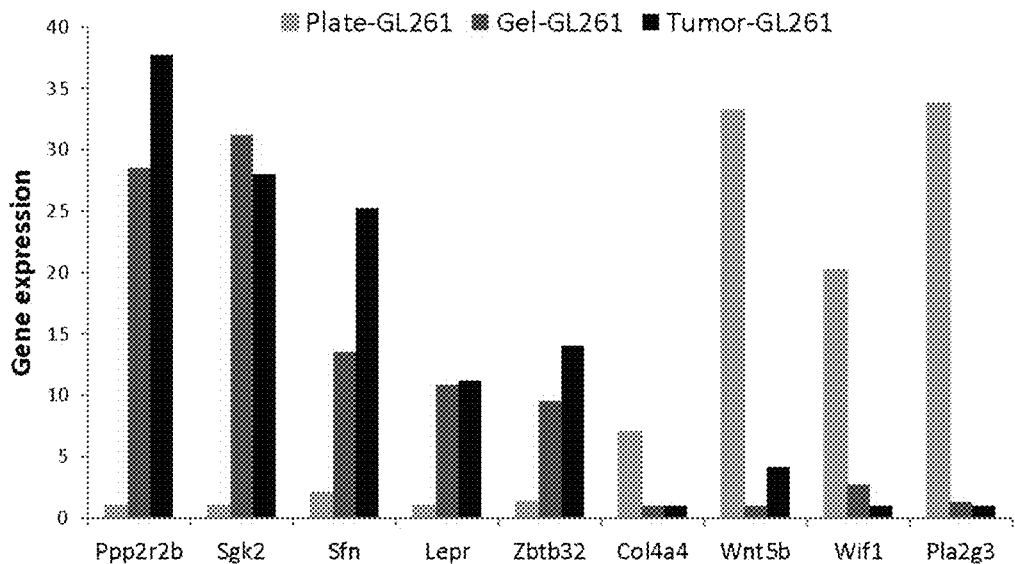

FIG. 18 presents gene expression results obtained by Nanostring, demonstrating different genes expression patterns of GL261 glioblastoma cells in 2D model, 3D model and in vivo.

Figure 19:
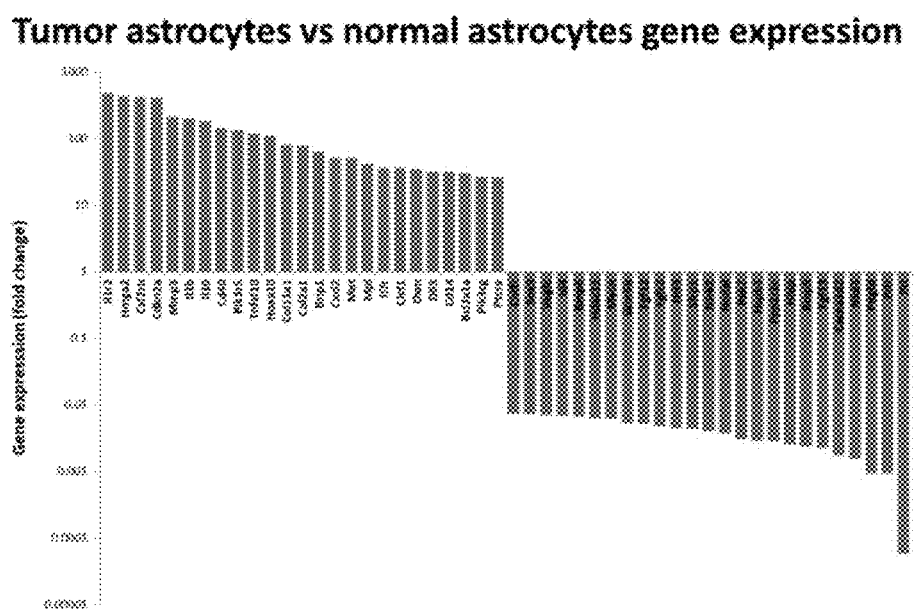

FIG. 19 presents gene expression results obtained by Nanostring, demonstrating differential genes expression between Naïve and tumor associated astrocytes.

Figure 20:
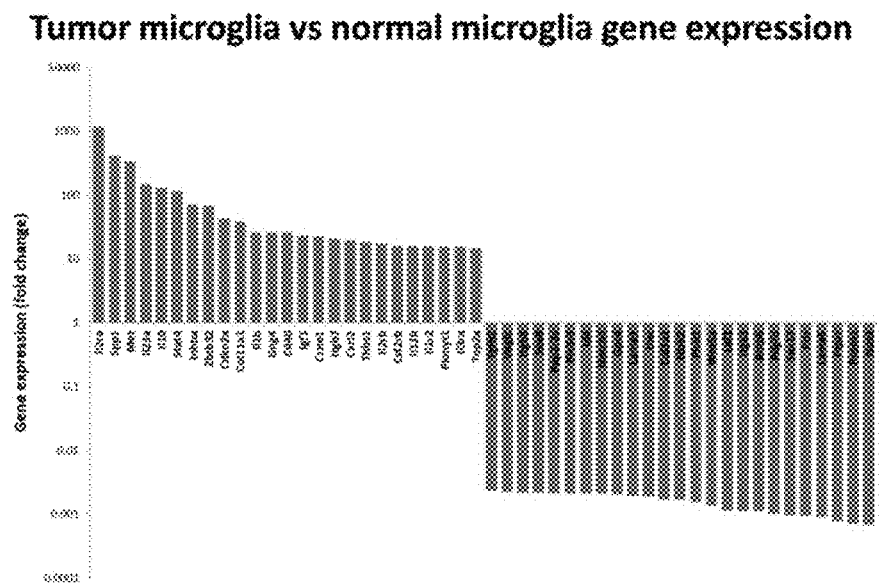

FIG. 20 presents gene expression results obtained by Nanostring, demonstrating differential genes expression between Naïve and tumor associated microglia.

Figure 21:
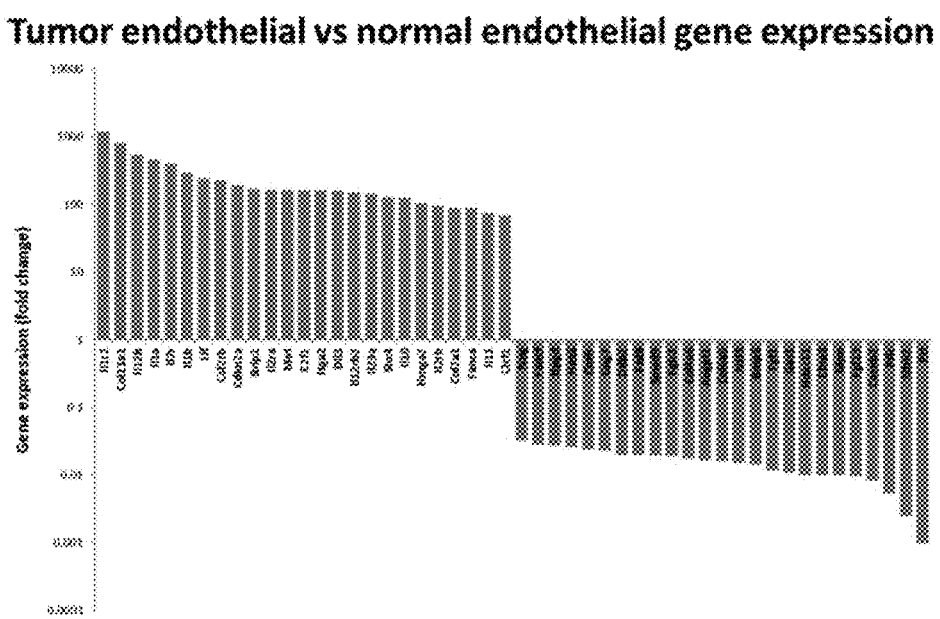

FIG. 21 presents gene expression results obtained by Nanostring, demonstrating differential genes expression between Naïve and tumor-associated brain endothelial cells.

Figure 22:
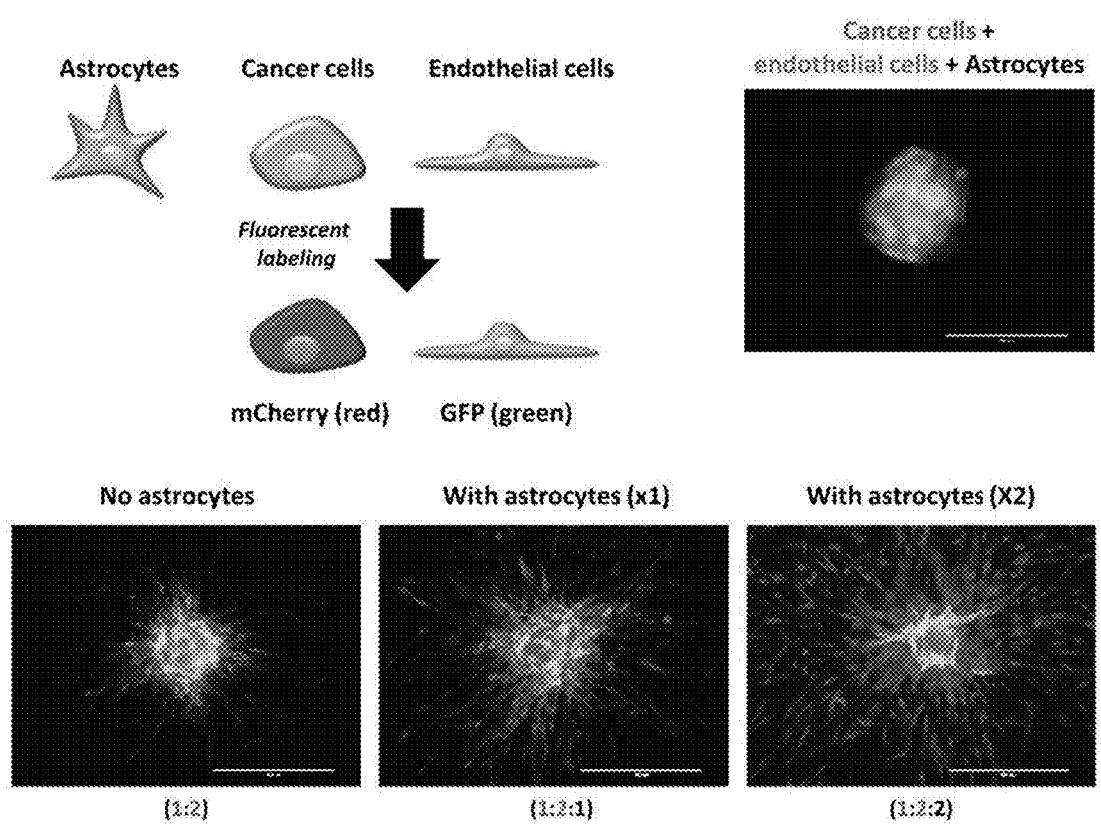

FIG. 22 describes a 3D tumor model comprising malignant and non-malignant cells of a glioblastoma obtained by the hanging drop method, according to exemplary embodiments of the present invention.

DESCRIPTION OF SPECIFIC EMBODIMENTS OF THE INVENTION

The present invention, in some embodiments thereof, relates to tumor modeling and, more particularly, but not exclusively, to three-dimensional tumor models featuring structural and functional properties in high match of a respective tumor in a subject, to methods of manufacturing same and to uses thereof in, for example, research and personalized therapy.

Embodiments of the invention relate to a method of additive manufacturing of a 3D tumor model that senses and responds to its microenvironment. This tumor model can be composed of multiple cell types with different extracellular matrices; taking into consideration the surrounding microenvironment, including, for example, blood vessels and stroma consisting of fibroblasts and immune cells. It is patterned based on a 3D intravital imaging data (e.g. MRI or a CT scan), such that it can closely mimic the actual natural anatomical structure, environment and conditions under which a malignant tumor grows. Such a 3D model of the tumor can be used in various research and clinical applications including gaining in depth insight into tumor development, drug development and personalized therapy.

Figure 1:
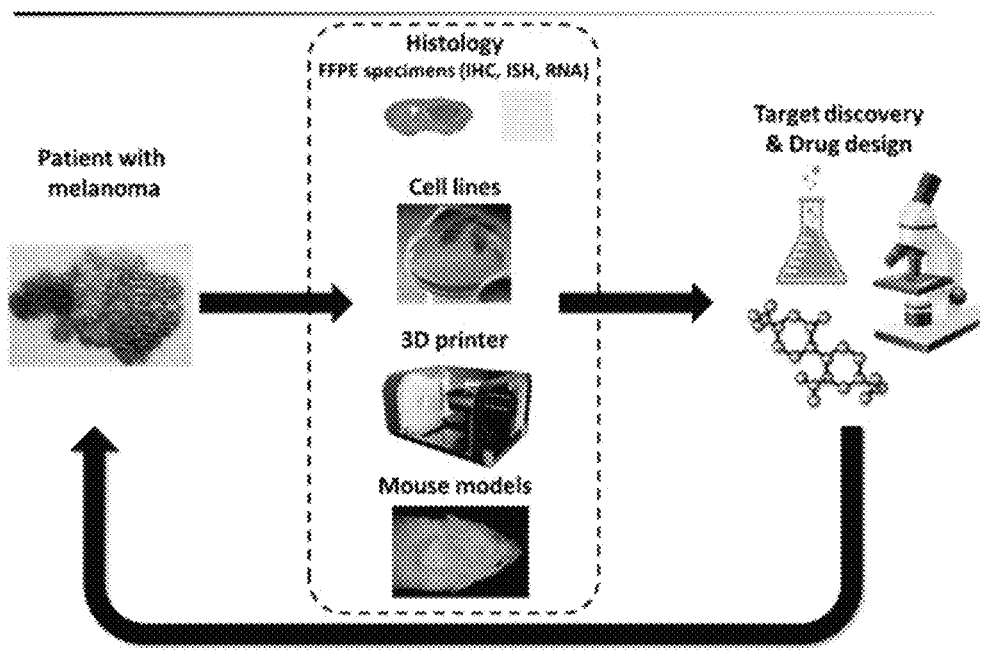
FIG. 1 is a schematic illustration showing various approaches for target discovery and drug design that can be used in addition to 3D tumor printing.
Figure 2:
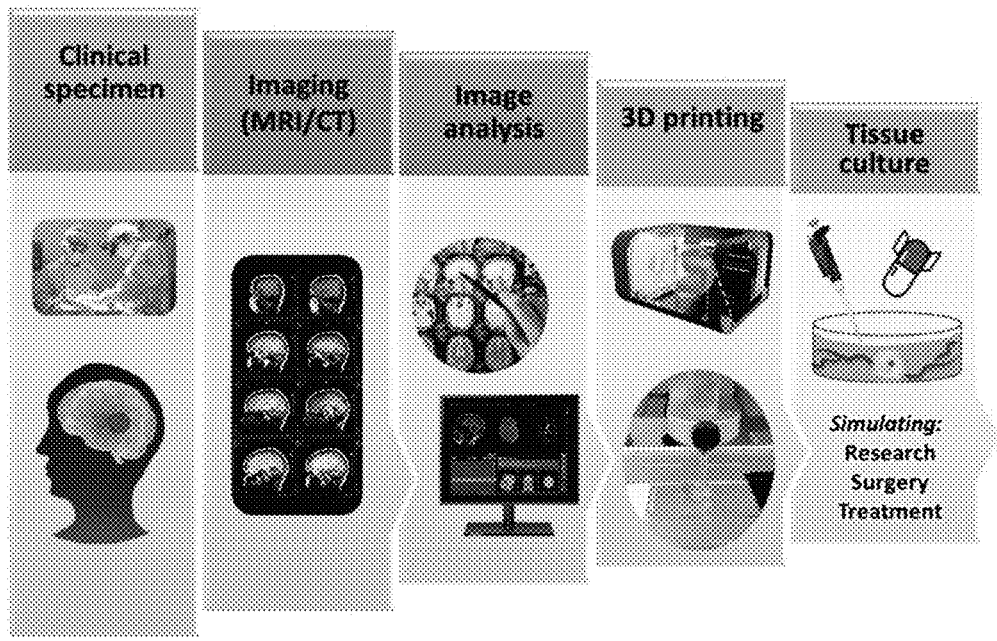
FIG. 2 is a schematic illustration showing acquiring a digitized 3D model of the region of interest (ROI) of the patient's tumor and surrounding environment according to some embodiments of the invention.

FIG. 1 presents a schematic illustration showing various approaches for target discovery and drug design that can be used in addition to 3D tumor printing in exemplary embodiments, schematically illustrated in FIG. 2, the additive manufacturing (AM) bioprinting process begins with a biopsy of a tumor or tissue from a patient. Then, cells are isolated, cultured and propagated. The cells are then mixed with acellular, preferably liquid, more preferably curable, materials, such as hydrogels or hydrogel-forming materials, which provide oxygen and other nutrients that maintain cell viability. The resulting 'bio-ink' is then fed into a 3D printer cartridge and the 3D printer dispenses the cell-laden ink layer by layer, to thereby manufacture a 3D tissue model.

3D tumor models prepared according to this methodology can be formed within hours in replicates.

As used herein "full match HLA" refers to 100% identical HLA alleles. Embodiments of the invention relate to 3D tumor models which comprise cells derived from a single donor.

These tumors are microengineered based on in vivo imaging data, and their 3D structure features a high match to their original architecture. These tumor models may further comprise one or more natural and synthetic materials, such as polymeric materials that form printable hydrogels.

Such 3D tumor models may find various uses in drug screening and personalized therapy. For example, several drugs (as monotherapy or combination therapies) can be tested on them within days—a process that is useful in cases of aggressive tumors. Furthermore, in contrast to the use of animal models that are exploited nowadays, ex-vivo simulations avoid the effects of the non-human host (e.g., mouse) living environment and its immune deficiency such as the case of patient-derived xenografts (PDX) implanted in severe combined immunodeficiency (SCID) mice.

Table 1 below summarizes the advantages of 3D-tumor models obtained by additive manufacturing, AM (e.g., 3D-printed tumors) over the currently available cancer models for basic and translational research:

uncured materials which form the final object, namely, one or more uncured modeling material formulation(s), and optionally also uncured materials used to form a support, namely uncured support material formulations.

An uncured building material can comprise one or more modeling formulations, and can be dispensed such that different parts of the object are made upon curing different modeling formulations, and hence are made of different cured modeling materials or different mixtures of cured modeling materials.

The method of the present embodiments manufactures three-dimensional objects in a layer-wise manner by forming a plurality of layers in a configured pattern corresponding to the shape of the object.

Each layer is formed by an additive manufacturing apparatus which scans a two-dimensional surface and patterns it. While scanning, the apparatus visits a plurality of target locations on the two-dimensional layer or surface, and decides, according to a pre-set algorithm, for each target location or a group of target locations, whether or not the target location or group of target locations is to be occupied by a building material, and which type of a building material is to be delivered thereto. The decision is made according to a computer image of the surface.

TABLE 1

|  | 2D culture | 3D culture/organoids | Patient derived xenografts (PDX) | 3D-printed tumors |
|---|---|---|---|---|
| Anatomical matchability | − | − | − | + |
| Host/stromal compartments | Any source (e.g., human/murine) | Any source (e.g., human/murine) | murine | Any source (e.g., human/murine) |
| Tumor microenvironment | − | + | + | + |
| Immune cells | + | + | − | + |
| Studying the effect of the immune response | − | − | − | + |
| Flow and circulation | − | − | + | + |
| Analyzing the molecular basis of tissue function | − | − | + | + |
| Consistency in size and shape | − | − | − | + |
| Cultivating cells of artificial plastic surfaces | + | − | − | − |
| Requires animal models | − | − | + | − |
| Time to achieve ample tumor model samples | N/A | Short (weeks) | Long (6-9 months) | Short (hours) |

Additive Manufacturing:

According to an aspect of some embodiments of the present invention, there is provided a method of additive manufacturing (AM) of a three-dimensional object. According to some embodiments of this aspect, the method is effected by sequentially forming a plurality of layers in a configured pattern corresponding to the shape of the object, thereby forming the object. According to some embodiments of this aspect, formation of each layer is effected by dispensing at least one uncured building material, and exposing the dispensed building material to a curing condition to thereby form a hardened (cured) material.

Herein throughout, the phrase "uncured building material" or "uncured building material formulation" collectively describes the materials that are used to sequentially form the layers, as described herein. This phrase encompasses When the AM is by three-dimensional inkjet printing, an uncured building material, as defined herein, is dispensed from a dispensing head having a set of nozzles to deposit building material in layers on a supporting structure. The AM apparatus thus dispenses building material in target locations which are to be occupied and leaves other target locations void. The apparatus typically includes a plurality of dispensing heads, each of which can be configured to dispense a different building material (for example, different modeling material formulations, each containing a different cell type). Thus, different target locations can be occupied by different building materials (e.g., a modeling formulation and/or a support formulation, as defined herein).

The final three-dimensional object is made of the modeling material or a combination of modeling materials or a combination of modeling material/s and support material/s or modification thereof (e.g., following curing). All these operations are well-known to those skilled in the art of additive manufacturing (also known as solid freeform fabrication).

In some exemplary embodiments of the invention, an object is manufactured by dispensing a building material that comprises two or more different modeling material formulations, each modeling material formulation from a different dispensing head of the AM apparatus. The modeling material formulations are, optionally and preferably, deposited in layers during the same pass of the printing heads. The modeling material formulations and/or combination of formulations within the layer are selected according to the desired properties of the object.

An exemplary 3D printing method according to some embodiments of the present invention starts by receiving 3D printing data corresponding to the shape of the object. The data can be received, for example, from a host computer which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY), Digital Imaging and Communications in Medicine (DICOM) or any format suitable for Computer-Aided Design (CAD).

The method continues by dispensing droplets of the uncured building material as described herein in layers, on a receiving medium, using one or more printing heads, according to the printing data. The receiving medium can be a tray of a printing system or a previously deposited layer.

Once the uncured building material is dispensed on the receiving medium according to the 3D printing data, the method optionally and preferably continues by exposing the deposited layers to a curing condition. Preferably, the curing condition is applied to each individual layer following the deposition of the layer and prior to the deposition of the previous layer.

Exposure to a curing condition is typically performed using a curing energy source which can be, for example, a radiation source, such as an ultraviolet or visible or infrared lamp, or other sources of electromagnetic radiation, or electron beam source, depending on the modeling material formulation(s) being used. The curing energy source serves for curing or solidifying (hardening) at least the modeling material formulation(s). Alternatively, a curing condition can include a presence of a chemical or biological reagent that promotes curing.

Some AM processes according to the present embodiments involve dispensing materials (e.g., hydrogels, for example, pluronic hydrogels) without exposing these materials to curing energy but rather to a curing condition as defined herein. Such hydrogels can harden, for example, in the presence of calcium ions or when a formulation containing same is cooled.

Some embodiments contemplate the fabrication of an object by dispensing different formulations from different dispensing heads. These embodiments provide, inter alia, the ability to select formulations from a given number of formulations and define desired combinations of the selected formulations and their properties. According to the present embodiments, the spatial locations of the deposition of each formulation with the layer are defined, either to effect occupation of different three-dimensional spatial locations by different formulations, or to effect occupation of substantially the same three-dimensional location or adjacent three-dimensional locations by two or more different formulations so as to allow post deposition spatial combination of the formulations within the layer.

The present embodiments thus enable the deposition of a broad range of material combinations, and the fabrication of an object which may consist of multiple different combinations of modeling material formulations, in different parts of the object, according to the properties desired to characterize each part of the object.

A printing system utilized in additive manufacturing may include a receiving medium and one or more printing heads. The receiving medium can be, for example, a fabrication tray that may include a horizontal surface to carry the material dispensed from the printing head. The printing head may be, for example, an ink jet head having a plurality of dispensing nozzles arranged in an array of one or more rows along the longitudinal axis of the printing head. The printing head may be located such that its longitudinal axis is substantially parallel to the indexing direction. The printing system may further include a controller, such as a microprocessor to control the printing process, including the movement of the printing head according to a pre-defined scanning plan (e.g., a CAD configuration converted to a Standard Tessellation Language (STL) format and programmed into the controller). The printing head may include a plurality of jetting nozzles. The jetting nozzles dispense material onto the receiving medium to create the layers representing cross sections of a 3D object.

In addition to the printing head, there may be a source of curing energy, for curing the dispensed building material. The curing energy is typically radiation, for example, UV radiation or heat radiation. Alternatively, there may be means for providing a curing condition other than electromagnetic or heat radiation, for example, means for cooling the dispensed building material of for contacting it with a reagent that promotes curing.

Additionally, the printing system may include a leveling device for leveling and/or establishing the height of each layer after deposition and at least partial solidification, prior to the deposition of a subsequent layer.

According to the present embodiments, the additive manufacturing method described herein is for bioprinting a biological object.

As used herein, "bioprinting" means practicing an additive manufacturing process, preferably a 3D-inkjet printing process or extrusion printing, while utilizing one or more bio-ink formulation(s) that comprises cells or cellular components (e.g., cell solutions, cell-containing gels, cell suspensions, cell concentrations, multicellular aggregates, multicellular bodies, etc.) via methodology that is compatible with an automated or semi-automated, computer-aided, additive manufacturing system as described herein (e.g., a bioprinter or a bioprinting system).

Herein throughout, in the context of bioprinting, the term "object" is also referred to herein interchangeably as "model" or "model object" describes a final product of the additive manufacturing which comprises, in at least a portion thereof, cellular components. This term refers to the product obtained by a bioprinting method as described herein, after removal of the support material, if such has been used as part of the uncured building material. In some embodiments, the cellular components include cells having full match HLA.

The term "object" as used herein throughout refers to a whole object or a part thereof.

In the context of the present embodiments, the term "object" refers to an engineered 3D model of a tumor (e.g., 3D-bioprinted tumor model or 3D-bioprinted model of a tumor), whereby the tumor model comprises malignant cells, and, optionally and preferably, non-malignant cells, having full match HLA, such that the tumor model represents also the tumor microenvironment.

Accordingly, in some embodiments, the term "object" describes a region of interest (ROI) which comprises a tumor and optionally and preferably also the tumor's microenvironment (the microenvironment that surrounds the tumor).

As used herein, "microenvironment" or "stroma" refers to the connective, supportive framework of a biological cell, tissue, or organ. Examples of stromal cells include, but are not limited to, fibroblasts, endothelial cells, adipocytes, microglia, glia, astrocytes, pericytes, smooth muscle cells and neurons and immune cells. According to a specific embodiment, the 3D model comprises tumor cells and at least 1 of-, 2 of- (e.g., fibroblasts and endothelial cells, glia and endothelial cells, fibroblasts and glia), 3 of- (e.g., fibroblasts, glia and endothelial cells), 4 of-, 5 of or more. As used herein, "tissue" means an aggregate of cells and comprising vascularization, which supplies blood and nutrients.

In addition to malignant cells, the tumor microenvironment also includes nonmalignant cells, secreted proteins, and blood vessels that surround and support the growth of the tumor. Interactions between the various components of the tumor microenvironment are significant; tumor cells can change the nature of the microenvironment, and conversely, the microenvironment can affect how a tumor grows and spreads. The structure and composition of the tumor microenvironment varies among different types of cancers and between patients. A model representing the tumor microenvironment is therefore beneficial in the context of, for example, personalized medicine.

Herein throughout, the phrase "modeling material formulation", which is also referred to herein interchangeably as "modeling formulation" or "modeling material composition" or "modeling composition", describes a part or all of the uncured building material which is dispensed so as to form the object, as described herein. The modeling formulation is an uncured modeling formulation, which, upon exposure to a curing condition, forms the object or a part thereof.

In the context of bioprinting, an uncured building material comprises at least one modeling formulation that comprises one or more cells (e.g., tumor cells and microenvironment thereof, as defined herein) as described herein, and is also referred to herein and in the art as "bio-ink" or "bio-ink formulation".

In some embodiments, the bioprinting comprises sequential formation of a plurality of layers of the uncured building material in a configured pattern, preferably according to a three-dimensional printing data, as described herein. At least one, and preferably most or all, of the formed layers comprise(s) a cellular component, preferably a plurality of cellular components, as described herein. Optionally, at least one of the formed layers comprises one or more curable materials, preferably biocompatible curable materials which do not interfere with the biological and/or structural features of the cellular components in the bio-ink.

In some embodiments, the one or more curable materials comprise a material being exogenous to the tumor or its surrounding environment (region of interest (ROI)).

As used herein "exogenous" refers to a material that is non-naturally present in the tumor or its surrounding environment within the subject, and further encompasses a material that is not derived from the subject or is not inherently present in the subject.

In some embodiments, the curable material comprises a synthetic material, or a material that forms a synthetic material upon exposure to a curing condition as described herein.

By "synthetic material" it is meant a material that is not inherently present in the tumor or its environment, or in the subject in general. This term encompasses materials that are obtained from a source that is other than the tumor and its environment, and optionally a source that is other than the subject afflicted with the tumor. This term encompasses biological and non-biological materials, naturally-occurring and non-naturally occurring materials, and synthetically prepared materials.

In some embodiments, a three-dimensional printing data that is readable by the bioprinting system is generated based on a three-dimensional imaging data, as described herein.

In some embodiments, the bio-ink (uncured building material) comprises a cell suspension as described herein, which comprises a plurality of cell types.

According to an aspect of some embodiments of the present invention there is provided a method of bioprinting a model of a tumor of a subject, the method comprising:
 (a) imaging the tumor to acquire a 3D model of the tumor and optionally a surrounding environment of the tumor, that is, for example, employing a three-dimensional medical imaging technique to thereby acquire a three-dimensional imaging data of the tumor and optionally its surrounding environment (ROI);
 (b) ex-vivo dissociating the tumor and optionally its surrounding environment so as to obtain a cell suspension comprising a plurality of cell types; and
 (c) subjecting the cell suspension to bioprinting according to the 3D model (or 3D imaging data) so as to obtain a 3D model of the tumor (and optionally its surrounding environment).

In some embodiments, the bioprinting comprises receiving a 3D printing data and forming the layers in accordance with the 3D printing data, whereby the 3D printing data is generated based on the 3D imaging data. Thus, the 3D model of the tumor features a 3D arrangement (structure, architecture) that has at least 70%, at least 80%, at least 90%, at least 95%, at least 98%, at least 99% or higher, match with the 3D imaging data.

Determining a match to the 3D imaging data can be made by determining the % of voxels in the bioprinted tumor that are identical to voxels of the 3D imaging data and/or comparing other coordinates or parameters of the bioprinted tumor model to corresponding coordinates and/or parameters of the 3D imaging data.

Alternatively, or in addition, the matchability to the 3D imaging data can be determined by the quality of the polymeric scaffold and its ability to mimic the anatomical structure of the tumor. The parameters tested for validation include, for example, swelling capabilities, elasticity, mechanical strength, porosity, etc. Methods of determining such parameters are well-known to those skilled in the art and some exemplary methods are described in the Examples section that follows.

In some embodiments, imaging the tumor is effected using a medical imaging technique as described herein. The imaging can be effected in vivo or ex vivo (upon dissecting the tumor or a portion thereof).

The bioprinting method described herein meets an essential requirement for reproducing the complex, heterogeneous architecture of the tumor upon a comprehensive understanding of the composition and organization of its components. This is achieved by utilizing medical imaging technologies/techniques which can provide the required information on 3D structure and function at the cellular, tissue, organ and organism levels. These technologies include most noninvasive imaging modalities, the common being computed tomography (CT), or μCT, and magnetic resonance imaging (MRI), or μMRI, though other imaging technologies can be used e.g., ultrasound, X-ray. Computer-aided design and computer-aided manufacturing (CAD-CAM) tools and mathematical modeling are also used to collect and digitize the complex tomographic and architectural information for tissues (3). For example, MRI/CT imaging is used to acquire an accurate digital 3D model of the region of interest (ROI) of the patient's tumor and its surrounding microenvironment. MRI provides high spatial resolution in soft tissue, with the advantage of increased contrast resolution, which is useful for imaging soft tissues in close proximity to each other.

In some embodiments, at least a portion of the tumor is removed from a subject and is thereafter dissociated, such that the method comprises, prior to dissociating the tumor, removing a portion of the tumor, and optionally a surrounding environment of the tumor, from a subject. This can be done by means of a surgery, a biopsy, and any other acceptable means. Obtaining the 3D imaging data can be made prior to or subsequent to removing the tumor or a portion thereof.

In some embodiments, dissociating the tumor (or a portion thereof and/or a surrounding environment thereof) is effected by enzymatic dissociation and/or mechanical dissociation.

The obtained cell suspension is then used as a bio-ink or a part thereof as described herein in a selected bioprinting method and a corresponding bioprinting system, for example, as described herein, optionally in combination with one or more acellular curable materials, for example as described herein.

In some embodiments of the present invention, from each tumor sample collected, e.g., during surgery, the tumor is partially recreated by 3D bioprinting as presented herein, and, in addition, cells are isolated for tissue culture, a piece of the tumor is implanted in SCID mice as patient-derived xenograft (PDX), and/or formalin-fixed paraffin-embedded (FFPE) slides are created for histology (as shown in FIG. 1). All these models (a combination of a bioprinted model of the tumor and one or more of the above-mentioned and optionally other models) can provide a picture that better mimics the clinical setting.

In some embodiments, the bioprinting comprises transferring the obtained 3D imaging data to a 3D printing data readable by a bioprinting system usable in the bioprinting.

In some embodiments, the bioprinting comprises sequentially forming a plurality of layers on a receiving medium in a configured pattern corresponding to said 3D printing data, such that at least one of the layers comprises cells of the cell suspension.

In some embodiments, at least one of the layers comprises a synthetic curable material, or a curable material that forms a synthetic material, as described herein, upon exposure to a curing condition as described herein.

In some embodiments, the curable material is an acellular curable material.

In some embodiments, the curable (e.g., synthetic) material and the 3D printing data are selected or designed so as to provide a chemical, physical and/or mechanical property to the 3D tumor model. In some embodiments, the bioprinting further comprises exposing at least one layer which comprises the curable material to a curing condition (e.g., curing energy), to thereby provide a hardened synthetic (e.g., exogenous and/or acellular, as defined herein) material.

In some embodiments, the hardened synthetic material provides a chemical, physical and/or mechanical property to the 3D tumor model.

In some embodiments, the curable material (e.g., which provides a hardened synthetic material, preferably an exogenous material) and the 3D printing data are selected so as to provide a chemical, physical and/or mechanical property at a pre-determined target location in the 3D tumor model, in accordance with the printing data.

In some embodiments, a method as described herein further comprises characterizing the obtained tumor model, for example, by isolating cells of the tumor model; and in vitro or in vivo culturing the cells.

Referring now to the Drawings, FIG. 2 presents an exemplary bioprinting method according to exemplary embodiments of the present invention. As shown in FIG. 2, the method starts with removing a clinical specimen (a portion of a tumor in a subject), and performing 3D imaging of the tumor and its surrounding environment. Then, the obtained 3D imaging data is analyzed and transferred to a readable 3D printing data. Bioprinting is effected as described herein, and the obtained tumor model is subjected to culturing medium and used for characterization, and/or for research, and/or for determining a suitable anti-cancer regimen, and/or simulating surgical skills as described herein.

In some of any of the embodiments described herein, the bioprinting method is configured to effect formation of the layers under conditions that do not significantly affect structural and/or functional properties of the cellular components in the bio-ink.

In some embodiments, a bioprinting system for effecting a bioprinting process/method as described herein is configured so as to allow formation of the layers under conditions that do not significantly affect structural and/or functional properties of the cellular components in the bio-ink.

In some embodiments, the acellular curable materials and/or the curing condition applied to effect curing are selected such that they do not significantly affect structural and/or functional properties of the cellular components in the bio-ink.

Bioprinting Techniques:

A bioprinting method and a corresponding system can be any of the methods and systems known in the art for performing additive manufacturing, and exemplary such systems and methods are described hereinabove. A suitable method and system can be selected upon considering its printing capabilities, which include resolution, deposition speed, scalability, bio-ink compatibility and ease-of-use.

Exemplary suitable bioprinting systems usually contain a temperature-controlled material handling with a dispensing system and stage (a receiving medium), and a movement along the x, y and z axes directed by a CAD-CAM software. A curing source (e.g., a light or heat source) which applies a curing energy (e.g., by applying light or heat radiation) or a curing condition to the deposition area (the receiving medium) so as to promote curing of the formed layers and/or a humidifier, can also be included in the system. There are printers that use multiple dispensing heads to facilitate a serial dispensing of several materials.

In some embodiments, the printing provides a printed tumor featuring a plurality of voxel blocks, and at least 70%, at least 80%, at least 90%, or more, as described herein, of these voxel blocks are identical to corresponding voxel blocks of the 3D imaging data used for generating the 3D printing data.

Generally, bioprinting can be effected using any of the known techniques for additive manufacturing. The following lists some exemplary additive manufacturing techniques, although any other technique is contemplated.

3D Inkjet Printing:

3D Inkjet printing is the most commonly used type of 3D printer for both non-biological and biological (bioprinting) applications. Inkjet printers use thermal or acoustic forces to eject drops of liquid onto a substrate, which can support or form part of the final construct. In this technique, controlled volumes of liquid are delivered to predefined locations, and a high-resolution printing with precise control of (1) ink drops position, and (2) ink volume, which is beneficial in cases of microstructure-printing or when small amounts of bioreactive agents or drugs are added, is received (7). Inkjet printers can be used with several types of ink i.e., to use multiple types of cells and ECMs as well as multiple bioactive agents. Furthermore, the printing is fast and can be applied onto culture plates.

A bioprinting method that utilizes a 3D inkjet printing system can be operated using one or more bio-ink modeling material formulations as described herein, and dispensing droplets of the formulation(s) in layers, on the receiving medium, using one or more inkjet printing head(s), according to the 3D printing data.

Extrusion Printing:

This technique uses continuous beads of material rather than liquid droplets. These beads of material are deposited in 2D, the stage (receiving medium) or extrusion head moves along the z axis, and the deposited layer serves as the basis for the next layer. The most common methods for biological materials extrusion for 3D bioprinting applications are pneumatic (8, 9) or mechanical (10, 11) dispensing systems. The main advantage of this technique is the ability to deposit very high cell densities. Extrusion bioprinters have been used to construct multiple tissue types, amongst them aortic valves and branched vascular trees as well as for in-vitro pharmacokinetic profiles and tumor modeling (3). The downside of extrusion bioprinting is that fabrication time is relatively slow when printing high-resolution complexed structures.

Laser-Assisted Printing:

Laser-assisted printing (also known as laser-assisted stereolithography) technique is based on the principle of laser-induced forward transfer, which was developed to transfer metals and is now successfully applied to biological material. The device consists of a laser beam, a focusing system, a ribbon that has a donor transport support (usually made of glass) that is covered with a laser energy absorbing layer (e.g., gold or titanium), a biological material layer (e.g., cells and/or hydrogel) and a receiving substrate facing the ribbon (3). A laser assisted printer operates by shooting a laser or a binding material at a bed of powder and solidifying it in a highly specific pattern. As the laser or binding agent moves through the powder, layer by layer, it builds a solid structure embedded in powder, which is dusted off when the job is done (3).

Laser associated printing is compatible with a series of viscosities and can print mammalian cells without affecting cell viability or cell function. Cells can be deposit at a density of up to $10^8$ cells/ml with microscale resolution of a single cell per drop (12, 13).

Electro Spinning:

Electrospinning is a fiber production technique, which uses electric force to draw charged threads of polymer solutions, or polymer melts. This cell-laden printing could provide an approach to create small diameter capillary-like blood vessels (14). Another printing technique uses a supporting bath which contains sacrificial hydrogel as a thermoreversible mold to embed the printing of the desired structure from another hydrogel (15). The supporting bath can be made of the Pluronic family of hydrogels or Gelatin.

In some of any of the embodiments described herein, the bioprinting comprises, or consists of, 3D-inkjet printing, as is well-known in the art and is described herein.

Modeling Material Formulations (Bio-Ink):

The bioink, according to some of the present embodiments, comprises a cell suspension comprising a plurality of cellular components. In some embodiments, the cell suspension comprises a plurality of cell types, as described herein. Preferably, the cells have a full HLA match, and may comprise malignant cells and non-malignant cells.

In some embodiments, the cell suspension comprises a plurality of cell suspensions fractionating a plurality of cell types.

In some embodiments, the cell suspension comprises adherent cells (e.g., tissue forming cells) and non-adherent cells (e.g., blood cells), extracellular matrix, etc.

In some embodiments, the cell suspension comprises an extracellular matrix.

In exemplary embodiments, the plurality of cell types comprises tumor cells and stromal cells which may contain, depending on the origin of the tumor sample, endothelial cells, immune cells, fibroblasts, astrocytes, microglia, neurons, keratinocytes (skin), epithelial cells, hepatocytes (liver), beta islets (pancreas) and connective tissue e.g., cartilage.

For example, a cell suspension is fractionated into a plurality of suspensions, each comprising a different cell type or two or more different cell types, and/or such that each suspension comprises a different composition of cellular components. The bioprinting is effected by dispensing each cell suspension from a different printing head (e.g., a different nozzle in 3D bioprinting).

In some embodiments, the bio-ink further comprises one or more curable materials.

In some embodiments, the curable material is, or is selected so as to form, a synthetic material as defined herein (e.g., acellular; exogenous; non-biological material as defined herein).

In some embodiments, the bio-ink further comprises a non-cellular (acellular) curable material that forms, upon curing, a synthetic (e.g., exogenous) material as defined herein.

Herein throughout, a "curable material" is a compound (monomeric or oligomeric or polymeric compound) which, when exposed to a curing condition, as described herein, solidifies or hardens to form a cured modeling material as defined herein. Curable materials are typically polymerizable materials, which undergo polymerization and/or cross-linking when exposed to a suitable curing condition or a suitable curing energy (a suitable energy source). Alternatively, curable materials are thermo-responsive materials, which solidify or harden upon exposure to a temperature change (e.g., heating or cooling). Optionally, curable materials are made of small particles (e.g., nanoparticles or nanoclays) which can undergo curing to form a hardened material. Further optionally, curable materials are biological materials which undergo a reaction to form a hardened or solid material upon a biological reaction (e.g., an enzymatically-catalyzed reaction).

In some embodiments, a "curing condition" encompasses a curing energy (e.g., temperature, radiation) and/or a material or reagent that promotes curing.

In some of any of the embodiments described herein, a curable material is a photopolymerizable material, which polymerizes or undergoes cross-linking upon exposure to radiation, as described herein, and in some embodiments the curable material is a UV-curable material, which polymerizes or undergoes cross-linking upon exposure to UV-vis radiation, as described herein.

In some of any of the embodiments described herein, a curable material can be a monomer, an oligomer or a short-chain polymer, each being polymerizable as described herein.

In some of any of the embodiments described herein, when a curable material is exposed to a curing condition (e.g., radiation, reagent), it polymerizes by any one, or combination, of chain elongation or entanglements and cross-linking. The cross-linking can be chemical and/or physical.

In some of any of the embodiments described herein, a curable material is a monomer or a mixture of monomers which can form a polymeric modeling material upon a polymerization reaction, when exposed to a curing condition at which the polymerization reaction occurs. Such curable materials are also referred to herein as monomeric curable materials.

In some of any of the embodiments described herein, a curable material is an oligomer or a mixture of oligomers which can form a polymeric modeling material upon a polymerization reaction, when exposed to a curing condition at which the polymerization reaction occurs. Such curable materials are also referred to herein as oligomeric curable materials.

In some of any of the embodiments described herein, a curable material is or comprises a hydrogel, as defined herein, which can form a hardened modeling material, typically upon further cross-linking and/or co-polymerization, when exposed to a curing condition at which the cross-linking and/or co-polymerization reaction occurs. Such curable materials are also referred to herein as hydrogel curable materials.

In some of any of the embodiments described herein, a curable material is or comprises a hydrogel forming material, as defined herein, which can form a hydrogel as a hardened modeling material, typically upon cross-linking, polymerization and/or co-polymerization, when exposed to a curing condition at which the cross-linking, polymerization and/or co-polymerization reaction occurs. Such curable materials are also referred to herein as hydrogel-forming curable materials.

Herein and in the art, the term "hydrogel" describes a three-dimensional fibrous network containing at least 20%, typically at least 50%, or at least 80%, and up to about 99.99% (by mass) water. A hydrogel can be regarded as a material which is mostly water, yet behaves like a solid or semi-solid due to a three-dimensional crosslinked solid-like network, made of natural and/or synthetic polymeric chains, within the liquid dispersing medium. According to some embodiments of the present invention, a hydrogel may contain polymeric chains of various lengths and chemical compositions, depending on the precursors used for preparing it. The polymeric chains can be made of monomers, oligomers, block-polymeric units, which are interconnected (crosslinked) by chemical bonds (covalent, hydrogen and ionic/complex/metallic bonds, typically covalent bonds). The network-forming material comprises either small aggregating molecules, particles, or polymers that form extended elongated structures with interconnections (the crosslinks) between the segments. The crosslinks can be in the form of covalent bonds, coordinative, electrostatic, hydrophobic, or dipole-dipole interactions or chain entanglements between the network segments. In the context of the present embodiments, the polymeric chains are preferably hydrophilic in nature.

The hydrogel, according to embodiments of the present invention, can be of biological origin or synthetically prepared.

According to some embodiments of the present invention, the hydrogel is biocompatible, and is such that when a biological moiety is impregnated or accumulated therein, an activity of the biological moiety is maintained, that is, a change in an activity of the biological moiety is no more than 30%, or no more than 20%, or no more than 10%, compared to an activity of the biological moiety in a physiological medium.

Exemplary polymers or co-polymers usable for forming a hydrogel according to the present embodiments include polyacrylates, polymethacrylates, polyacrylamides, polymethacrylamides, polyvinylpyrrolidone and copolymers of any of the foregoing. Other examples include polyethers, polyurethanes, and poly(ethylene glycol), functionalized by cross-linking groups or usable in combination with compatible cross linking agents.

Some specific, non-limiting examples, include: poly(2-vinylpiridine), poly(acrylic acid), poly(methacrylic acid), poly(N-isopropylacrylamide), poly(N,N'-methylenbisacrylamide), poly(N—(N-propyl)acrylamide), poly(methacyclic acid), poly(2-hydroxyacrylamide), poly (ethylene glycol) acrylate, poly (ethylene glycol) methacrylate, and polysaccharides such as dextran, alginate, agarose, and the like, and any co-polymer of the foregoing.

Hydrogel precursors (hydrogel-forming materials) forming such polymeric chains are contemplated, including any combination thereof.

Hydrogels are typically formed of, or are formed in the presence of, di- or tri- or multi-functional monomers, oligomer or polymers, which are collectively referred to as hydrogel precursors or hydrogel-forming agents or hydrogen-forming materials, having two, three or more polymerizable groups. The presence of more than one polymerizable group renders such precursors cross-linkable, and allow the formation of the three-dimensional network.

Exemplary cross-linkable monomers include, without limitation, the family of di- and triacrylates monomers, which have two or three polymerizable functionalities, one of which can be regarded as a cross-linkable functional group. Exemplary diacrylates monomers include, without limitation, methylene diacrylate, and the family of poly (ethylene glycol)$_n$ dimethacrylate (nEGDMA). Exemplary triacrylates monomers include, without limitation, trimethylolpropane triacrylate, pentaerythritol triacrylate, tris (2-hydroxy ethyl) isocyanurate triacrylate, isocyanuric acid tris(2-acryloyloxyethyl) ester, ethoxylated trimethylolpropane triacrylate, pentaerythrityl triacrylate and glycerol triacrylate, phosphinylidynetris(oxyethylene) triacrylate.

Hydrogels may take a physical form that ranges from soft, brittle and weak to hard, elastic and tough material. Soft hydrogels may be characterized by rheological parameters including elastic and viscoelastic parameters, while hard hydrogels are suitably characterized by tensile strength parameters, elastic, storage and loss moduli, as these terms are known in the art.

The softness/hardness of a hydrogel is governed inter alia by the chemical composition of the polymer chains, the "degree of cross-linking" (number of interconnected links between the chains), the aqueous media content and composition, and temperature.

A hydrogel, according to some embodiments of the present invention, may contain macromolecular polymeric and/or fibrous elements which are not chemically connected to the main crosslinked network but are rather mechanically intertwined therewith and/or immersed therein. Such macromolecular fibrous elements can be woven (as in, for example, a mesh structure), or non-woven, and can, in some embodiments, serve as reinforcing materials of the hydrogel's fibrous network. Non-limiting examples of such macromolecules include polycaprolactone, gelatin, gelatin methacrylate, alginate, alginate methacrylate, chitosan, chitosan methacrylate, glycol chitosan, glycol chitosan methacrylate, hyaluronic acid (HA), HA methacrylate, and other non-crosslinked natural or synthetic polymeric chains and the likes. Alternatively, or in addition, such macromolecules are chemically connected to the main crosslinked network of the hydrogel, for example, by acting as a cross-linking agent, or by otherwise forming a part of the three-dimensional network of the hydrogel.

In some embodiments, the hydrogel is porous and in some embodiments, at least a portion of the pores in the hydrogel are nanopores, having an average volume at the nanoscale range. In some of any of the embodiments described herein, a curable material, whether monomeric or oligomeric, can be a mono-functional curable material or a multi-functional curable material.

Herein, a mono-functional curable material comprises one functional group that can undergo polymerization when exposed to a curing condition (e.g., radiation, presence of calcium ions).

A multi-functional curable material comprises two or more, e.g., 2, 3, 4 or more, functional groups that can undergo polymerization when exposed to curing energy. Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric moiety, the multi-functional group is an oligomeric multi-functional curable material.

In some embodiments, curable materials are printed as a scaffold (optionally a sacrificial scaffold, as in a support material) and a cellular formulation (cell-containing formulation) is printed in and/or on the scaffold. In some embodiments, one or more formulations in the building formulation comprises a mixture of cellular formulation(s) (e.g., a mixture of cells) and (e.g., acellular) curable materials, and the curable (e.g., acellular) materials can be a support material or a model material.

In some embodiments, the tumor model (the object) is made of both cellular and curable (e.g., acellular, synthetic, exogenous) modeling materials, and is formed by forming layers of a building material that comprises a plurality of modeling formulations which comprise cellular components (e.g., tumor cells and additional components from its microenvironment, as defined herein) and curable (acellular; synthetic) materials, optionally in combination with acellular (synthetic) curable support material formulations.

The selection of acellular/synthetic (e.g., curable) materials that will compose the bio-ink, in addition to cell suspensions and/or cellular components, in the design of 3D constructs for tissue engineering applications should be made while considering parameters such as biocompatibility, biodegradability, and cell-substrate interactions.

The bio-inks must flow through the deposition nozzle without clogging, yet should solidify (harden) quickly (e.g., within a time period of no more than a few minutes). Hence, the ink is preferably both shear thinning and viscoelastic, i.e., with a shear elastic modulus (G') that exceeds the loss modulus (G").

According to some embodiments of the present invention, the bio-ink (e.g., the one or more modeling material formulation(s)) comprises cellular components, as described herein, and may further comprise curable (e.g., acellular, exogenous/synthetic) components, as described herein.

In some embodiments, the curable material(s) are selected so as to provide the tumor model with chemical, mechanical and/or physical properties that correspond to the respective properties of the tumor, as explained hereinafter.

Curable materials usable in the field of bioprinting are predominantly based on either naturally derived materials (including, for example, Matrigel, Alginate, Pectin, Xanthan gum, Gelatin, Collagen, Chitosan, Fibrin, Cellulose and Hyaluronic acid, often isolated from animal or human tissues) or synthetically-prepared materials (including, for example, polyethyleneglycol; PEG, gelatin methacrylate; GelMA, poly(propylene oxide); PPO, poly(ethylene oxide); PEO), all of which are referred to herein as curable materials that form a synthetic material. Naturally derived materials for 3D bioprinting are advantageous due their similarity to human ECM, and their inherent bioactivity. Synthetically-prepared materials are advantageous in that they can be tailored with specific physical and/or mechanical properties to suit particular applications.

In some embodiments, a curable material, whether it is naturally derived or synthetically-prepared, is a material that forms, upon curing, a synthetic material as described herein (e.g., a material exogenous to the tumor and its environment and/or the subject).

Synthetic materials and/or curable materials forming synthetic materials as described herein can be degradable or non-degradable materials, and may include, for example, hydrogels made of one or more polymers (PEG, polyethyleneglycol-diacrylate, polyglutamic acid, gelatin methacrylate; GelMA, poly(propylene oxide); PPO, poly(ethylene oxide); PEO, PLGA/PLLA), poly(dimethyl siloxane); Nanocellulose; Pluronic F127, or short di-peptides (FF) and Fmoc-peptide-based hydrogel (Fmoc-FF-OH, Fmoc-FRGD-OH, Fmoc-RGDF-OH, Fmoc-2-Nal-OH, Fmoc-FG-OH). Thermoplastic polymers such as Polycaprolactone (PCL), Polylactic acid (PLA) or Poly(D,L-lactide-co-glycolide) along with silicone inks can be used to create customized templates and molds.

The following describes exemplary curable materials usable in the context of the present embodiments:

Matrigel basement membrane: the main components of Matrigel are structural proteins such as laminin, entactin, collagen and heparan sulfate proteoglycans which present cultured cells with the adhesive peptide sequences that they would encounter in their natural environment. It also contains growth factors like TGF-beta and EGF that prevent differentiation and promote proliferation of many cell types. Matrigel is semi-solid at 37° C. and it liquefies when it is at 4° C. Formulations comprising Matrigel can be used in bioprinting upon cooling to below 4° C., and are cured by exposing the formed layers to heat.

Gelatin methacrylate (GelMA) is a low-cost, abundant and biocompatible material, composed of denatured collagen that is modified so as to undergo cross-linking when exposed irradiation, preferably in the presence of a photoinitiator. Gelatin is modified with photopolymerizable methacrylate (MA) groups, resulting in a matrix that can be cross-linked through free radical polymerization by short exposure to UV light after printing. By modulating the concentration, degree of methacrylation, and temperature, the shear yield stress and elastic modulus of cured GelMA-containing formulations can be tuned (6). FIGS. 3A-B show 131/4-5B1 mCherry-labeled melanoma cells and HUVECs GFP-labeled grown in GelMA hydrogels.

Nanocellulose are products or extracts of cellulose, found in plants, animals, and bacteria, composed of nano-scaled structured materials which are UV-curable. The family of nanocellulose can be divided in three types, (1) cellulose nanocrystals (CNC), (2) cellulose nanofibrils (CNF), and (3) bacterial cellulose (BC), also referred to as microbial cellulose. Nanocellulose is biocompatible and shares mechanical properties similar to natural tissue, hence, cells can attach and proliferate on nanocellulose-based biomaterials scaffolds.

Pluronic® materials are class of triblock co-polymers based on Poly-ethylene oxide and Poly-propylene oxide which exhibit reverse thermal gelation. For example, Pluronic F127 is fluid at a low temperature forms a gel at a high temperature, above critical micellar concentration (CMC). Pluronic F127 can be used either as a sacrificial (support) material or be mixed with cellular components. Pluronic F127-diacrylate (DA) is also UV-curable and can be used as an integral part of the final structure (15).

Fmoc-containing materials encompass amino acids and short peptides which have been modified with a 9-fluorenylmethyloxycarbonyl group. Fmoc-modified amino acids and short peptides have self-assembly ability. The reversible self-assembly is very fast and the formed hydrogel is rigid (16). Fmoc-peptide-based hydrogel can be used as a sacrificial (support) material.

Hyaluronic acid (HA) is a glycosaminoglycan which is one of the main components of the extracellular matrix and is distributed widely in connective, epithelial, and neural tissues.

Acrylated hyaluronic acid (AHA) can be cross-linked upon exposure to UV irradiation (17), optionally in the presence of a photoinitiator.

Collagen type I is the main structural protein in the extracellular space in the connective tissues in animals. Since collagen forms mechanically weak constructs it is usable as sacrificial (support) material (18).

Cytocompatible sacrificial template of carbohydrate glass, another technique for 3D printing which uses a carbohydrate lattice made from a combination of simple and complex sugars. A printer deposits filaments of carbohydrate on top of each other in sequence so they are self-supporting. Then the entire lattice structure is covered with a protective layer of a biodegradable polymer. After pouring and cross-linking a cell-filled gel over the carbohydrate lattice, the lattice is dissolved away with an aqueous solution (19).

Poly-(ethylene glycol) diacrylate (PEGDA) containing materials, such as PEG-fibrinogen, PEG-collagen or other polymer-protein conjugates can form hydrogel scaffolds upon exposure to UV radiation, preferably in the presence of a photoinitiator (20).

Alginate, Xanthan gum and Pectin are all biological anionic polysaccharides from a natural source. Alginate is extracted from cell walls of brown algae; Xanthan gum is secreted by the bacterium *Xanthomonas campestris*; Pectin is obtained from cell walls of terrestrial plants. Such anionic polysaccharides can form ionic bridges between their ionized carboxyl groups and divalent ions such as magnesium, calcium, strontium, barium or radium ions in a gelation process called "egg box-model". However, when those polymers are being dissolved in cell-media it is quickly polymerized due to the presence of calcium ions in cell-media. Therefore, as a first step, the use of Ethylenediaminetetraacetic acid (EDTA) or ethylene glycol-bis(β-aminoethyl ether)-N,N,N',N'-tetraacetic acid (EGTA) is required as a chelating agent for the calcium ions. As a second step, Glucono-delta-Lactone (GDL) is added to slowly decrease pH which induce the slow release of the calcium ions from the chelating agent, thus allowing gelling of the solution in a controllable gelation process (21). Controlling polymer concentration, chelating agent, type of divalent ion and GDL content can affect the gelation process and mechanical properties of the final gel.

Chitosan is a natural cationic polyelectrolyte produced from shrimp and other crustacean shells. Chitosan can be crosslinked with a chemical agent such as Glutaraldehyde, Genipin or Sodium Tripolyphosphate (TPP). Many other synthetic polymers such as Poly-arginine, Poly-lysine, or Poly-ethylene Imine can be crosslinked in the same manner.

Fibrin is a glycoprotein in vertebrates that has an important role in the formation of blood clots. Fibrinogen can form a gel when mixed with thrombin, to form fibrin gel. However, fibrin suffers from two main limitations: (i) it has quite poor mechanical properties, and (ii) its gelation process can be too fast from a printing prospective. Therefore, there is a need for a special core-sheath nozzle or post-crosslinking process to avoid gelation prior to extrusion combined with a thickener agent such as pure gelatin which can afterwards be crosslinked to the fibrin gel with Transglutaminase (TG) (22) or some anionic polysaccharide such as Alginate, Xanthan gum or Pectin which can afterwards be crosslinked when the gel is inserted to a cell-media. Combination of PLLA/PLGA sponges with fibrin matrices provides additional mechanical strength (23).

Clay mineral and carbon nanotubes can be included in each of the materials mentioned above to improve the mechanical properties of soft hydrogels and grant electrical properties which can be beneficial to modeling of brain tumors.

According to some embodiments of the present invention, the curable materials in a building material formulation (bio-ink) can be selected so as to provide the tumor model with chemical, mechanical and/or physical properties that match the original tumor, as described herein.

For example, for tumors residing in soft tissues such as brain, curable materials that provide synthetic hardened materials exhibiting Young's modulus of about 1-2 kPa are used (24).

For example, for bone neoplasms, curable materials that provide synthetic hardened materials exhibiting Young's modulus of about 10 GPa (25) are used, to thereby provide properties mimicking the bone mineral (hydroxyapatite).

According to some embodiments, the curable materials are selected and used so as to provide selected physico-mechanical properties (e.g., Young modulus, Tg) at selected regions of the printed tumor model which are similar (e.g., ±20%, or ±10%, or ±5%) to corresponding features of the tumor.

Selecting curable materials that provide the desired or required physic-mechanical properties at selected regions of the printed tumor model is within the knowledge of those skilled in the art.

In exemplary embodiments of the present invention, the bio-ink formulation comprises an enzymatic system, such that the curing is effected by means of one or more enzymatically-catalyzed reactions. The use of such formulations allow controlling the properties of the hardened material by controlling the enzymatically catalyzed reactions, for example, by selecting suitable concentrations of the enzymes.

In exemplary embodiments of the present invention, the bio-ink formulation comprises fibrinogen and thrombin, as described herein, which form a fibrin hydrogel. Such a formulation is also referred to as "fibrin hydrogel formulation" or as "fibrinogen hydrogel formulation" or as "fibrin-forming formulation" and like expressions.

In some of these embodiments, the amount of thrombin is selected such that the fibrin hydrogel formation occurs in such a time that allows an effective bioprinting, that is, in which the formulation remains non-hardened when the formulation is dispensed from the printing heads, and in which the formulation is hardened (upon polymerization of the fibrinogen by the enzyme to form fibrin) once dispensed, during a time period that does not exceed one hour, and is preferably less.

An exemplary formulation comprises 1% weight/volume (w/v) fibrinogen and 0.1-2 Units/ml of thrombin, preferably 0.2-1 Units/ml, more preferably 1 Unit/ml, thrombin.

In some of these embodiments, the bio-ink formulation further comprises an anionic polymer, for example, a polysaccharide, as described herein, which can act as a reinforcer, optionally by cross-linking the formed fibrin. In some embodiments, the formulation further comprises a TG, for promoting such a cross-linking.

The amount of the anionic polymer is selected so as to provide a desired stiffness to the formed tumor model, or to portions thereof.

In some embodiments, the anionic polymer is gelatin.

In some of any of these embodiments, an amount of the anionic polymer ranges from about 1% to about 50%, w/v, or from about 5% to about 30%, w/v, of the total weight of a formulation comprising same.

In some of any of these embodiments, an amount of the TG ranges from 1 to 5%, w/v, of the total weight of a formulation comprising same.

In some embodiments, a bio-ink formulation comprises fibrinogen, thrombin, gelatin and TG, as described herein. Such a formulation is also referred to herein as fibrinogen/gelatin formulation or as fibrin/gelatin formulation (as it forms a fibrin/gelatin hydrogel), and like expressions.

In exemplary embodiments of the present invention, the bio-ink formulation comprises fibrinogen and an anionic polymer, as described herein, and an enzyme for cross-linking the polymer and the fibrinogen, as described herein, which form a fibrinogen-containing hydrogel. Such a formulation is also referred to as "fibrinogen hydrogel formulation" or as "fibrinogen formulation" or as "fibrinogen/gelatin formulation" and like expressions.

In some of these embodiments, the amount of thrombin is selected such that the fibrin hydrogel formation occurs in such a time that allows an effective bioprinting, that is, in which the formulation remains non-hardened when the formulation is dispensed from the printing heads, and in which the formulation is hardened (upon polymerization of the fibrinogen by the enzyme to form fibrin) once dispensed, during a time period that does not exceed one hour, and is preferably less.

In some of these embodiments, the bioprinting is effected using a formulation system that comprises two or more bioink formulations, each comprising different amount(s) of one or more of these components, thus providing different properties to different portions of the tumor model, as desired according to the acquired imaging data. For example, each formulation can comprise a different amount of the gelatin and/or the TG, so as to provide hardened materials with different stiffness.

Alternatively, the formulation system comprises one formulation that comprises fibrinogen and thrombin, and one formulation that comprises gelatin and TG, and the bioprinting is such that drops of the gelatin formulation are dispensed next to the fibrinogen formulation, at pre-determined ratios, to thereby effect different degrees of cross-linking, and hence different stiffness, are pre-selected locations is the tumor model.

Optionally, additional acellular agents, curable or non-curable are added to one or more formulations, to further alter the mechanical properties of the hardened material.

In some of any of the embodiments described herein, the bio-ink can comprise two or more modeling formulations, each comprising different curable materials, which are selected so as to provide the desired properties to selected portions of the tumor model.

Exemplary bio-ink formulations, comprising fibrinogen, GelMA and Matrigel are describes in the Examples section that follows. In some of any of the embodiments described herein, the curable materials and thermo-curable materials, which harden or solidify upon a change in temperature, for example, upon heating. In some embodiments, the change in temperature comprises heating to a temperature ranging from room temperature to physiological temperature (e.g., 37° C.).

In some of any of the embodiments described herein, the amount of the synthetic material (curable material) in the formulation is selected so as to provide a desired property of the hardened synthetic material in the 3D tumor model.

In some of any of the embodiments described herein, the bio-ink formulation comprises, in addition to the curable material, a suitable medium for maintaining viability and/or proliferation of the cells in the tumor model.

Microengineered Blood Vessels:

A 3D tumor model as described herein is populated with living cells.

In some embodiments, the method further comprises perfusing the 3D-bioprinted model of the tumor, for example, by creating blood vessels during the bioprinting process, as described herein.

In some embodiments, the tumor model further comprises small diameter blood vessels.

Achieving vascularization of the desired 3D tumor model, for example, in order to test different drugs on it, is considered a major challenge in bioprinting. Several 3D printers are capable to build tiny, hierarchical networks of blood vessels to supply blood.

One approach for achieving vascularization comprises using a customized, high-resolution 3D printer that can form microchannels in biocompatible gels. These hydrogel materials can be printed at the micron-length scale (the smallest microvascular channels that are printed are around 10 microns in diameter) (24). Using this approach, a capillary network of fluorescently labeled sacrificial ink is printed into gel-like matrix which can be melted later. Further, blood vessels can be printed using sacrificial template of carbohydrate glass and seeded with endothelial cells (ECs), such that the ECs line the interiors of the channels and may penetrate the surrounding cell-gel mixture (19).

In some embodiments, the 3D tumor model described herein comprises a functional perfusable vascular system with active flow, which mimics high pressure pulsatile blood flow, hemodynamics, shear stress, etc. Vascularization is important as it maintains cell viability and encourages tissue organization and differentiation.

Blood vessels are usually engineered by combining endothelial cells and smooth muscle cells with a scaffold (either synthetic or natural). Once the endothelial cells are arranged into functional vascular network and produce extracellular matrix (ECM) the scaffolds may degrade (25). The engineered blood vessels should be compliant, able to stretch and have sufficient shear strength.

Exemplary vascular system can be obtained as described in Lee et al., for a vascular scaffold formed using a composite of polycaprolactone (PCL) and type I collagen (26). This scaffold has physiological vascular conditions, similar to those of native blood vessels, for 1 month in vitro.

Another important factor in printing functional vessels is the cells' proper arrangement in the printed vessel. Endothelial cells (EC) should attach the scaffold's luminal surface (to prevent thrombosis) while the smooth muscle cells (SMC) should line the outer wall of the scaffold to allow blood vessel functions such as vasoconstriction and relaxation (26).

Self-assembly of pre-determined vascular network is difficult to achieve, thus the vessels are usually arranged randomly. In order to control the new blood vessels geometry, biofabrication and microfluidics techniques can be used (27), for example: photolithography can be used for the creation of branching networks on which EC can be seeded, and another technique is to print a vascular network using hydrogels from the outside and a sacrificial material within the vessel, which can later on be perfused and seeded with EC (19, 28, 29).

Another methodology is described in Lesman et al., who studied the impact of fibrin and synthetic Polylactic acid/Poly(lactic-co-glycolic acid) (PLLA/PLGA) scaffolds vessel network formation in vitro (30, 31). It was demonstrated that fibrin concentrations and quantities affect the degree of vascular maturity as well as the vascularization morphology. Addition of PLLA/PLGA scaffold, which provides mechanical support, to fibrin, enhanced blood vessels maturation. ECs seeded on the fibrin+PLLA/PLGA scaffold, formed vascular-like networks, therefore it was concluded that this complex scaffold may support the vascularization process required for tissue engineering (30).

Another methodology is described in Wu at al., and uses a direct ink writing, as a method for the creation of 3D microvascular structures. In this method, the ink is dropped into the desired subject, encapsulated in a thermally or photocurable resin, and then removed by liquefaction to produce uniformed 3D-interconnected microchannels mimicking a microvascular network (24). Using 30 μm nozzle may enable printing large vessels (650 μm, which provide a single inlet and outlet for perfusion) as well as small ones (150 μm, which are in close proximity to one another thus allowing diffusion between the vessels) (6). In these cases, the vascular network can be formed independently in the absence of heterogeneous cellular populations mimicking vascularized tissue ex vivo.

In some embodiments of the present invention, a 3D tumor model featuring interconnected channels is manufactured as described herein, and a Pluronic solution, optionally containing, e.g., cells, factors and/or any other biological materials present in the microenvironment of the tumor, is creating the channels, forming a network of microchannels that mimics a vascularized tumor.

An exemplary methodology, which utilizes Pluronic for forming a vascular network in the tumor model is demonstrated in the Examples section that follows.

A Tumor Model:

According to an aspect of some embodiments of the present invention there is provided a three dimensional (3D) model of a tumor comprising a plurality of cell types having a full HLA match, the plurality of cell types comprising malignant cells and non-malignant cells (stoma) of the tumor.

According to some of these embodiments, the plurality of cell types are arranged in high matchability to a 3D image (e.g., obtained by a 3D imaging technique as described herein) of the tumor. The matchability of the 3D arrangement of the cell types to the 3D image is, and can be determined, as described herein above.

According to an alternative embodiment, there is provided a three dimensional (3D) model of a tumor comprising a thickening agent and a plurality of cell types of the tumor, the plurality of cell types comprising malignant cells and non-malignant cells, the 3D model being shaped as a spheroid.

A "thickening agent" or "thickener", as used herein and in widely recognized the art, describes a substance that alters the consistency and texture, and typically increases the viscosity, of a solution or substance to which it is added. Exemplary thickening agents usable in the context embodiments are biocompatible agents such as, but not limited to, carbohydrates, for example, polysaccharides, starches, and gums such as those derived from fruits and vegetables; and proteins, such as collagen, albumin and gelatin. Exemplary carbohydrates include cellulose and derivatives thereof such as methyl cellulose, CMC, and like materials.

According to a specific embodiment, the thickening agent is cellulose or a derivative thereof.

According to a specific embodiment, the derivative is methyl-cellulose.

According to a specific embodiment, the plurality of cells are of full HLA match (i.e., from the same subject) as described herein.

However, non-mismatched i.e., of different subjects can also be employed.

According to a specific embodiment, the cells can be of primary cells, cell lines or a combination of same.

As used herein "a spheroid" refers to a spherical of typically heterogeneous aggregates of proliferating, quiescent, and necrotic cells in culture that retain 3D architecture and tissue-specific functions.

Spheroids can be grown with a few different methods. One common method is to use low cell adhesion plates, typically a 96 well plate, to mass produce spheroid cultures, where the aggregates form in the rounded bottom of the cell plates.

According to a specific embodiment, spheroids can also be cultured using the hanging drop method, involving forming cell aggregates in drops that hang from the surface of a cell plate. This embodiment is further described hereinbelow.

Other methods include the spheroids formation using multi-well agarose-coated plates; and spheroid formation using U-shaped 96-well plates.

Other methods include the use of rotating wall vessel bioreactors, which spins and cultures the cells when they are constantly in free fall and forms aggregates in layers.

According to a specific embodiment, the spheroid is embedded in an extracellular matrix or a matrix.

The extracellular matrix can be composed of components derived from basement membrane or extracellular matrix components that form part of adhesion molecule receptor-ligand couplings. Matrigel™ is one example of a commercially available matrix which is suitable for use with the present invention. Matrigel™ is a soluble preparation from Engelbreth-Holm-Swarm tumor cells that gels at room temperature to form a reconstituted basement membrane; Matrigel™ is also available as a growth factor reduced preparation. Other extracellular matrix components and component mixtures which are suitable for use with the present invention include laminin matrix, fibronectin matrix, proteoglycan matrix, entactin matrix, heparan sulfate matrix, collagen matrix and the like, alone or in various combinations thereof.

Other matrices that can be used are described hereinbelow under "a curable material".

According to a specific embodiment, the extracellular matrix comprises a synthetic material.

According to a specific embodiment, the extracellular matrix comprises Matrigel™

According to a specific embodiment, the extracellular matrix is naturally occurring.

According to a specific embodiment, the extracellular matrix is Matrigel™, and the thickening agent is cellulose.

According to a specific embodiment, the extracellular matrix is Matrigel™, the thickening agent is cellulose, and the tumor is glioblastoma.

As mentioned, the 3D model is manufactured by any method known in the art.

According to a specific embodiment, the 3D model is generated using a hanging drop plate. Such methods are described in length in Fennema, Eelco, et al. "Spheroid Culture as a Tool for Creating 3D Complex Tissues." Trends in Biotechnology, vol. 31, ser. 02, February 2013. 02., which is hereby incorporated by reference in its entirety.

After a spheroid is formed (e.g., as described in Example 6), the spheroid is embedded in the extracellular matrix (e.g., Matrigel™ or curable material) to allow tumor spreading and invasion.

As used herein "exhibits viability" means maintains viability of the cells at day 0 (immediately before printing) ±about 30%, 20%, 15%, 10%, 5% as determined in a predetermined viability assay.

Viability or proliferation are measured by PrestoBlue or Trypan Blue assay.

In some embodiments, the plurality of cell types exhibits viability for at least 30 days.

In some embodiments, the plurality of cell types exhibits viability for at least 20 days.

In some embodiments, the plurality of cell types exhibits viability for at least 15 days.

In some embodiments, the plurality of cell types exhibits viability for at least 14 days.

In some embodiments, the plurality of cell types exhibits viability for at least 13 days.

In some embodiments, the plurality of cell types exhibits viability for at least 12 days.

In some embodiments, the plurality of cell types exhibits viability for at least 11 days.

In some embodiments, the plurality of cell types exhibits viability for at least 10 days.

In some embodiments, the plurality of cell types exhibits viability for at least 9 days.

In some embodiments, the plurality of cell types exhibits viability for at least 7 days.

In some embodiments, the plurality of cell types exhibits a proliferative capacity for at least 30 days.

As used herein "exhibits a proliferative capacity" means maintains proliferation potential (e.g., doubling rate) of the cells at day 0 (immediately before printing)±about 30%, 20%, 15%, 10%, 5% as determined in a predetermined proliferation assay.

In some embodiments, the plurality of cell types exhibits a proliferative capacity for at least 20 days.

In some embodiments, the plurality of cell types exhibits a proliferative capacity for at least 15 days.

In some embodiments, the plurality of cell types exhibits a proliferative capacity for at least 14 days.

In some embodiments, the plurality of cell types exhibits a proliferative capacity for at least 13 days.

In some embodiments, the plurality of cell types exhibits a proliferative capacity for at least 11 days.

In some embodiments, the plurality of cell types exhibits a proliferative capacity for at least 10 days.

In some embodiments, the plurality of cell types exhibits a proliferative capacity for at least 9 days.

In some embodiments, the plurality of cell types exhibits a proliferative capacity for at least 8 days.

In some embodiments, the plurality of cell types exhibits a proliferative capacity for at least 7 days.

In some of any of the embodiments described herein, the plurality of cell types comprises adherent cells and non-adherent cells, as described herein.

In some of any of the embodiments described herein, the 3D model comprises extracellular matrix.

In some of any of the embodiments described herein, the 3D model comprises a perfusable vasculature (e.g., as described herein).

In some of any of the embodiments described herein, the 3D model further comprises at least one synthetic material.

In some of any of the embodiments described herein the synthetic material is a non-biological material and/or a material not inherently present in the tumor or its environment or in a subject having the tumor.

In some embodiments, the synthetic (e.g., endogenous) material is a polymeric material, for example, a hardened (e.g., polymerized and/or cross-linked) form of a curable material as described herein.

According to a specific embodiment the tumor is a solid-tumor.

According to a specific embodiment, the tumor is of a human subject.

According to a specific embodiment, the tumor is of a metastatic cancer.

According to a specific embodiment, the tumor is of a non-metastatic cancer.

According to a specific embodiment, the tumor is of a pre-malignant lesion.

In some of any of the embodiments described herein, the plurality of cell types and the synthetic material, if present, are arranged in high matchability to the 3D image of the tumor, as described herein.

According to specific embodiments, the cancer comprises a pre-malignant cancer.

Pre-malignant cancers (or pre-cancers) are well characterized and known in the art (refer, for example, to Berman J J. and Henson D E., 2003. Classifying the precancers: a metadata approach. BMC Med Inform Decis Mak. 3:8).

Classes of pre-malignant cancers include acquired small or microscopic pre-malignant cancers, acquired large lesions with nuclear atypia, precursor lesions occurring with inherited hyperplastic syndromes that progress to cancer, and acquired diffuse hyperplasias and diffuse metaplasias. Examples of small or microscopic pre-malignant cancers include HGSIL (High grade squamous intraepithelial lesion of uterine cervix), AIN (anal intraepithelial neoplasia), dysplasia of vocal cord, aberrant crypts (of colon), PIN (prostatic intraepithelial neoplasia). Examples of acquired large lesions with nuclear atypia include tubular adenoma, AILD (angioimmunoblastic lymphadenopathy with dysproteinemia), atypical meningioma, gastric polyp, large plaque parapsoriasis, myelodysplasia, papillary transitional cell carcinoma in-situ, and Schneiderian papilloma. Examples of precursor lesions occurring with inherited hyperplastic syndromes that progress to cancer include atypical mole syndrome, C cell adenomatosis and MEA.

According to a specific embodiment the tumor is, a carcinoma, a sarcoma, a glioma (e.g., glioblastoma) or an adenoma.

In some of any of the embodiments described herein, there is provided a 3D tumor model obtainable by the bioprinting method as described herein. In some of these embodiments, the tumor is characterized by one or more of the above-described features. A tumor model obtainable by a bioprinting method as described herein is also referred to herein as a 3D-bioprinted tumor model.

In any of the aspects and embodiments as described herein, a "3D tumor model" or a "3D model of a tumor" are used interchangeably and refer to a model tumor as described herein and to a 3D-bioprinted tumor model as described herein.

In some of any of the embodiments described herein, the 3D tumor model and its blood vessels are connected through fluidic conduits which function as a synthetic circulatory system.

An exemplary system 100 comprising a perfused 3D tumor model in fluid communication with a medium is depicted in FIG. 15 and is described in further detail in the Examples section that follows.

In some embodiments, a system as described herein comprises an array of 3D tumor models, preferably an array of perfused tumor models, each connected independently to a different medium reservoir through a different tubing system.

Such an array can be used, for example, for screening an anti-cancer regimen, for example, for screening simultaneously several chemotherapeutic agents.

An exemplary such a set up is depicted in FIG. 16.

Functional vascular channels could improve the screening of different active pharmaceutical ingredients (API) or newly-designed nanomedicines on the 3D-microengineered printed ex vivo model. Thus, it is ensured that the simulation takes into account the various characteristics of the tumor-host interactions, the dilution and clearance of the drug in the circulation media and the additional mechanical stress applied on the tissue as a result of the flow.

Such 3D-microengineered printed tumors open new avenues for drug screening and fundamental studies of the tumor microenvironment as well as for both surgical and research purposes (see, for example, FIG. 2), as described in further detail hereinafter.

Applications:

The 3D model of a tumor as described herein is usable in various applications, including research (e.g., for drug design, drug screening, simulating surgery) and for the purpose of evaluating an operative anti-cancer regimen suitable for the specific tumor and subject having same.

The 3D models can be produced, stored, distributed, marketed, advertised, and sold as, for example, kits for biological assays and high-throughput drug screening. In other embodiments, the 3D models are produced and utilized to conduct biological assays and/or drug screening as a service.

According to an aspect of some embodiments of the present invention there is provided a method of screening for an anti-cancer treatment regimen, the method comprising: subjecting a 3D model or system as described herein (with or without perfusion as described herein) of a tumor as described herein to the anti-cancer treatment regimen; and determining a presence of an anti-cancer effect (e.g., inhibition of tumor growth, killing of cancer cells, inducing apoptosis of cancer cells, anti-angiogenic effect) of the anti-cancer treatment regimen on the tumor.

This, according to a specific embodiment, subjecting refers to contacting for a predetermined time period.

According to another embodiment, subjecting refers to perfusion such as using the system as described herein.

The anti-cancer treatment regimen can be any one of a chemotherapy, a radiotherapy, an immunotherapy and a hormonal therapy, and any combination thereof.

As used herein the term "immune-checkpoint regulator" (also referred to herein as "immune-checkpoint modulator") refers to a molecule that modulates the activity of one or more immune-checkpoint proteins in an agonistic or antagonistic manner resulting in recruitment of an immune cell to elicit an immune activity against a cancer cell.

According to specific embodiments, the immune-checkpoint regulator modulates the activity of a specific immune-checkpoint protein with no cross reactivity with other immune-checkpoint proteins.

According to other specific embodiments, the immune-checkpoint regulator modulates the activity of at least 2, at least 3, at least 4 immune-checkpoint proteins.

According to specific embodiments the immune-checkpoint regulator binds directly the immune-checkpoint protein.

According to other specific embodiments, the immune-checkpoint regulator indirectly binds the immune-checkpoint protein through an intermediary molecule.

As used herein the term "activation" refers to the process of stimulating an immune cell (e.g. T cell, NK cell, B cell) that results in cellular proliferation, maturation, cytokine production and/or induction of regulatory or effector functions.

As used herein the term "immune-checkpoint protein" refers to an antigen independent protein that modulates an immune cell response (i.e. activation or function). Immune-checkpoint proteins can be either co-stimulatory proteins [i.e. positively regulating an immune cell activation or function by transmitting a co-stimulatory secondary signal resulting in activation of an immune cell] or inhibitory proteins (i.e. negatively regulating an immune cell activation or function by transmitting an inhibitory signal resulting in suppressing activity of an immune cell). According to specific embodiments, the immune-checkpoint protein regulates activation or function of a T cell. Numerous checkpoint proteins are known in the art and include, but not limited to, PD1, PDL-1, CTLA-4, CD80, LAG-3, TIM-3, KIR, IDO, OX40, OX40L, CD137 (4-1BB), 4-1BBL, CD27, CD70, CD40, CD40L, GITR, CD28, CD86, and ICOS (CD278), ICOSL.

Methods of determining signaling of a stimulatory or inhibitory signal are well known in the art and include, but are not limited to, binding assay using e.g. BiaCore, HPLC or flow cytometry, enzymatic activity assays such as kinase activity assays, and expression of molecules involved in the signaling cascade using e.g. PCR, Western blot, immunoprecipitation and immunohistochemistry. Additionally, or alternatively, determining transmission of a signal (co-stimulatory or inhibitory) can be effected by evaluating immune cell activation or function. Methods of evaluating immune cell activation or function are well known in the art and include, but are not limited to, proliferation assays such as BRDU and thymidine incorporation cytotoxicity assays such as chromium release, cytokine secretion assays such as intracellular cytokine staining ELISPOT and ELISA, expression of activation markers such as CD25, CD69 and CD69 using flow cytometry.

According to specific embodiments, determining the signaling activity is effected in vitro or ex vivo e.g. in a mixed lymphocyte reaction (MLR).

For the same culture conditions, the signaling activity or the immune cell activation or function are generally expressed in comparison to the signaling, activation or function in a cell of the same species but not contacted with the immune-checkpoint regulator or contacted with a vehicle control, also referred to as control.

Depending on the immune-checkpoint protein (i.e. co-stimulatory or inhibitory) the immune-checkpoint regulator can be an agonist or antagonist.

Various assays can be used to determine the effect of the anti cancer agent/regimen. Some non-limiting examples are described herein below.

According to a specific embodiment, the "assay" is a procedure for testing or measuring the presence or activity of a substance (e.g., a chemical, molecule, biochemical, drug, physical condition e.g., radiation, etc.) in the 3D model.

In further embodiments, assays include qualitative assays and quantitative assays. In still further embodiments, a quantitative assay measures the amount of a substance in a sample.

In various embodiments, the assay is selected from the group consisting of an image-based assays, measurement of secreted proteins, expression of markers, and production of proteins.

In various further embodiments, the 3D models as describe herein are for use in assays to detect or measure one or more of: molecular binding (including radioligand binding), molecular uptake, activity (e.g., enzymatic activity and receptor activity, etc.), gene expression, protein expression, receptor agonism, receptor antagonism, cell signaling, apoptosis, chemosensitivity, transfection, cell migration, chemotaxis, cell viability, cell proliferation, safety, efficacy, metabolism, toxicity, and abuse liability.

In various further embodiments, the 3D models as describe herein are for use in immunoassays. In further embodiments, immunoassays are competitive immunoassays or noncompetitive immunoassays. In a competitive immunoassay, for example, the antigen in a sample competes with labeled antigen to bind with antibodies and the amount of labeled antigen bound to the antibody site is then measured. In a noncompetitive immunoassay (also referred to as a "sandwich assay"), for example, antigen in a sample is bound to an antibody site; subsequently, labeled antibody is bound to the antigen and the amount of labeled antibody on the site is then measured.

According to a specific embodiment, the immunoassay assays the effect of immune cells (e.g., autologous or non-autologous e.g., allogeneic) on the tumor. Such cells can be obtained from the blood e.g., PBMC and tested in the above described system.

Immune cells can include, but are not limited to, the innate immune cells, adaptive immune cells or components thereof.

The immune cells can be provided in a biological sample (e.g., serum) or alternatively in a culture medium.

It will be appreciated that the effect of various factors in a medium can be tested also in the absence of immune cells.

The terms "medium", "cell culture medium", "culture medium", and "growth medium" as used herein refer to a solution containing nutrients which nourish growing eukaryotic cells. Typically, these solutions provide essential and non-essential amino acids, vitamins, energy sources, lipids, and trace elements required by the cell for minimal growth and/or survival. The solution can also contain components that enhance growth and/or survival above the minimal rate, including hormones and growth factors. The solution is formulated to a pH and salt concentration optimal for cell survival and proliferation. The medium can also be a "defined medium" or "chemically defined medium"—a serum-free medium that contains no proteins, hydrolysates or components of unknown composition. Defined media are free of animal-derived components and all components have a known chemical structure. One of skill in the art understands a defined medium can comprise recombinant polypeptides or proteins, for example, but not limited to, hormones, cytokines, interleukins and other signaling molecules.

In various further embodiments, the 3D models as describe herein are for use in drug screening or drug discovery. In further embodiments the 3D model is used as part of a kit for drug screening or drug discovery. In some embodiments, each 3D model exists within a well of a biocompatible multi-well container, wherein the container is compatible with one or more automated drug screening procedures and/or devices. In further embodiments, automated drug screening procedures and/or devices include any suitable procedure or device that is computer or robot-assisted.

In various further embodiments, the 3D models as describe herein are for use in research or develop drugs potentially useful in any therapeutic area including anti-cancer efficacy, pharmacology, toxicology, and immunology.

In a particular embodiment, the 3D model as describe herein is for use to identify therapies potentially useful in the disease or condition of a particular individual. In further embodiments, the methods include applying a candidate therapeutic agent or condition to the 3D model; measuring viability of the cells; and selecting a therapeutic agent for the individual based on the measured viability of the cells. In still further embodiments, the candidate therapeutic agent is a one or more chemotherapeutic compounds, one or more radiopharmaceutical compounds, radiation therapy, immune modulator (e.g., checkpoint modulator) or a combination thereof. Accordingly, disclosed herein are methods of personalizing medicine to a subject in need thereof.

According to an aspect of some embodiments of the present invention there is provided a method of characterizing a tumor, the method comprising:
providing the 3D model of the tumor as described herein (e.g., using a bioprinting method as described herein); isolating cells of the tumor model; and in vitro or in vivo culturing the cells. The cultured cells can thereafter be subjected to a variety of methodologies for characterizing the tumor. (See, for example, FIGS. 1 and 2) as well as other examples referring to cell proliferation, viability, gene expression etc.

In some embodiments, characterizing the tumor comprises subjecting the cells to an anti-cancer treatment during the culturing, as described herein (see, FIG. 2).

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof. Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Exemplary Formulations for Forming 3D Inkjet Printed Hydrogels

Two exemplary bio-ink formulations that provide a supporting 3D structure for tumor cells and their microenvironment were tested: one is based on fibrinogen enzymatic cross-linking reaction with Thrombin (Th), which provides a fibrin gel, and Transglutaminase (TG) which reacts slowly to crosslink fibrinogen or fibrin, and is also cross-linking fibrinogen or fibrin with gelatin; and the other is based on a radical chemical polymerization of GelMA.

Preparation of Fibrin Hydrogels:

Gelatin (Type A, 300 bloom from porcine skin, Sigma) solutions at 15% w/v, 30% w/v and 45% w/v were dissolved in DPBS without calcium and magnesium at 70° C. for 12 hours under vigorous stirring. Then, the pH was adjusted to 7.5 using 1 M NaOH. The warm gelatin solutions were sterile-filtered and stored at 4° C. in aliquots for later use.

Fibrinogen solution (50 mg/ml) was produced by dissolving lyophilized human blood plasma protein (Millipore) at 37° C. in sterile DPBS without calcium and magnesium for 45 minutes. Transglutaminase (TG) solution (100 mg/ml) was prepared by dissolving lyophilized powder (Moo Glue) in DPBS without calcium and magnesium and gently mixing for 20 minutes at 37° C. and sterile-filtered before use. A 250 mM $CaCl_2$ stock solution was prepared by dissolving $CaCl_2$ powder in DPBS without calcium and magnesium (Frutarom). To prepare stock solution of thrombin, lyophilized thrombin (Millipore) was reconstituted at 2000 U/ml using sterile DPBS and stored at −20° C. Thrombin aliquots were thawed immediately before use and diluted according to the desired final concentration. The stock solutions were mixed together at 37° C. Gelatin stock solutions were diluted to achieve final concentrations of 6% w/v, 12% w/v or 18% w/v mixed with fibrinogen (10 mg/ml), 2.5 mM $CaCl_2$ and TG 2 or 3% w/v, to form fibrinogen hydrogels. Thrombin was added at various concentrations to form fibrin hydrogels.

Preparation of GelMA Hydrogels:

Gelatin (Type A, 300 bloom from porcine skin, Sigma) was dissolved in Dulbelco's phosphate buffered saline (DPBS) to a final concentration of 10% w/v and warmed to 60° C. for 2 hours under vigorous stirring. Then, the temperature was lowered to 50° C. and 140 µl of methacrylic anhydride (Sigma) was added dropwise for each gram of gelatin in solution to produce GelMA with a 50% degree of methacrylation (Kolesky, Truby et al. 2014). After 4 hours at 50° C. under vigorous stirring and cover with aluminum foil to prevent unintentional crosslinking through ambient light, the methacrylation reaction was quenched by diluting the reaction solution with DPBS warmed to 40° C. to a final GelMA concentration of 4.5% w/v. To remove methacrylic acid and methacrylic anhydride excess, the reaction solution was precipitated overnight by addition of ice-cold acetone at a 1:4 ratio of GelMA solution to acetone. Acetone was then poured out and the GelMA precipitate was dried with an evaporator for 30 min before being dissolved again at 10% w/v in DPBS warmed to 40° C. This warm GelMA solution transferred to a 12-14 kDa molecular weight cutoff (GeBA) dialysis bags, and dialyzed against Double Distilled Water (DDW) for 3 days to remove any remaining methacrylic acid and salts from the DPBS (the dialysis media was changed twice daily). Last, GelMA aliquots were frozen with liquid nitrogen, lyophilized for four days, and stored in dark at −20° C. until use.

For use in forming printed hydrogels, pPure GelMA inks were created by dissolving 15% w/v GelMA powder in warm cell culture media (according to the cell type). Irgacure® 2959 (BASF) was added to the solution at 0.3% w/v as a photo-initiator and the solution was stirred with a magnetic stirrer at 37° C. until fully dissolved.

Cell-laden GelMA inks were prepared by first removing cells from culture flasks through the standard trypsinization technique and dispersed in 15% w/v GelMA/media solution with 0.3% w/v Irgacure at $1\times10^6$ cells/ml or $2.5\times10^6$ cells/ml.

For use as manually deposited hydrogels (mold preparation), pure or cell-laden GelMA inks were cast into a silicone mold and was irradiated with UV light (365 nm, 4-5 mW/m$^2$) for 1 minute to achieve chemically crosslinked hydrogel. Then, the hydrogels were transferred to a 24- or 6-well plates, submerged in cell media and cells were grown in an incubator (37° C.; 5% CO$_2$).

Characterization:

Hydrogels made of fibrinogen, transglutaminase (TG) and gelatin at different concentrations (15%, 30%, or 45% w/v) were prepared and the storage modulus of the gels was determined by an oscillation time test with a controlled-stress rheometer equipped with a 20 mm cone plate with 1° degree geometry. The test was performed at 37° C., the strain was set to 0.01%, and the frequency was set to 1 Hz. The obtained graphs are presented in FIG. 4 and show that the higher the percent of the gelatin, the longer the time of cross-linking/gelation, and the highest mechanical strength of the hydrogel.

Additional experiments were performed to evaluate the gelation time of 1% w/v fibrinogen hydrogels (without Th) and fibrin hydrogels (with Th), oscillation time tests were performed, and the obtained data is presented in FIG. 5A. As shown therein, the storage modulus (G') of fibrin (Th 1 U/ml) hydrogels increased to 100 Pa immediately after 1 hour, while when only TG (20 mg/ml) was added, the polymerization was very slow and hydrogel formation was not observed after the first hour. Therefore, the following oscillation time experiments were performed for 2 or 3 hours. When both enzymes were used, the obtained hydrogels featured the highest G' values, up to 350 Pa.

The following experiments were therefore performed while using both enzymes, at varying concentrations, and the obtained data is presented in Table 2 below and FIGS. 5B-D. The gelation time of the tested formulations, presented in Table 2, was determined as the time point at which increase in the storage modulus begins. below and FIG. 5B shows that for fibrinogen hydrogels with the initial gelatin concentration of 15% w/v, the gelation starts almost an hour after the mixing and more than 90 minutes are needed to reach a storage modulus of 100 Pa. The gelation time of fibrin hydrogels containing 15% w/v gelatin was examined again at different Th concentration (see, FIG. 5C). For example, the addition of 0.25 U/ml Th enhanced the gelation reaction and the gelation started after 5 minutes. Moreover, after an hour the storage modulus reached to 1000 Pa, 10 fold higher than the value it reached after 1.5 hours without Th.

As further shown in the obtained data, the gelation time depends on the presence and concentration of Th (0.25 U/ml or 1 U/ml) or TG (20 or 30 mg/ml), the two enzymes that crosslink the fibrinogen bio-ink, and on the initial concentration of gelatin (15, 30 or 45% w/v). The obtained data show that the higher the percent of the gelatin, the faster the time of cross-linking/gelation, and the highest mechanical strength of the hydrogel.

TABLE 2

| Gelation time via rheology oscillation sweep - No Thrombin | | |
|---|---|---|
| Initial % w/v Gelatin | Time to start gelation | Time to G' = 100 Pa |
| 45 | 16 min | 41 min |
| 30 | 33 min | 58 min |
| 15 | 50 min | 91 min |
| Gelation time via rheology oscillation sweep 15% w/v gelatin | | |
| Final U/ml Thrombin | Time to start gelation | Time to G' = 1000 Pa |
| 0.25 | 5.5 min | 60 min |
| 0.5 | 2.8 min | 24 min |
| 1 | 1.6 min | 28 min |
| 2 | 3.8 min | 28 min |
| 4 | 1.8 min | 42 min |

As G' is higher at higher TG concentration, the following experiments were performed with TG at 30 mg/ml.

Cells within tissues are exposed to physical forces such as hydrostatic pressure, shear stress and tension and compression forces. The nature of these forces can change in pathologies such as cardiovascular disease and cancer. These nanoscale forces, which are generated by cell-cell or cell-ECM interactions, influence cell function through actomyosin contraction and actin dynamics, and it is evident that force collaborates with biochemical cues to regulate cell and tissue behavior (32). Moreover, desmoplastic stroma is present in many solid tumors and is typically significantly stiffer than normal (33); Therefore, young modulus of 1% w/v fibrin hydrogels with different concentrations of Th and gelatin was tested. Young modulus (E) was evaluated from the complex (shear) modulus (G) which was evaluated from an oscillation sweep test according to the following relationship (34):

$$E=2(\vartheta+1)G\approx3G$$

where $\vartheta$ is the Poission ratio.

The data obtained for the first gel system is presented in FIG. 5E and shows that the stiffness of the hydrogel can be manipulated mainly by changing the initial concentration of gelatin (7.5, 15 or 30% w/v).

The same measurements were made for a GelMA matrix, and the obtained data is presented in FIGS. 5F and FG. As shown in FIG. 5F, Young modulus of 15% w/v GelMA hydrogels crosslinked with 0.3% w/v Irgacure at different temperatures show that at 25° C. the hydrogel is the strongest (about 1.5 kPa) because it is both chemically and physically crosslinked at low temperatures. At 45° C. the hydrogel is weaker (about 0.25 kPa). As shown in FIG. 5G, GelMA displays a shear thinning behavior, which is a beneficial characteristic for formulations intended for use in 3D inkjet or extruded printing (as the viscosity increases and hence jettability upon passing through the print heads).

Another physico-chemical important parameter of a bio-ink is it swelling behavior, which determines the punctual bioprinted final structure. Therefore, a kinetic swelling study was performed with and without cells, and the obtained data is presented in FIGS. 6A-B.

As shown in FIGS. 6A and 6B, fibrin hydrogels reached to equilibrium state immediately at around 40% swelling while fibrin hydrogels containing GL261 mCherry glioblastoma cells at initial concentration of $10^6$ cells/ml reached equilibrium at 60% swelling and cells at initial concentration of $2.5 \times 10^6$ cells/ml reached equilibrium at 80% swelling. These data show that the higher the cell concentration, the heavier the hydrogels at equilibrium. These data is in line with previous studies conducted for chondrocyte behavior in alginate (35). The increase in the weight of the hydrogel with more cells was speculated to be due to a higher cell content and a high biological mass.

Example 2

Incorporation of Cells in Printed Hydrogels

In preliminary studies, 131/4-5B1 mCherry-labeled melanoma cells and HUVECs GFP-labeled were grown in gelatin methacrylate (GelMA) hydrogel (manually deposited), and images were obtained by a confocal microscope following 1 day and 6 days. The images are presented in FIGS. 3A-B and show significant differences between cell confluency, 3D spatial organization, distribution and intensity of the 131/4-5B1-mCherry melanoma cells and HUVECs GFP-labeled grown in GelMA for 1 day compared with 6 days. GelMA synthesis and cross-linking were made as previously described (16).

In studies conducted for evaluating viability and proliferation of cells in hydrogels made of the formulations described in Example 1 hereinabove, the proliferation of GL261 mCherry glioblastoma cells inside the bio-inks was evaluated by a direct measurement with countess after hydrogel digestion with Collagenase II.

More specifically, an enzymatic digestion of the cell-laden hydrogels was made using 300 U/ml of Collagenase II for 3 hours, and then the cells were dyed with Trypan blue and counted using countess (Invitrogen) at specific time intervals for 2 weeks. The doubling time of the cells inside each type of hydrogel was evaluated by:

$$DoublingTime = \frac{duration * \log(2)}{\log(FinalConcentration) - \log(InitialConcentration)}$$

Cells outside the hydrogels were also counted to evaluate cells' escape from the cell-laden ink.

The obtained data is presented in FIGS. 7A-H and Table 3 below.

As shown in FIGS. 7A and 7B, after 2 days, there was a decrease in cell number in 15% w/v GelMA hydrogels when their initial concentration was $10^6$ cell/ml, and after 4 days when their initial concentration was $2.5 \times 10^6$ cell/ml. As shown in FIGS. 7C-D, the proliferation rates of GL261 mCherry glioblastoma cells in fibrin hydrogels was significantly slower. The doubling time of GL261 mCherry glioblastoma cells in fibrin with $10^6$ cells/ml FIG. 7C) was 4.8 days, with initial cells concentration of $2.5 \times 10^6$ cells/ml the doubling time was 7 days (FIG. 7D). See also Table 3 below.

TABLE 3

| Growth type | Doubling time |
| --- | --- |
| 2D plastic dish | 20 h |
| GelMA 15% w/v + 1e6 cells/ml | — |
| GelMA 15% w/v + 2.5e6 cells/ml | — |
| Fibrin (15% w/v gelatin) + 1e6 cells/ml | 4.8 ± 0.3 days |
| Fibrin (15% w/v gelatin) + 2.5e6 cells/ml | 7 ± 0.2 days |
| Fibrin (7.5% w/v gelatin) + 1e6 cells/ml | 5.4 ± 0.3 days |
| Fibrin (30% w/v gelatin) + 1e6 cells/ml | 7.7 ± 1.1 days |

The proliferation rates in fibrin 3D hydrogels are significantly slower than in 2D petri dish as was measured by Szatmári et al to be 20 hours (37) compared to an average of 20 days doubling time of human malignant gliomas (38).

The cells outside the hydrogels were counted to evaluate the cells ability to escape the bio-inks, and the obtained data is shown in FIGS. 7G-H. Fibrin hydrogels allowed to less than 10% of the initial cells content to exit the hydrogel regardless of the initial cell concentration (FIG. 7G) and the initial gelatin concentration (FIG. 7H).

Cell proliferation was also evaluated by confocal microscopy images which were analyzed in Imaris software to estimate the density of the cells per volume for 131/4-5B1 mCherry melanoma cells and GL261 mCherry glioblastoma cells at both bio-inks at two initial seeding densities; $10^6$ cells/ml or $2.5 \times 10^6$ cells/ml. The obtained data is presented in FIGS. 8A-C.

FIG. 8A present one of three fields that were taken by the confocal microscope in Z-stack, showing 131/4-5B1 mCherry-labeled melanoma cells in day 1 and 7 days after seeding in the fibrin hydrogel.

FIG. 8B shows one of three fields that were taken by the confocal microscope in Z-stack, showing GL261 mCherry-labeled glioblastoma cells in day 1, 7 and up to 21 days after seeding. After a week in fibrin hydrogel, 131/4-5B1 and GL261 cells grew in clusters (d=about 80 μm). Staining the nuclei with 2.5 ng/ml Hoechst 33042 confirmed this (data not shown). This behavior can be attributed to the cell type and the bio-ink properties such as hydrogel stiffness and the presence of cell-attachment ligands, as demonstrated in previous reports (40, 41). From the proliferation curves shown in FIG. 8C, their doubling time can be estimated as 21 days when the initial concentration was $2.5 \times 10^6$ cells/ml and 14 days when the initial concentration was $10^6$ cells/ml.

FIGS. 9A-B show comparison of different bio-ink strength on the proliferation of cancer cells. As shown therein, different gelatin and Th concentrations were speculated to have some influence on the proliferation of the cells since their mechanical strength is different (see, FIG. 5E). However, when comparing different Th concentrations (FIGS. 9A and 9B (left)), there are no significant differences in the cell per volume value after 21 days except for the sample of Th 1 U/ml and gelatin 30% w/v in which the cells grow rapidly on top of the hydrogel. Similar trends were observed when counting cells by confocal microscopy (FIG. 9B, left) and by hydrogel digestion and direct counting (FIG. 9B, right) through 14 days.

These data may suggest that GL261 mCherry glioblastoma cells are not affected by the stiffness of the hydrogel.

Example 3

3D-Printed Hydrogels

A formulation comprising GelMA (15% w/v) with GL261 mCherry glioblastoma cells at $2.5 \times 10^6$ cells/ml was used for forming a ED-printed hydrogel using the EnvisionTEC® Bio-Plotter in 6 layers, as shown in FIG. 10A. The printed hydrogel was immersed in cell media for a week, as shown in FIG. 10B. Then, confocal microscope scanned 24 fields in Z-stack of the printed hydrogel to form a tailed 3D image, presented in FIG. 10C. The criss cross pattern of the printed GelMA is clearly seen by the presence of mCherry labeled cells, indicating the feasibility of printing the bio-ink according to a desired configured pattern. Triplicates were printed and lyophilized (FIGS. 10Di and 10Dii) or dehydrated in gradient ethanol concentrations (FIG. 10Diii) before SEM imaging. According to the SEM image of the lyophilized hydrogel (FIG. 10Di), the printed strands are with 1.3 mm distance from each other as desired. In the interior of the hydrogels, the lyophilization caused porous strands when the water sublimated. Therefore, it is suggested that the drying technique with ethanol is more favorable to see the smooth printed strands as they are seen in the confocal images.

Example 4

Vascularization of the 3D-Printed Tumor Model

In order to form a vessel-like structure, holed channels were created inside the hydrogels and were filled with HUVECs. The channels were made with Pluronic-containing bioink formulation containing HUVEC mCherry at the initial concentration of $3 \times 10^6$ cells/ml, as follows.
Preparation of Pulronic F127 Hydrogels:

40% w/v Pluronic F127 (Sigma) was dissolved in DDW using an overhead mechanical stirrer at 4° C. The solution was stored at 4° C. Prior to use, the bio-ink was loaded into a 30 ml syringe at 4° C. and centrifuged to remove air bubbles.
Preparation of Multi-Material Model:

The channels were made with Pluronic containing HUVEC mCherry at the initial concentration of $3 \times 10^6$ cells/ml, while the bio-inks, e.g., GelMA or fibrin hydrogels, were formed without any cells or with U87-GFP at the initial concentration of $10^6$ cells/ml. Fibrin hydrogels were either printed hydrogels or hydrogel prepared manually. When fibrin hydrogels were formed, in order to enhance the cross-linking at the interface between the Pluronic and the fibrin layers, Thrombin (20 U/ml) was added to the Pluronic prior to its liquefaction at 4° C.

Channels of the Pluronic ink were manually deposited using a syringe onto a hydrogel (e.g., fibrin) and then one or more layers of the bioink hydrogel were formed on top of the Pluronic channel, to thereby form a perfused model.

FIG. 11A show data obtained with the bio-ink fibrin, (i) without any cells; and (ii) with U87-GFP at the initial concentration of $10^6$ cells/ml. For the printed fibrin hydrogels, Thrombin (20 U/ml) was added to the Pluronic to increase the cross-linking at the interface between the Pluronic and the fibrin. As can be seen, fibrin bio-ink restricted the HUVEC mCherry from spreading all over the hydrogel and this bio-ink conserved the different 'layers' after a week.

When U87-GFP cells were cultured inside fibrin hydrogels their structure after a week was different than the aggregates that were observed in 131/4-5B1 and GL261 glioblastoma cells. They were more spread and tangled, as shown in FIG. 12A. This behavior can be attributed to the cell type.

To mimic the cancer microenvironment of glioblastoma for example, the cancer cells should be grown with their surrounding stromal cells such as astrocyte, endothelial cells and microglia.

Therefore, human astrocytes ($2.5 \times 10^6$ cells/ml) were co-cultured with U87-GFP at $10^6$ cell/ml to evaluate their influence on U87-GFP proliferation, structure, confluency and 3D spatial organization. The obtained images are Shown in FIG. 12B, and the proliferation curve according to the Imaris analysis is shown in FIG. 12C. It can be seen that the proliferation of U87-GFP was enhanced when hAstro were included perhaps because they can secrete some factors that increase their proliferation rate.

FIGS. 13A-C present images obtained upon vascularization of the 3D tumor model using Pluronic, thrombin and human umbilical vein endothelial cells (HUVEC) labeled with mCherry at $3 \times 10^6$ cells/ml, inside the tumor model, and co-culturing with astrocytes. As shown, good coverage of HUVECs at the channel surface (FIGS. 13A-B), and tube formation inside the channels (FIG. 13C), were observed.

Fibrinogen hydrogels containing U87-GFP at $2.5 \times 10^6$ cells/ml were printed using the same technique (see, FIG. 14 upper panel), and then confocal microscope scanned several fields in Z-stack of each printed hydrogel to form a tailed 3D image (FIG. 14, lower panel), indicating the feasibility to form a 3D-printed model according to a configured pattern.

The 3D printed tumor model is perfused through its hollowed channels, using an exemplary system 100 as schematically illustrated in FIG. 15. Perfusion system 100 is composed of a media reservoir 102, containing a medium and potentially cellular components such as cytokines, growth factors and the like, at physiological ratios, and/or a potential drug or immunologic agent. This cellular media is pumped by a peristaltic pump 104 through a tubing system 106 at physiological rates. A 3D printed vascularized tumor model 108 is connected to tubing system 106 by an inlet 110 and an outlet 112 at proper diameters in order to complete a continuous flow without leaking. Tubing system comprises an inlet tube, connecting pump 104 to tumor model 108 and an outlet tube. In some embodiments, outlet tube 106 leads the metabolized cell media (not shown) to a waste container 114. In some embodiments, outlet tube 106 is connected back to media reservoir 102, to thereby form a circulatory system (not shown).

In some embodiments, tubing system 106 is a microfluidic system. In some embodiments, inlet 110 and outlet 112 are stainless steel connectors or valves that control the flow in and out tumor model 108. In some embodiments, pump 104, inlet 110 and outlet 112 are configured such that stimulation of a physiological blood circulation is effected. In some embodiments, such a configuration further comprises a control unit (not shown) for controlling the flow rate into and from tumor 108.

The tubing path can be combined with 'Organ on a Chip' systems that simulate the metabolism of the cell media by different body parts such as liver or kidneys, and pump the metabolized cell media back to the media reservoir, simulating physiological blood circulation.

The 3D tumor model can be printed in replicates and test several drugs or combinations simultaneously with such perfusion system, as schematically illustrated in FIG. 16.

Since every patient's tumor is unique, and patients with the same type of cancer will often respond differently to the same treatment, the main advantage of 3D-printed tumors for ex vivo simulation is the rapid screening of the patient's tumor-properties and its responsiveness to different drugs compared to the current available methods. It is believed that creating the 3D-printed tumor model with cells from a biopsy of the patient, constructed according to the patient's μCT or μMRI gives more reliable results in shorter time, stating which treatment demonstrated the best results for the specific patient's tumor.

Another advantage of the 3D printed tumor model presented herein is the ability to mimic the tumor as it exists in vivo.

Pairs of dormant (Saos-2-D) and fast-growing (Saos-2-E) human osteosarcoma models in mice were previously studied and characterized. The same proliferation rates were measured in 2D of both dormant and fast-growing cells, whereas three weeks following tumor cell inoculation, Saos-2-E have created tumors with volumes of 1-3 mm$^3$ while Saos-2-D remained dormant up to 7 month (42).

FIGS. 17A-B present the proliferation rates of the same cell lines in manually deposited 3D fibrin hydrogels, and show similar results, indicating a successful mimic of in vivo models.

Example 5

Nanostring Analysis

Gene expression of cancer cells which grown in 2D on a Petri dish, included in a 3D-printed model and in vivo, in the presence of microenvironment cells were assessed by nanoString® gene expression assay.

For the 2D samples GL261 glioblastoma cells were harvested from a plastic dish. For e the 3D sample, fibrin hydrogels (gelatin 15% w/v, Th 1 U/ml) were used.

All the experiments performed for the Nanostring analysis included murine GL261 glioblastoma cells and murine stromal cells.

Cluster analysis/unsupervised classification analysis is used to group biological samples or genes into separate clusters based on their statistical behavior. The main objective of clustering is to find similarities between experiments or genes (given their expression ratios across all genes or samples, respectively), and then group similar samples or genes together to assist in understanding relationships that might exist among them. Cluster analysis is based on a mathematical formulation of a measure of similarity. The NanoString system hybridizes two probes to each target transcript: a biotin-labeled capture probe and a fluorescent barcode-labeled reporter probe. Reporter probes hybridize with specific RNAs in a sample and capture probes lock them via avidin onto a static surface. The NanoString nCounter Analysis System counts the immobilized RNAs using their barcodes. NanoString does not require polymerase activity, hence can work in less-than-ideal conditions like crude lysates, plasma, or formalin-fixed paraffin-embedded (FFPE) samples (which is how clinical tissue specimens are often stored).

The obtained data are presented in FIGS. 18-21.

FIG. 18 is a bar graph showing gene expression results obtained by Nanostring, demonstrating different genes expression patterns of GL261 glioblastoma cells in 2D, 3D and in vivo. The most substantial differential expression is shown between cells grown in 2D and cells in tumor tissue, whereas gene expression of cells grown in 3D is closer to the in vivo setting.

FIGS. 19-22 present gene expression results obtained by Nanostring, demonstrating differential genes expression between Naïve and tumor associated astrocytes (FIG. 19), microglia (FIG. 20) and brain endothelia cells (FIG. 21).

Example 6

Spheroid Production Comprising Tumor Cells and Stromal Cells

Spheroids are self-assembled cell aggregates that possess many important components of the physiological spatial growth and cell-cell interactions.

Multicellular tumor spheroids were prepared using the hanging-drop method, in which drops of cells suspension are held hanging from the bottom of an inverted tissue-culture plate until cells agglomerate spontaneously at the lower part of the drop due to gravity. 3D tumor spheroids were formed from a mixture of multiple glioblastoma cell populations to better simulate the in vivo characteristics of glioblastoma in vitro. Briefly, cells suspension of human astrocytes, mCherry-labeled patient-derived glioblastoma cells and GFP-labeled HUVEC or hCMEC/D3 cells (80,000 cells/ mL; 1:1:2 ratio) was prepared in endothelial growth medium (EMG)-2 supplemented with 0.24 w/v % methyl cellulose. Cells were deposited in 25 μL droplets on the inner side of a 20 mm dish and incubated for 48 h at 37° C. when the plate is facing upside down to allow for spheroid formation. Spheroids were then embedded in matrigel, seeded in a 96-well plate and treated with 1 ng/mL TSP-1 PM, 10 nM PTX and their combination. 3D spheroid invasion was visualized following 48 h using EVOS FL Auto cell imaging system (ThermoFisher Scientific). This protocol was used to test multiple combinations of anticancer agents at different concentrations and ratios on 100 spheroids in parallel.

The present inventors develop tumor models for breast cancer and melanoma brain metastasis incorporating tumor cells, endothelial cells, microglia, astrocytes, pericytes, smooth muscle cells and neurons.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES

Other References are Cited Throughout the Application

1. Bhatia S N, Ingber D E. Microfluidic organs-on-chips. Nature biotechnology. 2014 August; 32(8):760-72. PubMed PMID: 25093883.
2. Kim C, Kasuya J, Jeon J, Chung S, Kamm R D. A quantitative microfluidic angiogenesis screen for studying anti-angiogenic therapeutic drugs. Lab Chip. 2015 Jan. 7; 15(1):301-10. PubMed PMID: 25370780. Pubmed Central PMCID: PMC4311754.
3. Murphy S V, Atala A. 3D bioprinting of tissues and organs. Nature biotechnology. 2014 August; 32(8):773-85. PubMed PMID: 25093879.
4. Campbell J M, I.; Wirz, H.; Sharon, A.; Sauer-Budge, A. F. Multimaterial and Multiscale Three-Dimensional Bioprinter. Journal of Nanotechnology in Engineering and Medicine. 2015; 6(2):021007-9.
5. Cao Y, Vacanti J P, Paige K T, Upton J, Vacanti C A. Transplantation of chondrocytes utilizing a polymer-cell construct to produce tissue-engineered cartilage in the shape of a human ear. Plastic and reconstructive surgery. 1997; 100(2):297-302.
6. Kolesky D B, Truby R L, Gladman A S, Busbee T A, Homan K A, Lewis J A. 3D bioprinting of vascularized, heterogeneous cell-laden tissue constructs. Advanced materials. 2014 May 21; 26(19):3124-30. PubMed PMID: 24550124.
7. Nakamura M, Kobayashi A, Takagi F, Watanabe A, Hiruma Y, Ohuchi K, et al. Biocompatible inkjet printing technique for designed seeding of individual living cells. Tissue Eng. 2005 November-December; 11(11-12):1658-66. PubMed PMID: 16411811.
8. Fedorovich N E, Swennen I, Girones J, Moroni L, van Blitterswijk C A, Schacht E, et al. Evaluation of photocrosslinked Lutrol hydrogel for tissue printing applications. Biomacromolecules. 2009 Jul. 13; 10(7):1689-96. PubMed PMID: 19445533.
9. Chang R, Nam J, Sun W. Effects of dispensing pressure and nozzle diameter on cell survival from solid freeform fabrication-based direct cell writing. Tissue Eng Part A. 2008 January; 14(1):41-8. PubMed PMID: 18333803.
10. Jakab K, Damon B, Neagu A, Kachurin A, Forgacs G. Three-dimensional tissue constructs built by bioprinting. Biorheology. 2006; 43(3-4):509-13. PubMed PMID: 16912422.
11. Visser J, Peters B, Burger T J, Boomstra J, Dhert W J, Melchels F P, et al. Biofabrication of multi-material anatomically shaped tissue constructs. Biofabrication. 2013 September; 5(3):035007. PubMed PMID: 23817739.
12. Hopp B, Smausz T, Kresz N, Barna N, Bor Z, Kolozsvari L, et al. Survival and proliferative ability of various living cell types after laser-induced forward transfer. Tissue Eng. 2005 November-December; 11(11-12):1817-23. PubMed PMID: 16411827.
13. Koch L, Kuhn S, Sorg H, Gruene M, Schlie S, Gaebel R, et al. Laser printing of skin cells and human stem cells. Tissue Eng Part C Methods. 2010 October; 16(5):847-54. PubMed PMID: 19883209.
14. Du F, Wang H, Zhao W, Li D, Kong D, Yang J, et al. Gradient nanofibrous chitosan/poly ε-caprolactone scaffolds as extracellular microenvironments for vascular tissue engineering. Biomaterials. 2012; 33(3):762-70.
15. Hinton T J, Jallerat Q, Palchesko R N, Park J H, Grodzicki M S, Shue H-J, et al. Three-dimensional printing of complex biological structures by freeform reversible embedding of suspended hydrogels. Science advances. 2015; 1(9):e1500758.
16. Tao K, Levin A, Adler-Abramovich L, Gazit E. Fmoc-modified amino acids and short peptides: simple bio-inspired building blocks for the fabrication of functional materials. Chemical Society Reviews. 2016.
17. Khetan S, Burdick J A. Patterning network structure to spatially control cellular remodeling and stem cell fate within 3-dimensional hydrogels. Biomaterials. 2010; 31(32):8228-34.
18. Lee V, Singh G, Trasatti J P, Bjornsson C, Xu X, Tran T N, et al. Design and fabrication of human skin by three-dimensional bioprinting. Tissue Engineering Part C: Methods. 2013; 20(6):473-84.
19. Miller J S, Stevens K R, Yang M T, Baker B M, Nguyen D H, Cohen D M, et al. Rapid casting of patterned vascular networks for perfusable engineered three-dimensional tissues. Nature materials. 2012 September; 11(9): 768-74. PubMed PMID: 22751181. Pubmed Central PMCID: 3586565.
20. Gonen-Wadmany M, Oss-Ronen L, Seliktar D. Protein-polymer conjugates for forming photopolymerizable biomimetic hydrogels for tissue engineering. Biomaterials. 2007; 28(26):3876-86.
21. Josef E, Zilberman M, Bianco-Peled H. Composite alginate hydrogels: An innovative approach for the controlled release of hydrophobic drugs. Acta Biomater. 2010 December; 6(12):4642-9. PubMed PMID: 20601237.
22. Kolesky D B, Homan K A, Skylar-Scott M A, Lewis J A. Three-dimensional bioprinting of thick vascularized tissues. Proc Natl Acad Sci USA. 2016 Mar. 22; 113(12): 3179-84. PubMed PMID: 26951646. Pubmed Central PMCID: PMC4812707.
23. Lesman A, Koffler J, Atlas R, Blinder Y J, Kam Z, Levenberg S. Engineering vessel-like networks within multicellular fibrin-based constructs. Biomaterials. 2011; 32(31):7856-69.
24. Wu W, DeConinck A, Lewis J A. Omnidirectional printing of 3D microvascular networks. Advanced materials. 2011 Jun. 24; 23(24):H178-83. PubMed PMID: 21438034.
25. Ju Y M, Choi J S, Atala A, Yoo J J, Lee S J. Bilayered scaffold for engineering cellularized blood vessels. Biomaterials. 2010 May; 31(15):4313-21. PubMed PMID: 20188414.
26. Lee S J, Liu J, Oh S H, Soker S, Atala A, Yoo J J. Development of a composite vascular scaffolding system that withstands physiological vascular conditions. Biomaterials. 2008 July; 29(19):2891-8. PubMed PMID: 18400292.
27. Huling J, Ko I K, Atala A, Yoo J J. Fabrication of biomimetic vascular scaffolds for 3D tissue constructs using vascular corrosion casts. Acta Biomater. 2016 Mar. 1; 32:190-7. PubMed PMID: 26772527.
28. Golden A P, Tien J. Fabrication of microfluidic hydrogels using molded gelatin as a sacrificial element. Lab Chip. 2007 June; 7(6):720-5. PubMed PMID: 17538713.
29. Baranski J D, Chaturvedi R R, Stevens K R, Eyckmans J, Carvalho B, Solorzano R D, et al. Geometric control of vascular networks to enhance engineered tissue integration and function. Proc Natl Acad Sci USA. 2013 May 7; 110(19):7586-91. PubMed PMID: 23610423. Pubmed Central PMCID: PMC3651499.
30. Lesman A, Koffler J, Atlas R, Blinder Y J, Kam Z, Levenberg S. Engineering vessel-like networks within multicellular fibrin-based constructs. Biomaterials. 2011 November; 32(31):7856-69. PubMed PMID: 21816465.
31. Kaufman-Francis K, Koffler J, Weinberg N, Dor Y, Levenberg S. Engineered vascular beds provide key signals to pancreatic hormone-producing cells. PLoS One. 2012; 7(7):e40741. PubMed PMID: 22808248. Pubmed Central PMCID: PMC3395696.

32. Butcher D T, Alliston T, Weaver V M. A tense situation: forcing tumour progression. Nature Reviews Cancer. 2009; 9(2):108-22.
33. Paszek M J, Zahir N, Johnson K R, Lakins J N, Rozenberg G I, Gefen A, et al. Tensional homeostasis and the malignant phenotype. Cancer cell. 2005; 8(3):241-54.
34. Rubinstein MC, R. H. Polymer physics. Oxford university press Inc. 2003.
35. Chang S C, Rowley J A, Tobias G, Genes N G, Roy A K, Mooney D J, et al. Injection molding of chondrocyte/alginate constructs in the shape of facial implants. Journal of Biomedical Materials Research Part A. 2001; 55(4):503-11.
36. Schuurman W, Levett P A, Pot M W, van Weeren P R, Dhert W J, Hutmacher D W, et al. Gelatin☐methacrylamide hydrogels as potential biomaterials for fabrication of tissue☐engineered cartilage constructs. Macromolecular bioscience. 2013; 13(5):551-61.
37. Szatmári T, Lumniczky K, Désaknai S, Trajcevski S, Hídvégi E J, Hamada H, et al. Detailed characterization of the mouse glioma 261 tumor model for experimental glioblastoma therapy. Cancer science. 2006; 97(6):546-53.
38. Yamashita T, Fujinaga K. Establishment and characterization of rat cell lines transformed by the left-end DNA fragments of adenovirus type 31. Gan. 1983; 74(1):77-85.
39. Singh M, Venkata Krishnan H, Ranganathan S, Kiesel B, Beumer J H, Sreekumar S, et al. Controlled Three-Dimensional Tumor Microenvironments Recapitulate Phenotypic Features and Differential Drug Response in Early vs Advanced Stage Breast Cancer. ACS Biomaterials Science & Engineering. 2017.
40. Ouyang L, Yao R, Chen X, Na J, Sun W. 3D printing of HEK 293FT cell-laden hydrogel into macroporous constructs with high cell viability and normal biological functions. Biofabrication. 2015; 7(1):015010.
41. Hölzl K, Lin S, Tytgat L, Van Vlierberghe S, Gu L, Ovsianikov A. Bioink properties before, during and after 3D bioprinting. Biofabrication. 2016; 8(3):032002.
42. Tiram G, Segal E, Krivitsky A, Shreberk-Hassidim R, Ferber S, Ofek P, et al. Identification of dormancy-associated MicroRNAs for the design of osteosarcoma-targeted dendritic polyglycerol nanopolyplexes. ACS nano. 2016; 10(2):2028-45.

What is claimed is:

1. A three dimensional (3D) model of a tumor comprising a synthetic material, which is not inherently present in the tumor or its environment or in a subject having the tumor and a plurality of cell types having a full HLA match, said plurality of cell types comprising malignant cells and non-malignant cells of said tumor, wherein the 3D model features a plurality of voxel blocks, wherein at least 70% of said voxel blocks are identical to corresponding voxel blocks of a 3D imaging data of said tumor or part thereof, cells of which having been used to generate said 3D model.

2. The 3D model of claim 1, comprising extracellular matrix.

3. The 3D model of claim 1, comprising a perfusable vasculature.

4. The 3D model of claim 1, further comprising components of an extracellular matrix (ECM) of said tumor.

5. The 3D model of claim 1, wherein said synthetic material is selected from the group consisting of gelatin methacrylate (GelMA), Fmoc-containing material, Acrylated hyaluronic acid, poly-(ethylene glycol) diacrylate (PEGDA), clay mineral and carbon nanotubes chitosan, alginate, xanthan gum and pectin.

6. A method of manufacturing a 3D model of a tumor of a subject, the method comprising:
 (a) imaging said tumor to acquire a 3D imaging data of said tumor; and subsequently
 (b) ex-vivo dissociating at least a portion of said tumor so as to obtain a cell suspension comprising a plurality of cell types; and subsequently
 (c) subjecting said cell suspension to bioprinting according to said 3D imaging data so as to obtain a 3D model of said tumor, wherein said 3D model features a plurality of voxel blocks, wherein at least 70% of said voxel blocks are identical to corresponding voxel blocks of said 3D imaging data.

7. The method of claim 6, wherein said cell suspension comprises a plurality of cell suspensions fractionating said plurality of cell types, such that each of said cell suspensions comprises a different composition of said plurality of cell types.

8. The method of claim 6, wherein said cell suspension comprises an extracellular matrix.

9. The method of claim 6, further comprising perfusing said 3D-bioprinted model of said tumor, to thereby obtain a perfused model.

10. The method of claim 6, further comprising:
 (d) isolating cells of said tumor model;
 (e) in vitro or in vivo culturing said cells.

11. The method of claim 6 further comprising ex-vivo dissociating a surrounding environment of said tumor.

12. The method of claim 6, further comprising imaging a surrounding environment of said tumor prior to said ex-vivo dissociating.

13. A system comprising the 3D model of claim 1 and a container in fluid communication with the 3D model, said container comprising immune cells and/or a therapeutically active agent.

14. A method of screening for an anti-cancer treatment regimen, the method comprising:
 subjecting a 3D model of a tumor according to claim 1 to said anti-cancer treatment regimen; and
 determining a presence of an anti-cancer effect of said anti-cancer treatment regimen at a personalized manner.

15. A method of screening for an anti-cancer treatment regimen, the method comprising:
 subjecting a system of claim 13 to said anti-cancer treatment regimen; and
 determining a presence of an anti-cancer effect of said anti-cancer treatment regimen at a personalized manner.

16. A method of characterizing a tumor, the method comprising:
 providing the 3D model of the tumor of claim 1;
 isolating cells of said model;
 in vitro or in vivo culturing said cells.

* * * * *